US011050382B2

(12) United States Patent
Motohashi et al.

(10) Patent No.: US 11,050,382 B2
(45) Date of Patent: Jun. 29, 2021

(54) FLOAT AGGREGATE

(71) Applicant: KYORAKU CO., LTD., Kyoto (JP)

(72) Inventors: Yoshinori Motohashi, Osaka (JP); Seiji Ono, Yamato (JP); Tsutomu Sakaguchi, Osaka (JP); Yasunobu Ueda, Osaka (JP)

(73) Assignee: KYORAKU CO., LTD., Kyoto (JP)

( * ) Notice: Subject to any disclaimer, the term of this patent is extended or adjusted under 35 U.S.C. 154(b) by 0 days.

(21) Appl. No.: 16/615,895

(22) PCT Filed: May 29, 2018

(86) PCT No.: PCT/JP2018/020492
§ 371 (c)(1),
(2) Date: Nov. 22, 2019

(87) PCT Pub. No.: WO2018/221494
PCT Pub. Date: Dec. 6, 2018

(65) Prior Publication Data
US 2020/0153379 A1 May 14, 2020

(30) Foreign Application Priority Data

May 31, 2017 (JP) .............................. JP2017-108151
May 31, 2017 (JP) .............................. JP2017-108154
(Continued)

(51) Int. Cl.
*B63B 35/44* (2006.01)
*H02S 10/40* (2014.01)
(Continued)

(52) U.S. Cl.
CPC .............. *H02S 10/40* (2014.12); *B63B 35/44* (2013.01); *H02S 20/30* (2014.12); *H02S 40/32* (2014.12);
(Continued)

(58) Field of Classification Search
CPC . B63B 35/00; B63B 35/44; B63B 2035/4433; B63B 2035/4453;
(Continued)

(56) References Cited

U.S. PATENT DOCUMENTS

| 5,951,785 A | 9/1999 | Uchihashi et al. |
| 2009/0133732 A1* | 5/2009 | Hsia .................. H02S 20/00 136/206 |

(Continued)

FOREIGN PATENT DOCUMENTS

| JP | H09-271179 A | 10/1997 |
| JP | 2006-183228 A | 7/2006 |

(Continued)

OTHER PUBLICATIONS

International Search Report dated Aug. 28, 2018 in corresponding International application No. PCT/JP2018/020492; 4 pages.

*Primary Examiner* — Daniel V Venne
(74) *Attorney, Agent, or Firm* — Maier & Maier, PLLC

(57) ABSTRACT

The present invention is aimed at providing a float aggregate which can be manufactured at low cost and has countermeasures against wind pressure suitable for use on water. According to the present invention, provided is a float aggregate formed by connecting a plurality of floats configured for mounting a solar panel thereon, wherein the solar panel is provided on at least one of the plurality of floats so as to be inclined with respect to a surface of the float and to face a rear side of the float aggregate, the plurality of floats includes a base end float located along an end portion of on a front side of the float aggregate, and the base end float is provided with a windbreak member inclined with respect to a surface of the base end float and to face the front side of the float aggregate.

16 Claims, 43 Drawing Sheets

(30) Foreign Application Priority Data

Jun. 30, 2017 (JP) .............................. JP2017-129531
Sep. 29, 2017 (JP) .............................. JP2017-191727

(51) Int. Cl.
*H02S 20/30* (2014.01)
*H02S 40/32* (2014.01)
*H02S 30/10* (2014.01)

(52) U.S. Cl.
CPC ....... *B63B 2035/4453* (2013.01); *H02S 30/10* (2014.12)

(58) Field of Classification Search
CPC ..... B63B 2231/40; H02S 10/40; H02S 20/00; H02S 20/30; H02S 30/10; H02S 40/32; Y02E 10/50
USPC .................................................. 114/264–267
See application file for complete search history.

(56) References Cited

U.S. PATENT DOCUMENTS

| | | | |
|---|---|---|---|
| 2012/0090667 A1 | 4/2012 | Cap et al. | |
| 2014/0224165 A1 | 8/2014 | Veloso et al. | |
| 2015/0007872 A1* | 1/2015 | Cap | H02S 20/30 136/251 |
| 2016/0156304 A1* | 6/2016 | Smadja | H02S 30/10 136/251 |
| 2016/0340000 A1 | 11/2016 | Dagher et al. | |
| 2016/0341182 A1 | 11/2016 | Dagher et al. | |
| 2017/0085214 A1 | 3/2017 | Niimi | |
| 2017/0349245 A1 | 12/2017 | Yamashita | |
| 2019/0263477 A1 | 8/2019 | Dagher et al. | |

FOREIGN PATENT DOCUMENTS

| | | |
|---|---|---|
| JP | 2008-173553 A | 7/2008 |
| JP | 2014-510665 A | 5/2014 |
| JP | 2014-511043 A | 5/2014 |
| JP | 5641270 B1 | 12/2014 |
| JP | 5744469 B2 | 7/2015 |
| JP | 3199366 U | 8/2015 |
| JP | 2016-007874 A | 1/2016 |
| JP | 2016-019395 A | 2/2016 |
| JP | 2016-113123 A | 6/2016 |
| JP | 2017-505262 A | 2/2017 |
| WO | 2015/174205 A1 | 11/2015 |
| WO | 2016/136891 A1 | 9/2016 |

* cited by examiner

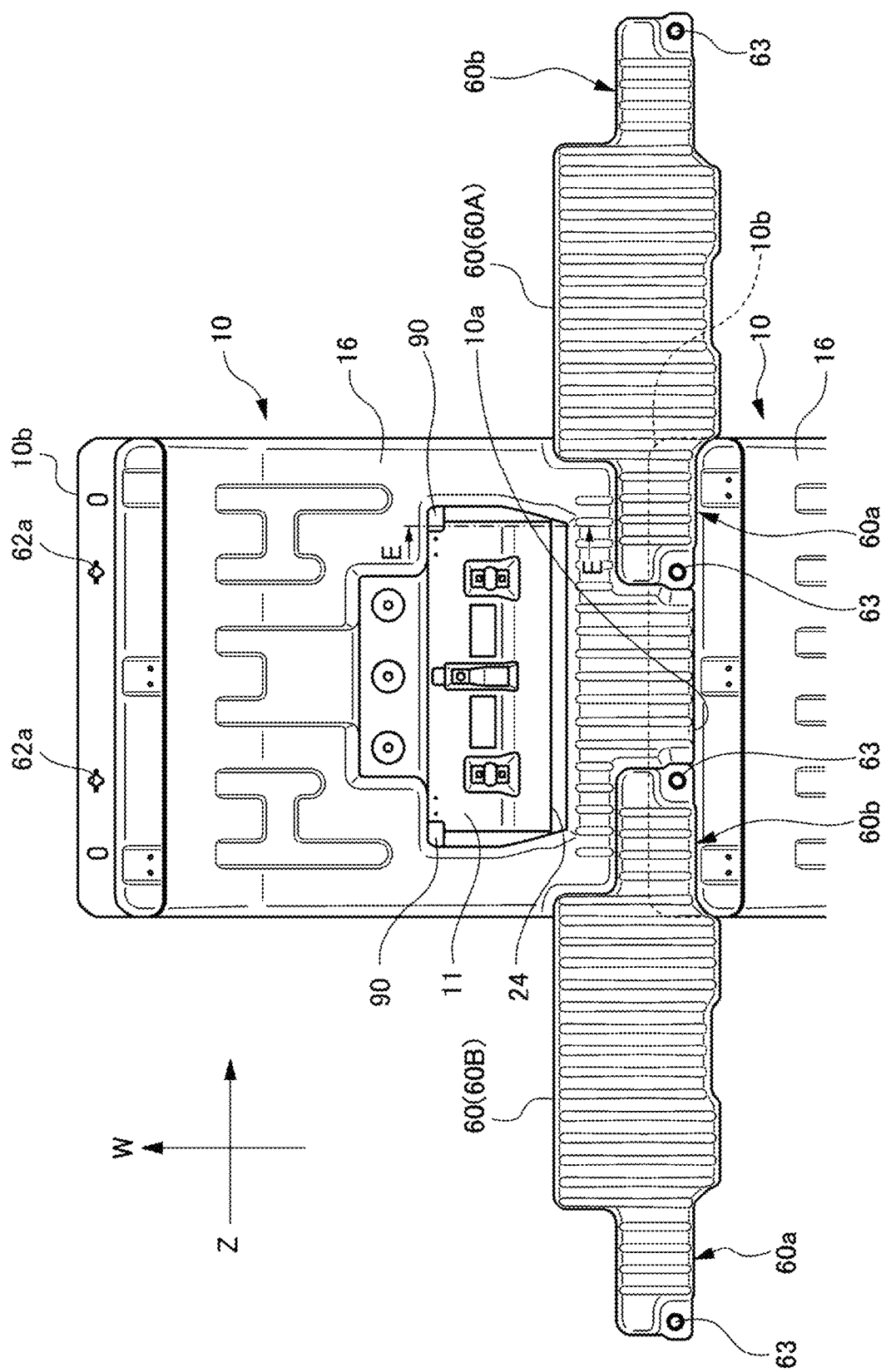

FIG. 28 A   FIG. 28 B
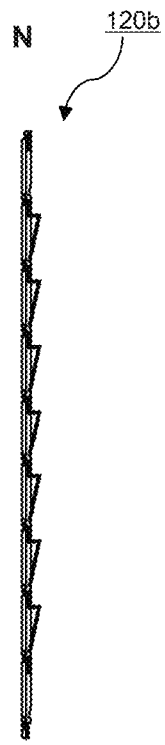
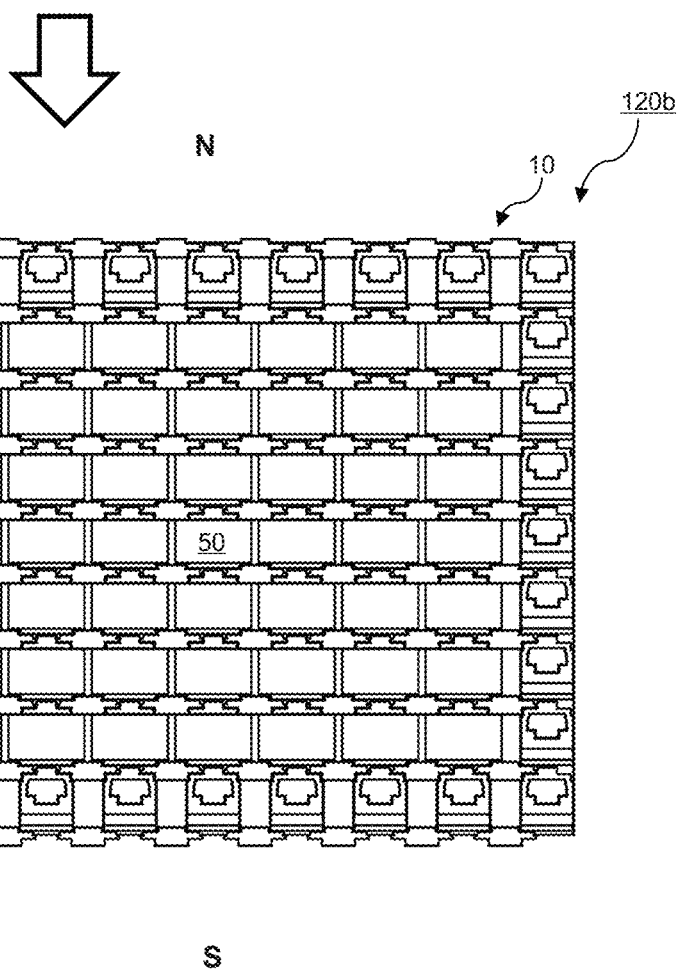

FLOAT AGGREGATE

TECHNICAL FIELD

The present invention relates to a float aggregate formed by connecting a plurality of floats configured for mounting a solar panel thereon.

BACKGROUND ART

Solar panels (also referred to as solar cell panels or solar cell modules) are used in solar power generation that converts sunlight into electric power. Solar panels have been mainly installed on a roof or wall surface of buildings or on the ground and have been recently installed on water such as idle ponds and lakes.

When installing a solar panel on the water, a float for floating the solar panel on the water is used, and the solar panel is installed on the float (see Patent Literature 1). Such a solar panel is inclined from a surface of the float to a predetermined one end side of the float in order to increase power generation efficiency. For example, in Japan, the solar panel is usually tilted to the south side beyond the zenith direction. However, the tilted panel is strongly influenced by the wind from the back (lift force). The solar panel may be thus detached from a mount, or the mount itself may be lifted. In particular, in the case of photovoltaic power generation on the water (installing a solar panel on the float to generate electricity), the solar panel is not only lifted (a force in the vertical direction) but also moved in the horizontal direction.

The electric power generated by solar power generation through the solar panel is direct current. Since the electric power used for a household power source or the like is alternating current, a power conditioner for converting direct current to alternating current is required. However, the power conditioner is usually installed on land, and thus it is difficult to wire the solar panel installed on the water.

When a float is arranged on the water (not only in the case of solar power generation), the float is anchored at a predetermined position on water via an anchoring member (see Patent Literature 2). Such an anchoring member is composed of, for example, a linear member (metal chain, wire, etc.) and a fixing member (anchor etc.), and a float is connected to one end side of the linear member and fixed to the other end side. Then, the float is anchored at a predetermined position on the water by fixing the fixing member to the water bottom.

CITATION LIST

Patent Literature

[Patent Literature 1] JP-B-2014-511043
[Patent Literature 2] JP-A-2008-173553
[Patent Literature 3] JP-B-5744469
[Patent Literature 4] JP-B-5641270

SUMMARY OF INVENTION

Technical Problem (First Viewpoint)
Patent Literature 2 teaches that a power conditioner can be installed on the water but does not disclose any specific arrangement or installation method of a solar panel, power conditioner, float, or the like. For example, if the solar panel and the power conditioner are installed on the same float, the float may sink because strong pressure is applied to the installation surface due to the weight of both the solar panel and the power conditioner. Sinking under the water may cause deterioration or failure of the system. It is thus necessary to prevent such sinking in order to practically install the power conditioner on the water.

The invention according to the first viewpoint has been made in view of such circumstances and provides a float aggregate comprising a power conditioner while avoiding sinking under the water surface.

(Second Viewpoint)
Patent Literature 3 discloses a mount system for a photovoltaic power generation module that is light in weight but can be installed stably against strong winds. This system is premised on installation on land. Specifically, the system comprises a rear cover inclined outward from a rear surface of the power generation module (solar panel) and extended toward a horizontal installation surface, being configured so that the power generation module is pressed toward the installation surface by wind pressure blown on the module.

However, if such a countermeasure is taken for each solar panel, the float may sink on the water due to a strong pressure applied on an installation surface side. Since the float includes the solar panel and electrical wiring connected thereto, sinking under the water may cause deterioration or failure of the system, and thus countermeasures against a strong wind suitable for use on water is necessary. In addition, if countermeasures against wind pressure are taken for each solar panel, there is a problem that manufacturing costs increase.

The invention according to the second viewpoint has been made in view of such circumstances and provides a float aggregate that comprises countermeasures against wind pressure suitable for use on water and is inexpensive to manufacture.

(Third Viewpoint)
The solar panel is inclined from a surface of the float to a predetermined one end side of the float in order to increase power generation efficiency. For example, in Japan, the solar panel is usually tilted to the south side beyond the zenith direction. However, the tilted panel is strongly influenced by the wind from the back (lift force). The solar panel may be thus detached from a mount, or the mount itself may be lifted. In particular, in the case of photovoltaic power generation on the water (installing a solar panel on the float to generate electricity), the solar panel is not only lifted (a force in the vertical direction) but also moved in the horizontal direction. For example, while such a problem does not occur in wind power generation that does not use a solar panel, a load (tension) may be excessively applied to a linear member of the anchoring member in solar power generation, and as a result, the linear member may deteriorates and tear.

The invention according to the third viewpoint has been made in view of such circumstances and provides a float system for a solar panel configured to suppress deterioration of the linear member.

(Fourth Viewpoint)
Such a float needs to be designed in consideration of the effects of rain or the like so as to generate buoyancy sufficient for floating the solar panel on the water while the solar panel is oriented in a specified direction (for example, a panel surface may face the south side in the northern hemisphere, such as in Japan). Conventionally, the float has been designed with a large margin for buoyancy. However, increasing the size of the float leads to an increased cost. On the other hand, if the size of the float is reduced, the solar panel may not be stably held.

The invention according to the fourth viewpoint has been proposed in view of such circumstances and provides a float which can be manufactured at lower cost while maintaining the stability in holding the solar panel and provides a float aggregate including such a float.

(Fifth Viewpoint)

The solar panel is inclined from a surface of the float to a predetermined one end side of the float in order to increase power generation efficiency. For example, in Japan, the solar panel is usually tilted to the south side beyond the zenith direction. However, the tilted panel is strongly influenced by the wind from the back (lift force). The solar panel may be thus detached from a mount, or the mount itself may be lifted. In particular, in the case of photovoltaic power generation on the water (installing a solar panel on the float to generate electricity), the solar panel is not only lifted (a force in the vertical direction) but also moved in the horizontal direction.

The invention according to the fifth viewpoint has been proposed in view of such circumstances and provides a float aggregate including a float comprising countermeasures against wind pressure and being more suitable for use on water.

(Sixth Viewpoint)

The electric power generated by the solar power generation through the solar panel is direct current. Since the electric power used for a household power source or the like is alternating current, a power conditioner for converting direct current to alternating current is required. Therefore, a power cable is connected between the power conditioner and the solar panel. In addition, if the power conditioner is installed on the float, it is necessary to transmit power from the power conditioner toward the land, and thus another power cable is required. That is, a large number of power cables are required for one float aggregate. Further, these cables are arranged, tracking the floats and passage joints which are connecting the floats, and thus there is a problem that a configuration can be complicated.

The invention according to the sixth aspect has been proposed in view of such circumstances and provides a float aggregate in which the wiring of power cables is more organized.

Solution to Problems

According to the invention of the first viewpoint, provided is a float aggregate formed by connecting a plurality of floats configured for mounting a solar panel thereon, wherein the plurality of floats includes first and second floats, the first floats are provided with the solar panel, and the second float is not provided with the solar panel and is provided with a power conditioner converting electric power generated by the solar panel from direct current to alternating current.

In the present invention, the first floats are provided with the solar panel, and the second float is not provided with the solar panel and is provided with the power conditioner. Therefore, a float aggregate comprising a power conditioner can be provided while reducing the load applied to each float and avoiding sinking below the water surface.

Various embodiments of the present invention are exemplified below. The embodiments described below can be combined with each other.

Preferably, the second float is provided to be surrounded by the first floats.

Preferably, the plurality of floats further includes a third float, neither the solar panel nor the power conditioner is provided on the third float, and a float adjacent to the second float is the third float.

Preferably, the float aggregate further comprises a collective float unit, wherein the first floats are located in the collective float unit, and the second float is located substantially in the center of the collective float unit.

Preferably, the second float comprises a mount, and the power conditioner is attached to the mount so that the second float and the power conditioner are not in contact with each other.

Preferably, the mount further comprises a sunshade member.

Preferably, the power conditioner is installed at a distance of 30 cm or more from a surface of the second float.

Preferably, the mount comprises a strut member on a side surface, wherein two strut members on one side are provided on one side so as to cross each other, and the power conditioner is installed along one of the intersecting strut members.

According to the invention of the second viewpoint, provided is a float aggregate formed by connecting a plurality of floats configured for mounting a solar panel thereon, wherein the solar panel is provided on at least one of the plurality of floats so as to be inclined with respect to a surface of the float and to face a rear side of the float aggregate, the plurality of floats includes a base end float located along an end portion of on a front side of the float aggregate, and the base end float is provided with a windbreak member inclined with respect to a surface of the base end float and to face the front side of the float aggregate.

In the present invention, the windbreak member is provided on the base end float among the floats included in the aggregate. Consequently, it is possible to prevent a float aggregate from sinking under water and to manufacture the float at low cost.

Various embodiments of the present invention are exemplified below. The embodiments described below can be combined with each other.

Preferably, the member inclined is the solar panel or a dummy panel different from the solar panel.

Preferably, the solar panel is not installed on the float located in an outer peripheral portion of the plurality of floats.

Preferably, the base end float is disposed to be inverted in a front-rear direction from the other floats. Preferably, the float aggregate has a rectangular shape, and the base end float is located along one side of the rectangular shape.

According to the invention of the third viewpoint, provided is a float system for a solar panel used on water, comprising a float and at least one anchoring member, wherein the float is configured for installing the solar panel thereon, the anchoring member comprises a linear member and a fixing member, the linear member comprises first and second connection portions, the first connection portion being connected to the float, the second connection portion being connected to the fixing member and suspended in water, the fixing member is fixed on a water bottom to anchor the float on the water, and the linear member is partially or entirely composed of a resin rope.

In the present invention, the linear member is partially or entirely composed of a resin rope that is more elastic than a metal wire or the like. Accordingly, it is possible to provide a float system for solar panel configured to suppress deterioration of the linear member.

Various embodiments of the present invention are exemplified below. The embodiments described below can be combined with each other.

Preferably, the float system satisfies 0.2≤(L1/L0)≤0.9, where L0 represents a length of the linear member in a longitudinal direction; and L1 represents a length of the resin rope of the linear member in a longitudinal direction.

Preferably, the linear member is formed by connecting the resin rope and a metal member.

Preferably, the metal member comprises at least one of a chain and a metal wire.

Preferably, wherein the resin rope is made of polypropylene or polyethylene.

Preferably, the resin rope is made of polyamide.

Preferably, the resin rope has a three-stranded structure.

Preferably, the fixing member is an anchor embedded and fixed in the ground at the water bottom.

Preferably, the fixing member is a plurality of sinkers submerged and located at the water bottom.

Preferably, the anchoring member is a plurality of anchoring member, and each resin rope of the plurality of anchoring members has a same length.

According to the invention of the fourth viewpoint, provided is a float configured for installing a solar panel thereon, comprising a float portion, a support portion, and a fixing metal fitting, wherein the float portion is configured to be hollow inside and to float on water, the support portion is provided so as to protrude upward in a first direction from an upper-surface wall of the float portion, the fixing metal fitting is an elongated member attached to an upper end of the support portion, being configured to support the solar panel, satisfying L1>L2, where L1 represents a length of the elongated member in a second direction; and L2 represents a length of the support portion in the second direction, and the second direction is a longitudinal direction of the elongated member.

The float according to the present invention comprises the elongated fixing metal fitting attached to the upper end of the support portion and is configured to support the back surface of the solar panel. The fixing metal fitting satisfies L1>L2, where L1 represents the length of the elongated shape in the longitudinal direction; and L2 represents the length in the same direction as the support portion. Since the stability in holding a solar panel becomes very high, there exists an effect that the float can be made smaller to reduce manufacturing cost.

Various embodiments of the present invention are exemplified below. The embodiments described below can be combined with each other.

Preferably, the float satisfies 1.3≤L1/L2≤4.0.

Preferably, the float portion has a substantially rectangular shape and satisfies 1.5≤L3/L4≤3.0, when L3 represents a length of a longer side of the rectangular shape; and L4 represents a shorter side of the rectangular shape.

Preferably, the float further comprises a solar panel having a substantially rectangular shape, wherein the solar panel is arranged so that a longer side of the solar panel and a shorter side of the float portion are substantially parallel, and the float satisfies 0.2≤L3/L5≤0.7, where L5 represents the longer side of the solar panel.

Preferably, a float aggregate comprises first and second floats, wherein the first float is a float described above, the second float is different in shape of the float portion from the first float, and no solar panel is installed on the second float.

According to the invention of the fifth viewpoint, provided is a float aggregate comprising a plurality of floats configured for installing a solar panel thereon, wherein each of the floats comprises a float portion and a support portion, the float portion is configured to be hollow inside and to float on water, the support portion is provided to protrude from an upper-surface wall of the float portion, the floats adjacent to each other in a predetermined direction are connected to each other at both ends via a passage joint, and a wind proof member is provided from the support portion in one of two floats connected to each other to the support portion in the other float.

The float aggregate according to the present invention is characterized in that the windbreak net is provided from the support portion in one float to the support portion in the other float (one float and the other float are adjacent to each other via a passage joint). Consequently, there exists an effect that the influence of the wind from the north can be suppressed and a more stable float aggregate can be realized.

Various embodiments of the present invention are exemplified below. The embodiments described below can be combined with each other.

Preferably, the windproof member has an aperture ratio of 0.01 to 0.5.

According to the invention of the sixth viewpoint, provided is a float aggregate comprising a plurality of floats configured for installing a solar panel thereon, wherein the floats adjacent to each other are connected to each other at both ends via a passage joint, a space surrounded by two floats connected to each other and two passage joints is defined, the float aggregate comprises elongated members, the elongated members are configured to support a power cable, and a plurality of elongated members is provided, across the space, between two adjacent passage joints or between two floats in which the ends thereof are connected to each other via the passage joint.

The float aggregate according to the present invention is characterized in that the plurality of elongated members are provided across the space surrounded by the two floats and the two passage joints. Consequently, it is possible to arrange, even in a dead space, the power cable conventionally provided so as to track the passage joints, thereby realizing a more organized power cable arrangement.

BRIEF DESCRIPTION OF DRAWINGS

FIG. 3A is a perspective view, and FIG. 3B is a plan view.

FIG. 4A is a perspective view, and FIG. 4B is a plan view.

FIG. 8A is an enlarged perspective view of a side of an upper-surface wall, and FIG. 8B is an enlarged plan view of a side of a lower-surface wall.

FIG. 9A is a cross-sectional view showing a part of a cross section along a Y-Y line in FIG. 8A and FIG. 8B, and FIG. 9B is a cross-sectional view showing a part of a cross section along a X-X line in FIG. 8A and FIG. 8B.

FIG. 10 shows the float according to the embodiment of the present invention connected by passage joints.

FIG. 12A shows a state in which components for fixing an anchoring member, such as an eye bolt, are not attached, FIG. 12B shows a state in which the components for fixing the anchoring member, such as an eye bolt, are attached so that a ring of the eye bolt is located on a side of a lower-surface wall, FIG. 12C shows a state in which the components for fixing the anchoring member, such as an eye bolt, are attached so that a ring of the eye bolt is located on a side of an upper-surface wall.

FIG. 19A is a right-side view, and FIG. 19B is a left-side view.

FIG. 21A is a plan view, and FIG. 21B is a cross-sectional view along a P-P line in FIG. 21A.

FIG. 24A is a side view seen from a west side, and FIG. 24B is a plan view.

FIG. 26A is a side view seen from a west side, and FIG. 26B is a plan view.

FIG. 27A is a side view seen from a west side, and FIG. 27B is a plan view.

FIG. 28A and FIG. 28B show a collective float unit according to a comparative example 2. FIG. 28A is a side view seen from a west side, and FIG. 28B is a plan view.

DESCRIPTION OF EMBODIMENTS

Hereinafter, embodiments for carrying out the present invention will be described in detail with reference to the accompanying drawings. The same number is assigned to the same element throughout the description of the embodiments.

1. First Embodiment (Corresponding to First Viewpoint)

Figure 1:
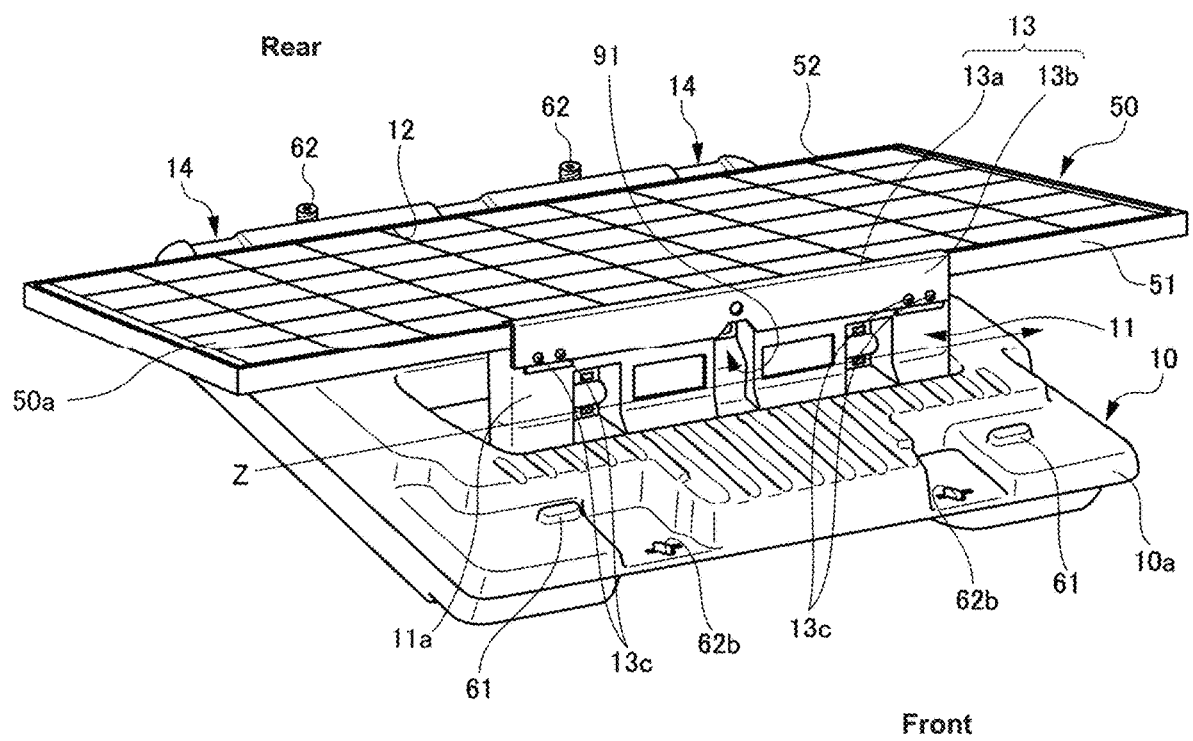
FIG. 1 is a perspective view showing a state in which a solar panel is installed on a float according to the embodiment of the present invention.
Figure 2:
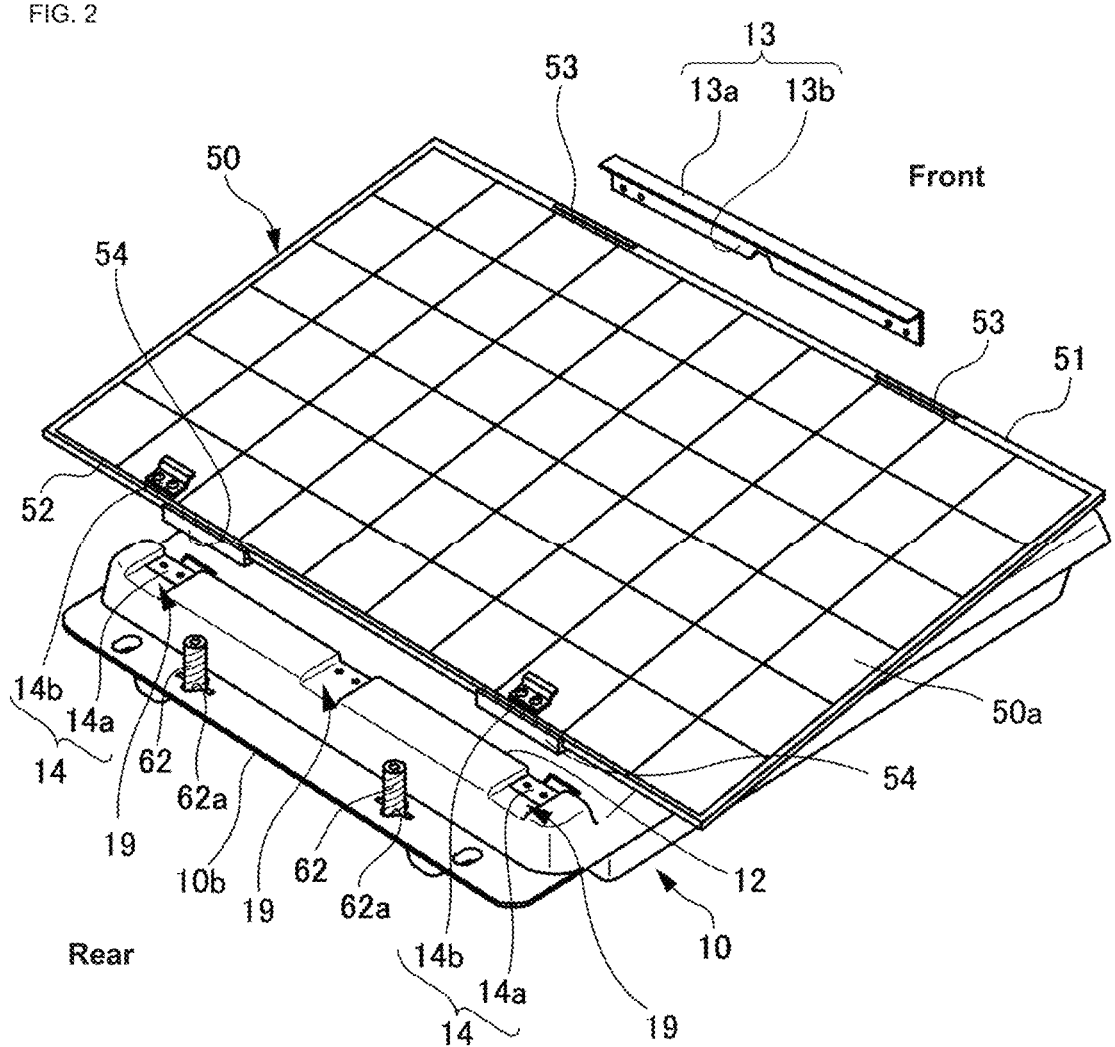
FIG. 2 is a perspective view showing a state in which the solar panel is removed from the float according to the embodiment of the present invention.

First, the first embodiment is described. FIG. 1 is a perspective view showing a state in which a solar panel 50 is installed on a float 10 according to the embodiment of the present invention, and FIG. 2 is a perspective view showing a state in which the solar panel 50 is removed from the float 10.

In the following description, a side of the float 10 where the solar panel 50 is installed may be referred to as an upper side, and a side of the float 10 installed on water surface may be referred to as a lower side. Further, a water surface side of the solar panel 50 or the like may be also referred to as a lower side, and a side opposite to the water surface side may be referred to as an upper side.

As shown in FIG. 1, the float 10 of the present embodiment supports the solar panel 50 having a substantially rectangular shape, so that a shorter side of the solar panel 50 is inclined. The float 10 is a float for installing the solar panel 50 on water, such as a pond or a lake.

(Overview of Solar Panel Installation)

As shown in FIG. 1, the float 10 comprises a support portion 11 supporting one end portion 51 of a pair of longitudinal sides of the solar panel 50 (a side of the one end portion 51 is also referred to as one end side); and a receiving portion 12 receiving the other end portion 52 on the other longitudinal side of the solar panel 50 (a side of the other end portion 52 is also referred to as the other end side). In this regard, the height of the support portion 11 is designed so that the solar panel 50 is installed in an appropriate inclined state, considering the power generation efficiency of the solar panel 50.

As shown in FIG. 2, the one end portion 51 of the solar panel 50 is provided with a bases 53 made of aluminum supported by the support portion 11, and the base 53 is supported on the support portion 11.

Meanwhile, as will be described later in detail, the float 10 comprises a fixing metal fitting 13 on the one end side for fixing the one end portion 51 side (one end side) of the solar panel 50 to the support portion 11. The solar panel 50 is fixed by being sandwiched between the fixing metal fitting 13 on the one end side and the support portion 11.

For example, as disclosed in Patent Literature 1, an elastomeric fixing member with a groove for sandwiching the solar panel frame is attached to the float. The fixing member elastically sandwiches an edge of the solar panel frame to fix the solar panel to the float.

However, in the aspect of Patent Literature 1, If a force is applied in a direction in which the solar panel floats, due to a strong wind or the like, and if stress is applied in a direction in which the sandwiching of the solar panel is released (a direction in which the groove expands), the solar panel may be unfixed.

On the other hand, by using the metal fixing fitting 13 as in the present embodiment, the solar panel 50 can be sandwiched more firmly, unlike the sandwiching method using the elasticity of an elastomer or the like.

As shown in FIG. 2, a base 54 made of aluminum similar to the base 53 made of aluminum is provided at the other end portion 52 of the solar panel 50. Here, as shown in FIG. 1 and FIG. 2, when the solar panel 50 is installed on the float 10, a side where the one end portion 51 of the solar panel 50 is located is defined as the front of the float 10, and a side where the other end portion 52 is located is defined as the rear of the float 10.

As will be described later in detail, the float 10 comprises two fixing metal fittings 14 on the other end side for fixing the other end portion 52 side (the other end side) of the solar panel 50 received by the receiving portion 12, to the float 10. The other end side of the solar panel 50 is fixed to the float 10 by the fixing metal fittings 14 on the other end side.

Thus, unlike sandwiching by elasticity with an elastomer or the like, the solar panel 50 can be sandwiched more firmly by using the fixing metal fittings 14 made of metal even on the other end portion 52 side (the other end side) of the solar panel 50.

In this regard, in the present embodiment, the fixing metal fittings 14 on the other end side can also be provided at the center. If necessary, a base can be further provided between the two bases 54, and the solar panel 50 can be fixed at three points by using the fixing metal fittings 14 on the other end side. The other end portion 52 side (the other end side) of the solar panel 50 can be thus fixed more firmly. Meanwhile, in some cases, it may not be necessary to provide the bases 53, 54 on the solar panel 50 when mounting to the float 10.

(Overall Structure of Float)

Figure 3A:
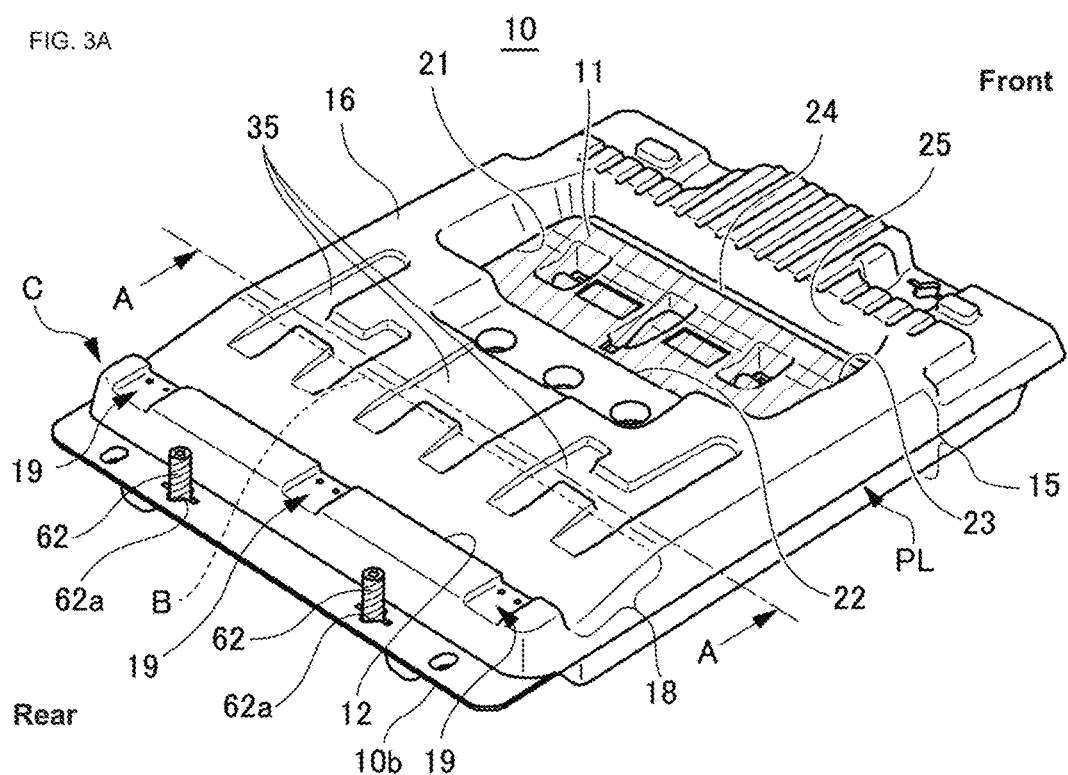
FIG. 3A and FIG. 3B show an upper side of the float according to the embodiment of the present invention.
Figure 3B:
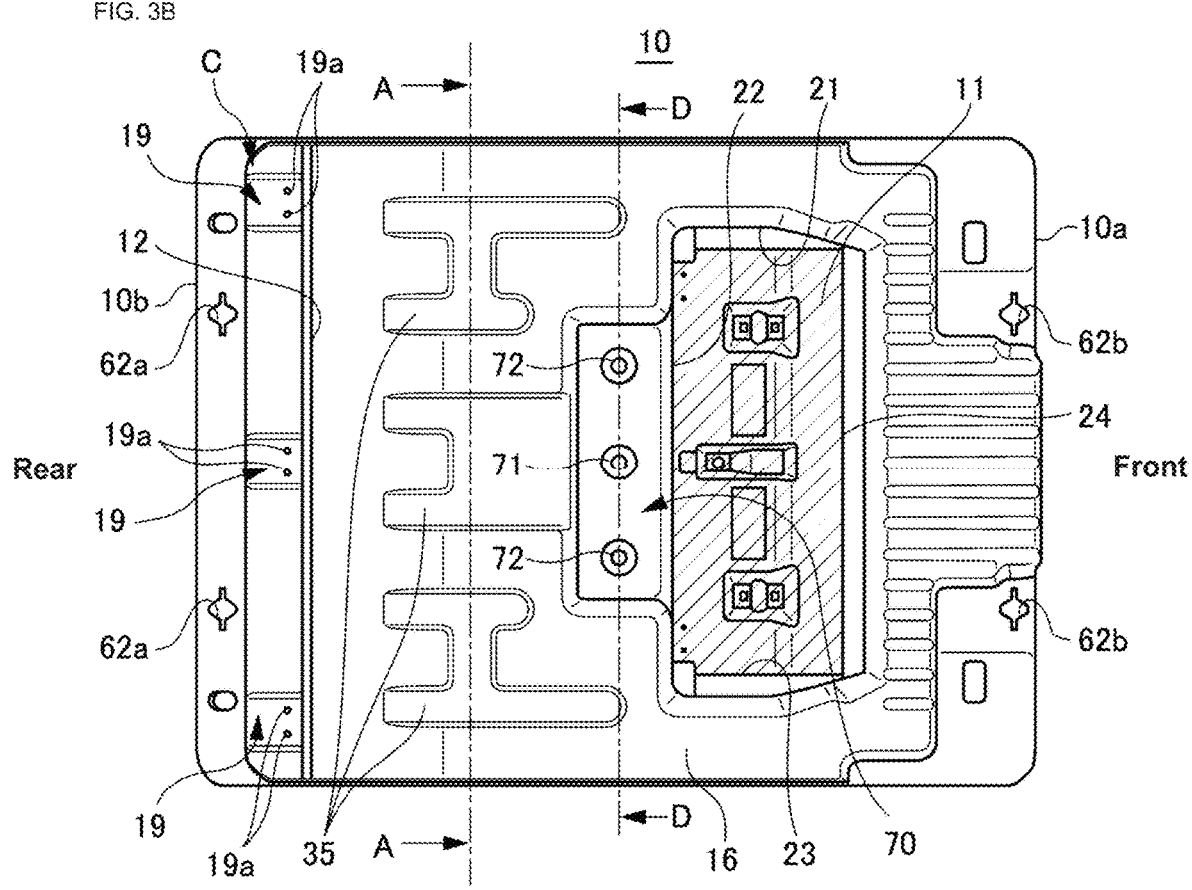
Figure 4A:
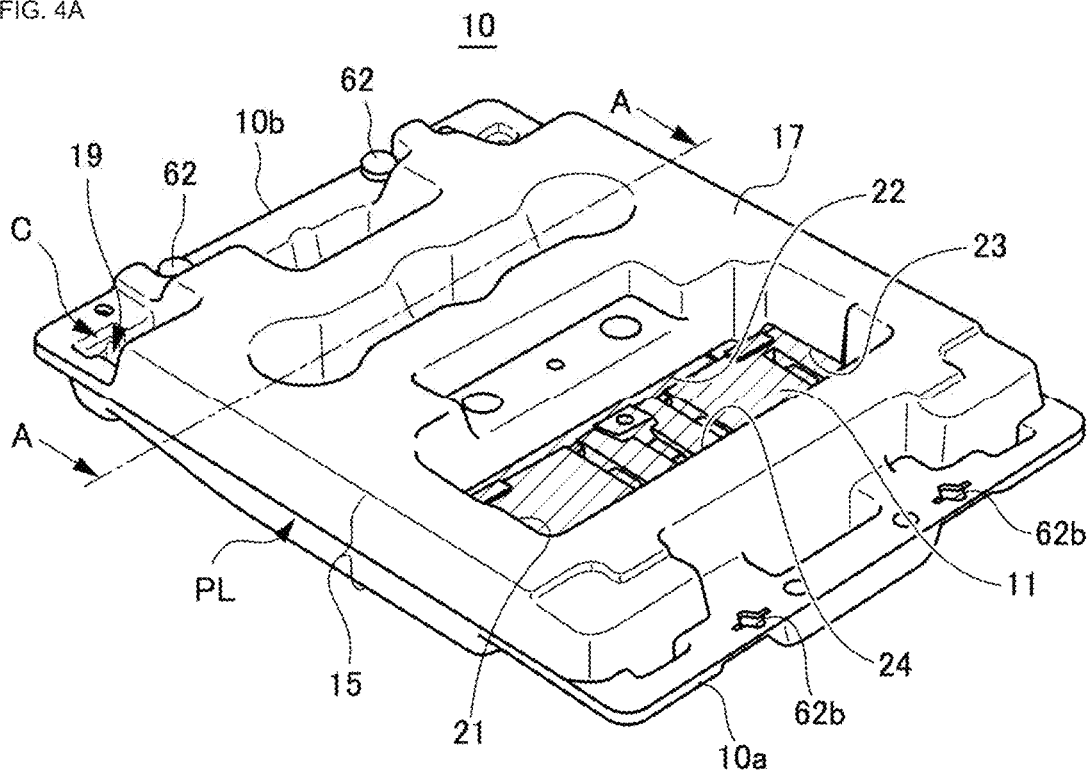
FIG. 4A and FIG. 4B show a lower side of the float according to the embodiment of the present invention.
Figure 4B:
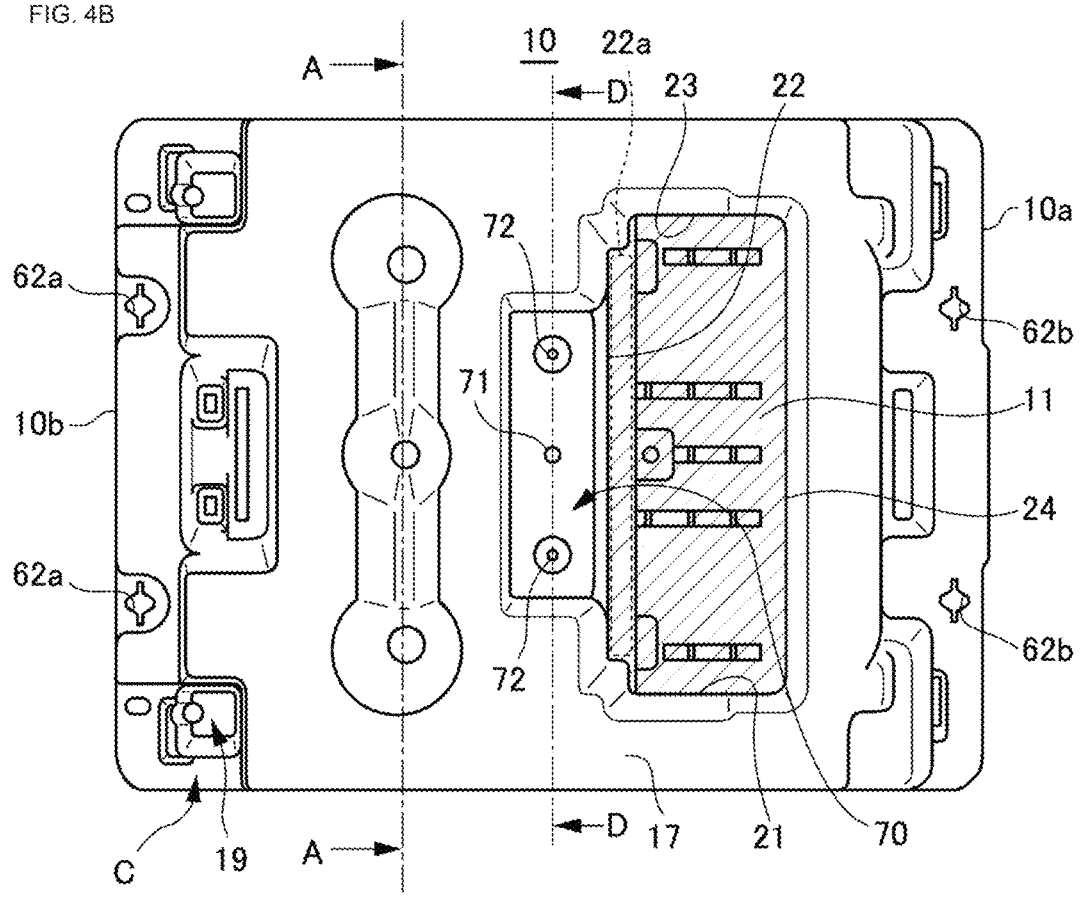

The float 10 is described in detail below, with reference to the drawings. FIG. 3A and FIG. 3B show an upper side of the float 10. FIG. 3A is a perspective view, and FIG. 3B is a plan view. FIG. 4A and FIG. 4B show a lower side of the float 10. FIG. 4A is a perspective view, and FIG. 4B is a plan view.

Figure 5:
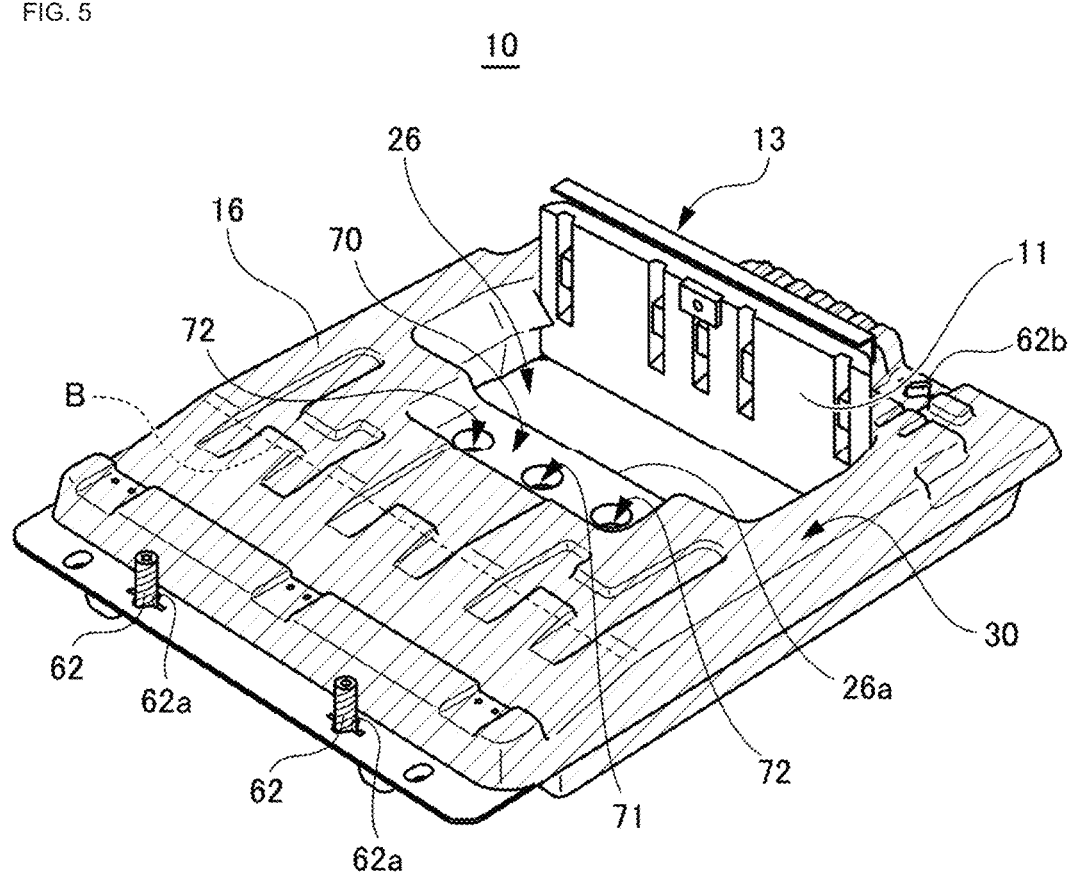
FIG. 5 is a perspective view according to the embodiment of the present invention, showing the upper side of the float in a state in which a support portion is raised.
Figure 6:
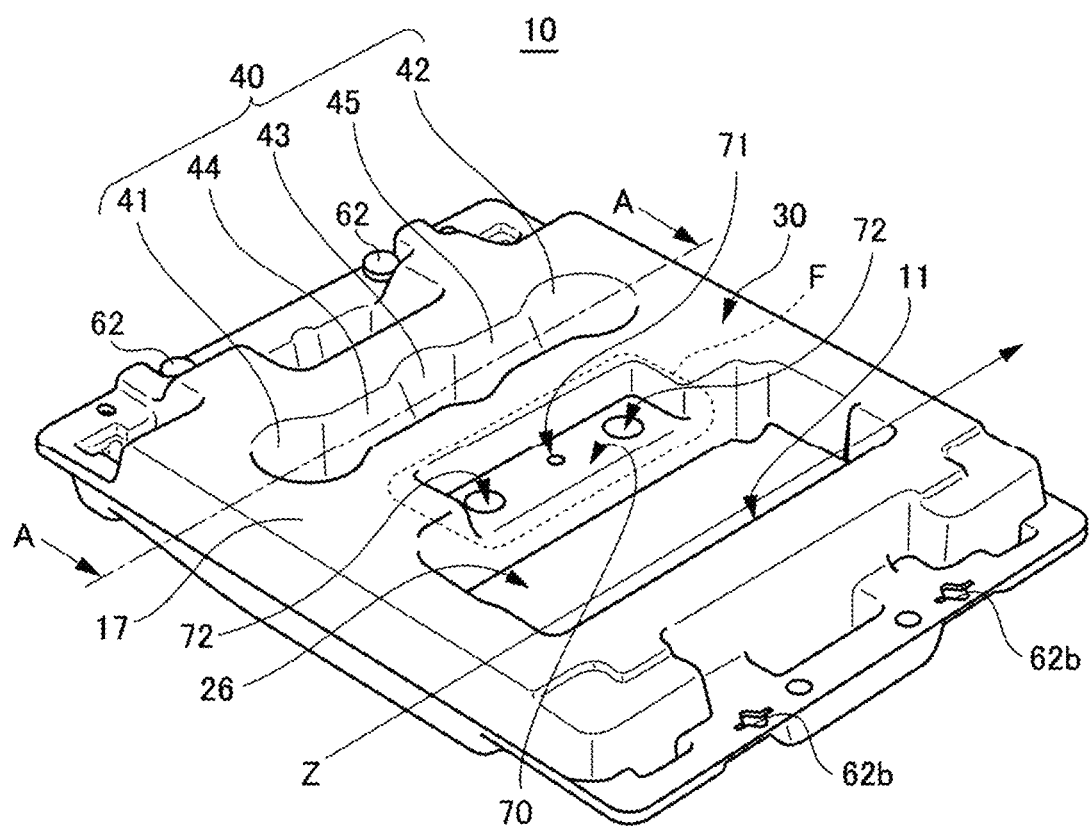
FIG. 6 is a perspective view according to the embodiment of the present invention, showing the lower side of the float in a state in which the support portion is raised.

Further, FIG. 5 is a view corresponding to FIG. 3A, that is, a perspective view showing the upper side of the float 10 in a state in which the support portion 11 is raised as described later. FIG. 6 is a view corresponding to FIG. 4A, that is, a perspective view showing the lower side of the float 10 in a state in which the support portion 11 is raised as described later. Here, FIG. 5 also shows a state in which the fixing metal fitting 13 on the one end side is temporarily fixed to the support portion 11.

The float 10 is manufactured, for example, by blow molding in which a molten cylindrical parison is sandwiched between a plurality of split molds. Various thermoplastic resins can be used as a molding material, and polyolefin resins, such as polypropylene and polypropylene, can be suitably used.

As shown in FIG. 3A, FIG. 3B, FIG. 4A, and FIG. 4B, the float 10 has a rectangular shape as a whole. The float 10 comprises a side wall portion 15 including a parting line PL, an upper-surface wall 16 located on the upper side (see FIG. 3A), and a lower-surface wall 17 located on the lower side (see FIG. 4A) and is configured to have a hollow portion for accommodating gas (such as air) therein.

(Support Portion and Opening)

As shown in FIG. 3A and FIG. 4A, the float 10 is provided with the support portion 11 for supporting the solar panel 50 (see the hatched portion). The support portion 11 is configured by combining the lower-surface wall 17 and the upper-surface wall 16.

FIG. 3A, FIG. 3B, FIG. 4A, and FIG. 4B show a state before the support portion 11 is raised as shown in FIG. 1. Three sides 21, 22, 23 on the one end side around the support portion 11 are cut to form an opening 26 (see FIG. 5 and FIG. 6) and configured to be raised on a upper-surface wall 16 side (a side on which the solar panel 50 is located), using a side 24 on the one end side as a hinge.

As shown in FIG. 5, the float 10 of the present embodiment comprises an annular float portion 30 (see the hatched portion) formed to enclose the opening 26. The annular float portion 30 has a hollow structure and contains gas (such as air) generating buoyancy.

As shown in FIG. 1, when the solar panel 50 is installed, the support portion 11 is raised on the upper-surface wall 16 side so as to come into contact with an inner wall surface 25 (see FIG. 3A) of the opening 26 on a side of the side 24 serving as a hinge. The solar panel 50 is installed so that the lower side of the one end side of the solar panel 50 is supported on a side of the side 22 opposite to the side 24 as a hinge on the one end side.

As shown in FIG. 4B, a receiving rib 22a (see dotted line) for receiving the one end portion 51 side of the solar panel 50 is provided on a side of the side 22 opposite to the side 24 as a hinge on the one end side of the support portion 11. Specifically, the receiving rib 22a is provided with a stepped structure with the lower-surface wall 17 closer to the upper-surface wall 16. When the solar panel 50 is installed on the float 10, the one end portion 51 side of the solar panel 50 can be received so that the one end portion 51 side of the solar panel 50 may not shift to the one end side beyond the support portion 11.

When the support portion 11 is configured as described above, the opening 26 is positioned in the vicinity of the support portion 11. Since an inner wall surface of the opening 26 serves as a wall that suppresses structural deflection, deflection is less likely to occur.

Further, since the support portion 11 is connected to the main body of the float 10 by a hinge structure, the support portion 11 is not easily affected even if the deflection occurs in the float 10. In addition, since the rigidity of the support portion 11 is enhanced by combining the lower-surface wall 17 and the upper-surface wall 16 without being separated so much from each other, the deformation due to the deflection of the float 10 is suppressed.

Figure 22:
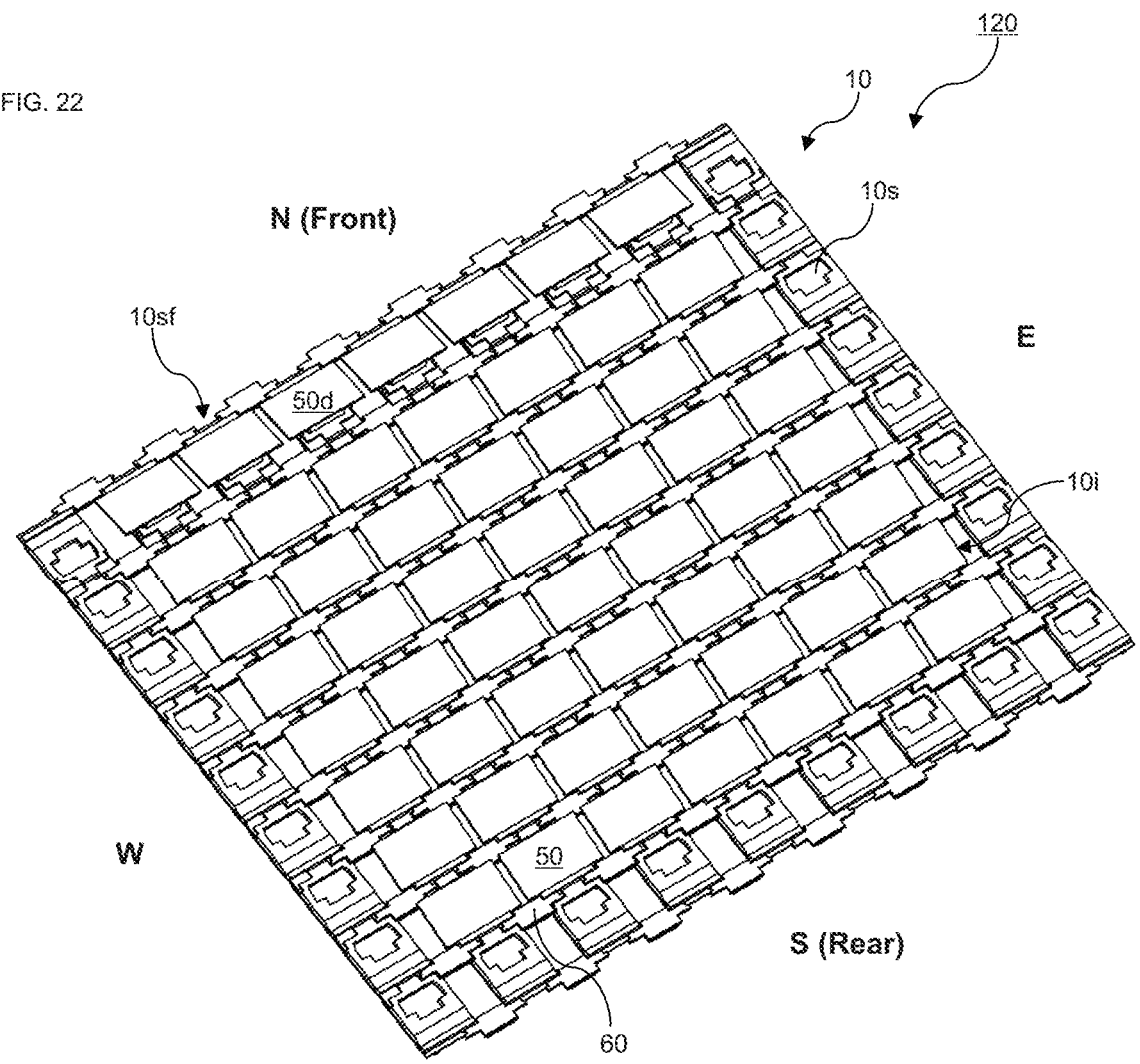
FIG. 22 is a perspective view showing the collective float unit according to a second embodiment of the present invention.
Figure 23:
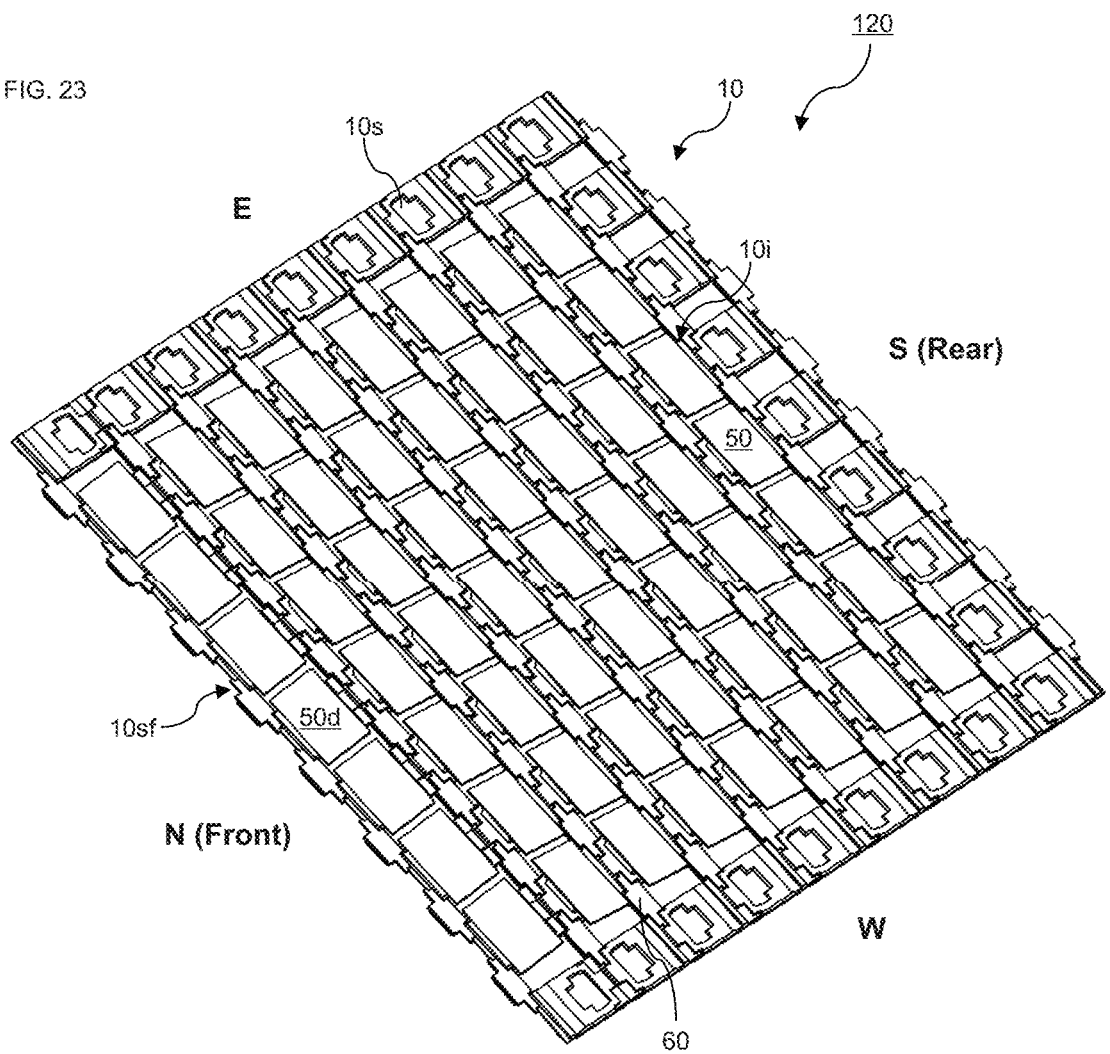
FIG. 23 is a perspective view showing the collective float unit according to the second embodiment of the present invention.

Therefore, even in the situation where stress is applied to the float 10 due to operator's weight or the like (for example, when the operator is on a the passage joint 60 (see FIG. 10) near the float 10 or puts his foot on the float 10, in order to perform fixing work in the collective float unit 120 (see FIG. 22)), the support portion 11 is hardly affected by the deflection of the float 10.

Since the fixing work can be performed to fix the one end portion 51 side (one end side) of the float 10 with the fixing metal fitting 13 on the one end side without being affected by the deflection, it is possible to avoid loosening the attachment of the fixing metal fitting 13 on the one end side.

In the present embodiment, the fixing metal fittings 14 on the other end side is fixed to a mounting portion 19 (see FIG. 2), which will be described later. If the deflection occurs in the mounting portion 19, it is difficult to fix the fixing metal fittings 14 on the other end side, and thus the fixing metal fittings 14 may be insufficiently fixed. Moreover, even if they are fixed correctly, the fixing of the fixing metal fittings 14 on the other end side may be loosened over time as the deflection occurs repeatedly in the mounting portion 19 when the operator passes nearby during maintenance or due to other various factors.

For this reason, the mounting portion 19 itself is configured such that the deflection is less likely to occur, as described later. Further, the rigidity of the float 10 is increased to reduce the deflection of the float 10 and to reduce stress that causes the deflection in the mounting portion 19, which is described below.

(Structure for Suppressing Float Deflection)

In FIG. 6, although the support portion 11 is not visible, the reference sign of the support portion 11 is shown with an arrow at the position of the support portion 11. The same direction as a direction along the support portion 11 shown in FIG. 1 (Z axis in FIG. 1) is shown as the Z axis.

As shown in FIG. 6, the float 10 is provided with the annular float portion 30 (see the hatched part in FIG. 5) containing gas (such as air) that generates buoyancy, so as to enclose the opening 26. As shown in FIG. 6, a concave portion 40 having a peripheral wall is provided in the annular float portion 30, at a position opposite to the support portion 11 across the opening 26. Specifically, the concave portion 40 is formed so that the lower-surface wall 17 is recessed toward the upper-surface wall 16 side.

Figure 7:
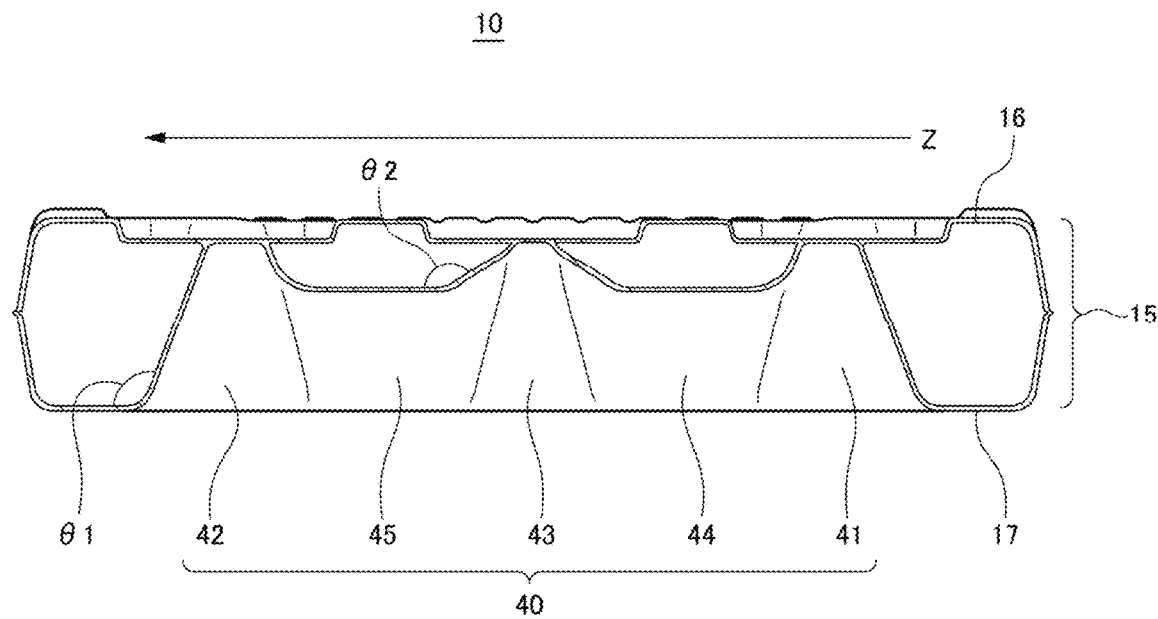
FIG. 7 is a cross-sectional view taken along a line A-A shown in FIG. 3A, FIG. 3B, FIG. 4A, FIG. 4B, and FIG. 6.

FIG. 7 is a cross-sectional view taken along a line A-A shown in FIG. 3A, FIG. 3B, FIG. 4A, FIG. 4B, and FIG. 6. In FIG. 7, the upper side is the upper-surface wall 16 side of the float 10, and the lower side is a lower-surface wall 17 side. In FIG. 7, similarly to FIG. 6, the same direction as the direction along the support portion 11 shown in FIG. 1 (see the Z axis in FIG. 1) is shown as the Z axis.

As shown in FIG. 6 and FIG. 7, the concave portion 40 comprises a truncated cone-shaped recess 41 that tapers toward the upper-surface wall 16 and is provided at one end portion in a direction along the support portion 11 (see the Z axis), a truncated cone-shaped recess 42 that tapers toward the upper-surface wall 16 and is provided at the other end portion, and a truncated cone-shaped recess 43 that tapers toward the upper-surface wall 16 and is located in the center between the truncated cone-shaped recess 41 and the truncated cone-shaped recess 42.

That is, the concave portion 40 comprises the truncated cone-shaped recesses 41, 42, 43 that taper toward the upper-surface wall 16, at both ends and in the center along the support portion 11 (see the Z axis).

Further, the concave portion 40 comprises the groove-shaped recesses 44, 45 that connect the truncated cone-shaped recesses 41, 42, 43 in the direction along the support portion 11 (see the Z axis) and have a width narrowing toward the upper-surface wall 16.

As shown in FIG. 7, the lower-surface wall 17 and the upper-surface wall 16 are integrated at a tip portions of the truncated cone-shaped recesses 41, 42, 43 in the concave portion 40, while the lower-surface wall 17 and the upper-surface wall 16 are not integrated at the groove-shaped recesses 44, 45. When such a concave portion 40 is provided, the peripheral wall of the concave portion 40 serves as a rib that reinforces rigidity to suppress the deflection of the float 10.

In this regard, bottom portions of the groove-shaped recesses 44, 45 on the upper-surface wall 16 side are not integrated with the upper-surface wall 16, so as to form a flow path through which gas (such as air) can flow, thereby improving moldability in blow molding.

On the other hand, the volume for storing gas (such as air) in the annular float portion 30 is reduced due to such a configuration of the concave portion 40. Since the concave portion 40 is formed to have the peripheral wall opening to the lower-surface wall 17 side by recessing the lower-surface wall 17 toward the upper-surface wall 16 side, the concave portion 40 serves as a pool of air generating buoyancy when the float 10 is arranged on the water surface, thereby suppressing a decrease in buoyancy due to a decrease in the volume of gas (such as air) in the float 10.

The float 10 is installed in a sunny place to increase the power generation efficiency of the solar panel 50. The gas in the float 10 (such as air) expands when the air temperature is high in the daytime, and the expanded gas (such as air) contracts when the air temperature falls at night. The float expands and contracts as the gas expands and contracts.

Although the cause is different from the deflection (deformation) due to the operator on the float 10, such expansion and contraction also causes the deflection (deformation). However, in the present embodiment, since the concave portion 40 is provided as described above, the total amount of gas (such as air) stored in the annular float portion 30 is reduced. Consequently, the expansion and contraction force of gas (such as air) is small, and the deflection (deformation) of the float 10 due to the temperature difference between day and night can be suppressed.

In particular, the lower-surface wall 17 and the upper-surface wall 16 are integrated at the tips of the truncated cone-shaped recesses 41, 42, 43 in the concave portion 40, as described above. The upper-surface wall 16 and the lower-surface wall 17 thus do not move and separate from each other even when the internal gas (such as air) expands.

In addition, the upper-surface wall 16 and the lower-surface wall 17 do not move and approach each other even when the internal gas (such as air) contracts. Therefore, the deflection (deformation) can be further suppressed.

As described above, the concave portion 40 functions as a reinforcing rib to enhance rigidity. Meanwhile, since the concave portion 40 is formed by molding the lower-surface wall 17 so as to be recessed toward the upper-surface wall 16 side, the thickness is reduced as a result of recessing the wall, and thus a pinhole may be generated during the molding.

For this reason, the most recessed part toward the upper-surface wall 16 is formed in a truncated cone shape so as not to cause a change in thickness at a specific position during molding. In addition, as can be seen from FIG. 6, the diameter of the base (at an opening side) of the truncated cone-shaped recesses 41, 42, 43 is larger than the width of the groove-shaped recesses 44, 45, and the lower-surface wall 17 is gently inclined so as not to be thin.

In addition, in the present embodiment, in order to avoid the occurrence of a pinhole due to the thinning on a part of the lower-surface wall 17 adjacent to the concave portion 40 and at starting points of the truncated cone-shaped recesses 41, 42, the truncated cone-shaped recesses 41, 42 are formed upward toward the upper-surface wall 16 so that the angle formed with the part of the lower-surface wall 17 adjacent to the concave portion 40 is θ1 (specifically 110 degrees).

Similarly, in the truncated cone-shaped recess 43, a tip of the truncated cone-shaped recess 43 is formed upward toward the upper-surface wall 16 so that the angle formed with the bottom of the groove-shaped recesses 44, 45 on the upper-surface wall 16 side is θ2 (specifically 145 degrees). Here, the angle described above is merely an example. θ1 is preferably set in a rage of 110±15 degrees, and θ2 is preferably set in a range of 145±15 degrees.

Further, as shown in FIG. 7, the truncated cone-shaped recesses 41, 42, 43 are configured such that the diameter of a part of the truncated cone-shaped recess 43 (located in the center of the concave portion 40) where the lower-surface wall 17 is integrated with the upper-surface wall 16 is smaller than the diameter of a portion of the two truncated cone-shaped recesses located at both ends of the concave portion 40 (the recesses 41, 42) where the lower-surface wall 17 is integrated with the upper-surface wall 16, so that the moldability is improved.

As described above, by providing the concave portion 40 formed by recessing the lower-surface wall 17 toward the upper-surface wall 16 on the annular float portion 30, the volume of the gas (such as air) in the float 10 is reduced without reducing the buoyancy of the float 10. Consequently, the expansion and contraction of the gas that causes the float 10 to be deformed are suppressed, and the rigidity of the structure is enhanced.

Therefore, the deflection (deformation) of the float 10 is suppressed, and stress that causes the deflection of the mounting portion 19 is reduced. Since the deflection of the mounting portion 19 is thus suppressed, the loosening of the fixing metal fittings 14 on the other end side (see FIG. 2) can be suppressed.

In addition, when forming the groove-shaped recesses 44, 45, the lower-surface wall 17 is recessed so as not to be integrated with the upper-surface wall 16. This contributes to keeping the thickness in order not to generate pinhole in the concave portion 40 when the truncated cone-shaped recesses 41, 42, 43 are formed. The degree to which the lower-surface wall 17 forming the groove-shaped recesses 44, 45 is separated from the upper-surface wall 16, that is, how much the groove-shaped recesses 44, 45 are to be recessed, may be determined from the viewpoint of suppressing pinholes when the float 10 is formed.

When the width of the groove-shaped recesses 44, 45 is increased, the volume gas in the float 10 can be reduced. However, since the concave portion 40 opens to the water surface side and the water surface serves as a lid, gas such as air is trapped in the concave portion 40. Therefore, a part of the gas in the concave portion 40 may escape when the float 10 is shaken by strong wind or the like.

In such a case, the buoyancy of the float 10 is reduced by that amount. It is thus important to ensure buoyancy sufficient for the float 10 even if such a situation suddenly occurs.

In addition, since these groove-shaped recesses 44, 45 are relatively shallow toward the upper-surface wall 16 side, a pinhole does not occur easily at the time of molding even if the width is small. Therefore, the width of the groove-shaped recesses 44, 45 is configured to be smaller than the base (at an opening side) of the truncated cone-shaped recesses 41, 42, 43 in order not to excessively reduce the volume of gas in the float 10 from the viewpoint of buoyancy.

Further, in the present embodiment, the upper-surface wall 16 also contributes to suppressing the deflection (deformation) of the float 10, thereby suppressing the deflection of the mounting portion 19 due to the deflection of the float 10 and preventing the fixing metal fittings 14 on the other end side (see FIG. 2) from being loosed. This point is described below.

When focusing on the upper-surface wall 16 side, the concave portion 40 is located in the portion of the line A-A in FIG. 3A, as shown in FIG. 7. As shown in FIG. 3A, the upper-surface wall 16 comprises an inclined portion 18. The inclined portion 18 is provided closer to the other end side of the float 10, being configured to approach the lower-surface wall 17 side from a substantially end position (see the dotted line B) toward a side away from the concave portion 40. The end position is above the concave portion 40 and on an opposite side of the opening 26 (see FIG. 5) across the concave portion 40.

The inclined portion 18 is designed as an inclined surface on which the solar panel 50 is easily installed with a predetermined inclination and is provided with grooves 35. By providing the grooves 35 so that the upper-surface wall 16 has a concavo-convex structure, the concavo-convex structure serves as a reinforcing rib to increase the rigidity, and thus the deflection (deformation) can be suppressed.

Further, the grooves 35 are provided on a side of the opening 26 from the inclined portion 18 so as to exist also above the concave portion 40. The lower-surface wall 17 of the concave portion 40 described above is integrated with the upper-surface wall 16 whose rigidity is enhanced, so that the overall rigidity is enhanced to further suppress deflection (deformation).

In addition, since a tip of the grooves 35 on a side of the inclined portion 18 is continuous to the surface of the inclined portion 18 with almost no stepped part, the tip also serves to suppress water accumulation on the float 10.

(Fixing one end side of solar panel)

As described above with reference to FIG. 1, the solar panel 50 is fixed to the float 10 such that the one end portion 51 side of the solar panel 50 is fixed to the support portion 11 by the fixing metal fitting 13 on the one end side.

As shown in FIG. 1, the fixing metal fitting 13 on the one end side is an L-shaped fixing metal fitting comprising a fixing portion 13b and a holding portion 13a. The fixing portion 13b has the other surface fixed to a surface 11a of the support portion 11 facing the one end side of the float 10 in a state in which the support portion 11 is raised. The holding portion 13a is provided to extend from the fixing portion 13b in a direction substantially perpendicular to the fixing portion 13b and has one surface sandwiching the solar panel 50 with the support portion 11.

As shown in FIG. 1, the fixing metal fitting 13 on the one end side is screwed to the support portion 11 with four screws 13c. Screw holes provided on the fixing metal fitting 13 on the one end side for inserting the two screws 13c closer to the center are long holes in the vertical direction.

Therefore, when the fixing metal fitting 13 on the one end side is temporarily fixed to the support portion 11 with the two screws 13c closer to the center, the fixing metal fitting 13 on the one end side can be slid with respect to the support portion 11, so that the distance between the holding portion 13a and the support portion 11 can be changed.

While the fixing metal fitting 13 on the one end side is temporarily fixed to the support portion 11, the fixing metal fitting 13 on the one end side is slid to form a gap for inserting the solar panel 50 between the holding portion 13a of the fixing metal fitting 13 on the one end side and the support portion 11. After the solar panel 50 is inserted into the gap, the fixing metal fitting 13 on the one end side is slid again and the two screws 13c closer to the center are completely tightened, so that the solar panel 50 is sandwiched by the support portion 11 and the holding portion 13a of the fixing metal fitting 13 on the one end side.

Then, after completely tightening the two screws 13c closer to the center, the fixing metal fitting 13 on the one end side is fixed to the support portion 11 with the two outer screws 13c, so that the fixing of the one end portion 51 side of the solar panel 50 (one end side) to the float 10 is completed.

As described above, since the support portion 11 is configured to be hardly affected by the deflection of the main body of the float 10, fixing can be performed without being affected by the deflection, simply by pressing the holding portion 13a of the fixing metal fitting 13 on the one end side toward the solar panel 50 to fix the fixing metal fitting 13 on the one end side to the support portion 11. In addition, the fixing work can be performed while the fixing metal fitting 13 on the one end side is temporarily fixed to the support portion 11, and thus workability is good.

(Fixing the Other End Side of Solar Panel)

As described above with reference to FIG. 2, the other end portion 52 side of the solar panel 50 (the other end side) is fixed to the float 10 by the fixing metal fittings 14 on the other end side.

Figure 8A:
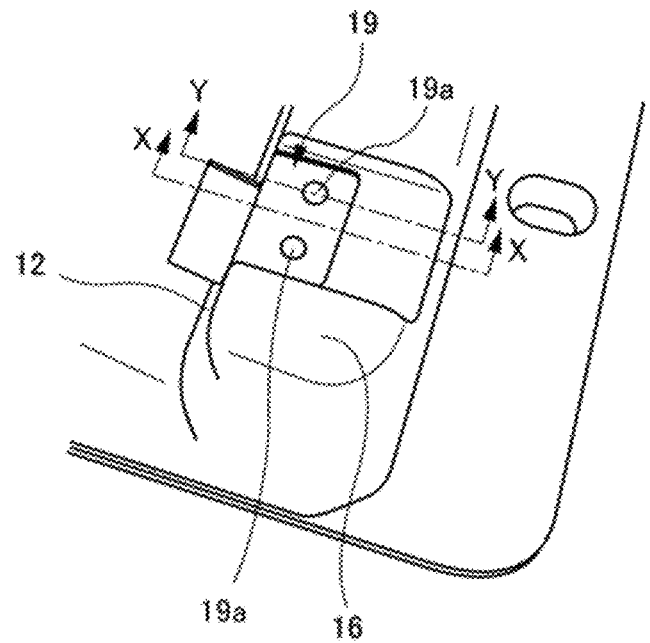
FIG. 8A and FIG. 8B are enlarged views of the periphery of a mounting portion indicated by an arrow C in FIG. 3A, FIG. 3B, FIG. 4A, and FIG. 4B.
Figure 8B:
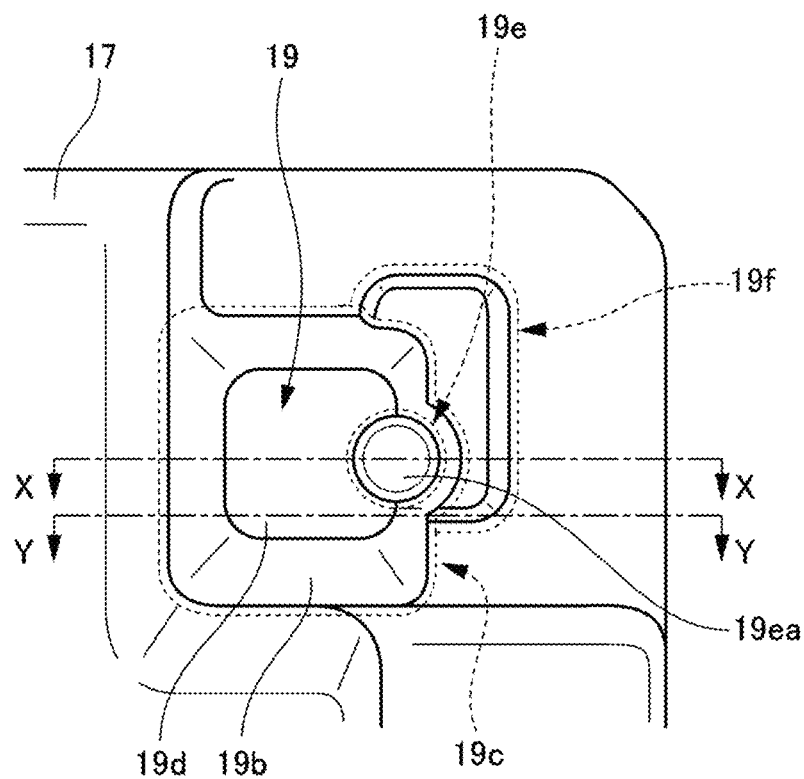

As shown in FIG. 2, FIG. 3A, and FIG. 3B, the float 10 comprises the mounting portion 19 to which the fixing metal fittings 14 on the other end side is attached. FIG. 8A and FIG. 8B are enlarged views of the periphery of the mounting portion 19 indicated by an arrow C in FIG. 3A, FIG. 3B, FIG. 4A, and FIG. 4B. FIG. 8A is an enlarged perspective view of the upper-surface wall 16 side, and FIG. 8B is an enlarged plan view of the lower-surface wall 17 side.

Figure 9A:
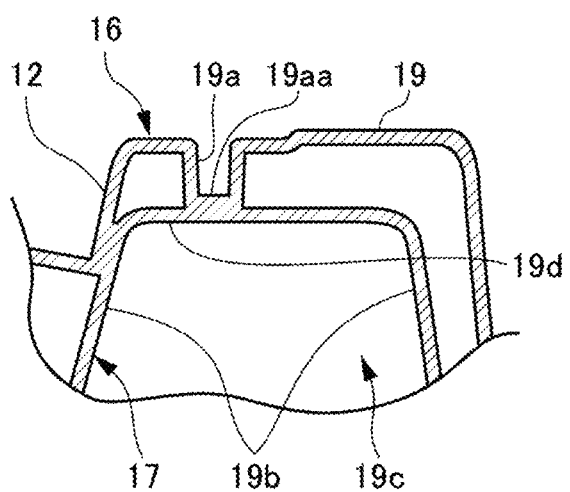
FIG. 9A and FIG. 9B are partial cross-sectional views of the mounting portion according to the embodiment of the present invention.
Figure 9B:
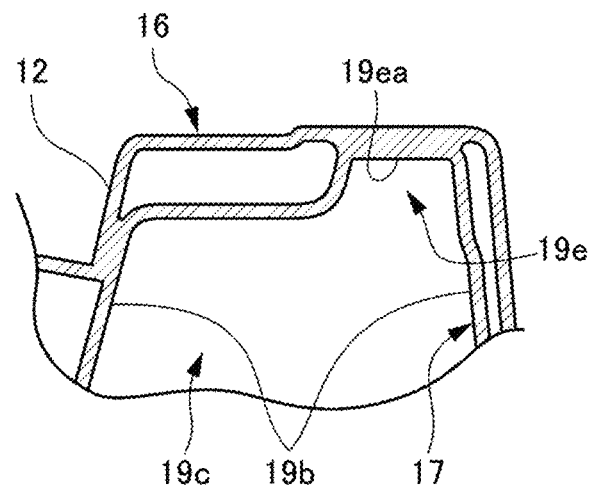

FIG. 9A and FIG. 9B are partial cross-sectional views of the mounting portion 19. FIG. 9A is a cross-sectional view showing a part of a cross section along a Y-Y line in FIG. 8, and FIG. 9B is a cross-sectional view showing a part of a cross section along a X-X line in FIG. 8A and FIG. 8B. In this regard, in FIG. 9A and FIG. 9B, an upper side is the upper-surface wall 16 side, a lower side is the lower-surface wall 17 side, a left side is a center side of the float 10, and a right side is an end side of the float 10.

As shown in FIG. 2, the fixing metal fittings 14 on the other end side comprises a lower metal fitting 14a and an upper metal fitting 14b. One end of the lower metal fitting 14a is disposed on the lower side of the solar panel 50, while one end of the upper metal fitting 14b is disposed on the upper side of the solar panel 50. The end sides of the lower metal fitting 14a and the upper metal fitting 14b are jointly fixed, with the screw 19ac (see FIG. 11), to the mounting portion 19 to which the fixing metal fittings 14 on the other end side is attached.

Since the lower metal fitting 14a and the upper metal fitting 14b are jointly fixed with the screw 19ac (see FIG. 11) in this way, the lower metal fitting 14a and the upper metal fitting 14b can be removed from the float 10 by simply removing the screw 19ac. Moreover, the lower metal fitting 14a and the upper metal fitting 14b can be fixed to the float 10 by simply attaching the screw 19ac.

Therefore, compared with the case where the lower metal fitting 14a and the upper metal fitting 14b are individually fixed to the float 10, the work of attaching and removing the lower metal fitting 14a and the upper metal fitting 14b can be performed easily. Thus, the workability of replacing the solar panel 50 with a new one when a failure occurs can be improved.

Figure 11:
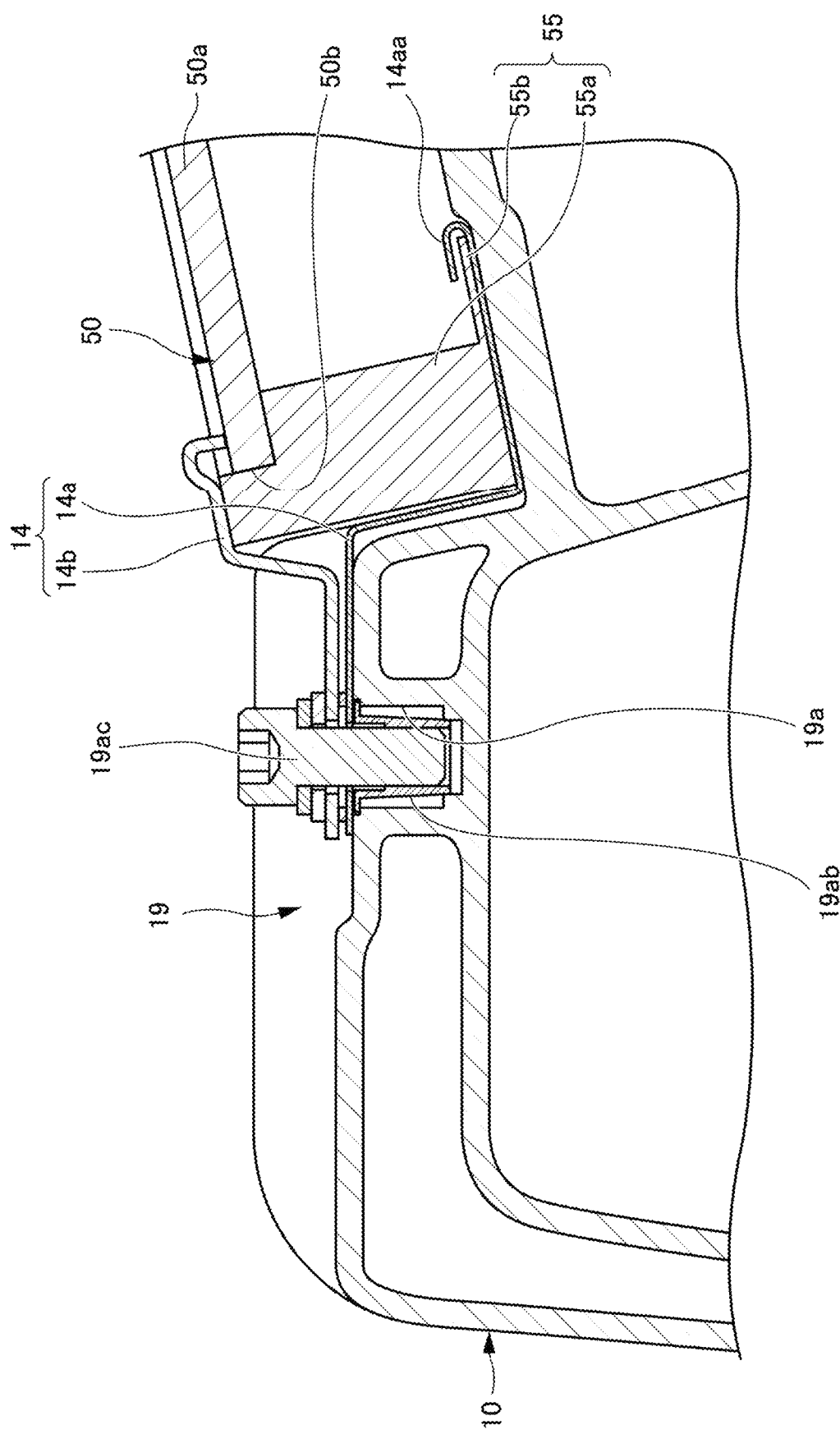
FIG. 11 is a cross-sectional view for explaining a variation of fixing a side of the other end portion of the solar panel according to the embodiment of the present invention.

As shown in FIG. 8A, the mounting portion 19 is provided with a pair of nut housing portions 19a in which a recess nut is accommodated and fixed from the upper-surface wall 16 toward the lower-surface wall 17 side, at a position of the fixing metal fittings 14 on the other end side corresponding to a screw hole for inserting the screw 19ac (see FIG. 11). The pair of nut housing portions 19a is provided apart from each other in a direction along with the receiving portion 12 receiving the other end portion 52 side of the solar panel 50 (see FIG. 2). A rasp-cut nut 19ab (see FIG. 11) is accommodated and fixed in the nut housing portion 19a to which the screw 19ac (see FIG. 11) for screwing the fixing metal fittings 14 on the other end side is screwed.

As shown in FIG. 8A, the mounting portion 19 is provided with a stepped part having the thickness substantially equal to the thickness of the lower metal fitting 14a, at the portion where the lower metal fitting 14a is disposed, so that the lower metal fitting 14a can be arranged without protruding. In this regard, the stepped part is omitted in some other drawings.

Meanwhile, when the position corresponding to the mounting portion 19 is viewed from the lower-surface wall 17 side, a first concave portion 19c comprising a peripheral wall portion 19b recessed from the lower-surface wall 17 toward the upper-surface wall 16 side is provided, as shown in FIG. 8B.

That is, the mounting portion 19 comprises the first concave portion 19c recessed from the lower-surface wall 17 toward the upper-surface wall 16 side and the nut housing portion 19a in which a recess nut is accommodated and fixed from the upper-surface wall 16 toward the lower-surface wall 17 side.

In this regard, as shown in FIG. 8B, a concave portion 19f is provided adjacent to the first concave portion 19c on the other end side of the float 10 (a right side of FIG. 8B) beyond the first concave portion 19c. The concave portion 19f is formed to be slightly shallower than the first concave portion 19c by recessing the lower-surface wall 17 toward the upper-surface wall 16. The concave portion 19f can be used as a handle when the operator grips the float 10 during transportation. The operator can stably grip the float 10, and thus it is easier to perform a transport operation such as transporting the float 10 onto the water surface.

Looking at the cross-sectional structure of this portion, in the nut housing portion 19, a bottom portion 19aa on the lower-surface wall 17 side is integrated with a bottom portion 19d on the upper-surface wall 16 side of the first concave portion 19c, as shown in FIG. 9A. A manufacturing method for realizing such integration is not particularly limited and can be realized, for example, by the shape of a mold for blow molding.

Therefore, since the mounting portion 19 is provided with the first concave portion 19c that functions as a reinforcing rib, and since the nut housing portion 19a for accommodating the rasp-cut nut 19ab (see FIG. 11) is integrated with the lower-surface wall 17, the mounting portion 19 is hardly affected by the deflection. The nut housing portion 19a to be accommodated and fixed is thus not detached from the nut housing portion 19a due to the deformation of the nut housing portion 19a.

FIG. 9B shows a cross section of the position of the pair of the nut housing portions 19a (the position of the X-X line in FIG. 8A and FIG. 8B) in the direction along the receiving portion 12 receiving the other end portion 52 side of the solar panel 50 (see FIG. 2). As shown in FIG. 9B, a second concave portion 19e recessed toward the upper-surface wall 16 is provided the second concave portion 19e on the other end side of a line connecting the pair of the nut housing portions 19a (see FIG. 8A and FIG. 9A). A bottom portion 19ea on the upper-surface wall 16 side of the second concave portion 19e is integrated with the upper-surface wall 16, so that the rigidity is further enhanced.

In addition, as shown in FIG. 9, the receiving portion 12 receiving the other end portion 52 side of the solar panel 50 (the other end side) has a portion in which the upper-surface wall 16 and the lower-surface wall 17 are integrated. Specifically, as shown in FIG. 3, the receiving portion 12 is formed by heightening the upper-surface wall 16 from an end portion on the other end side of the inclined portion 18, in a direction away from the lower-surface wall 17. That is, the receiving portion 12 is formed as a raised wall portion. As shown in FIG. 9, a peripheral wall portion 19b of the first concave portion 19c is integrated with the raised wall portion at the position of the raised wall portion serving as the receiving portion 12.

Consequently, the rigidity of the receiving portion 12 receiving the other end portion 52 side of the solar panel 50 (the other end side) is increased. Even if gas expansion or contraction occurs in a portion with a large amount of gas (such as air) closer to the center of the float 10 than the receiving portion 12, the associated deflection (deformation) does not affect the mounting portion 19 located outside the receiving portion 12.

In this way, the mounting portion 19 is not only configured to have the high rigidity to suppress the deflection (deformation) but is also configured to be hardly affected by the deflection (deformation) in other portions of the float 10. The rasp-cut nut 19ab (see FIG. 11) accommodated and fixed in the nut housing portion 19a is thus not detached from the nut housing portion 19a due to the deformation of the nut housing portion 19a provided in the mounting portion 19.

Meanwhile, as described above, since the fixing metal fittings 14 on the other end side is fixed to the rasp-cut nut 19ab (see FIG. 11) provided in the mounting portion 19 hardly affected by the deflection, the fixing is stable. In addition, since the fixing metal fittings 14 on the other end side is fixed by sandwiching the solar panel from the upper and lower sides between the lower metal fitting 14a and the upper metal fitting 14b, the fixation can be more stable.

For example, when a strong wind blows between the solar panel 50 and the float 10, a strong force is applied in the direction of lifting the solar panel 50 upward. If the solar panel 50 is only fixed only by pressing from the upper side, the solar panel 50 may be displaced. On the other hand, in the present embodiment, the upper and lower sides of the solar panel 50 can be firmly fixed, thereby suppressing such displacement to realize stable fixing.

More specifically, as can be seen from FIG. 1, since the solar panel 50 is inclined and disposed on the float 10, and the one end portion 51 side of the solar panel 50 is farther from the float 10 than the other end portion 52, wind enters between the solar panel 50 and the float 10 from the one end portion 51 side of the solar panel 50.

Meanwhile, the other end portion 52 side of the solar panel 50 is disposed on the float 10 so that there is almost no gap between the solar panel 50 the float 10. Therefore, wind entering between the solar panel 50 and the float 10 cannot escape and pushes up the other end portion 52 side of the solar panel 50, causing the fixing metal fittings 14 on the other end side to be stressed upward.

The upper metal fitting 14b (see FIG. 2) of the fixing metal fittings 14 on the other end side is not fixed to the solar panel 50 by screws or the like because a glass part 50a of the solar panel 50 (see FIG. 2) is positioned on the upper side of the solar panel 50. The upper metal fitting 14b functions as a means for sandwiching the solar panel 50 with the lower metal fitting 14a so as to press the solar panel 50 toward the lower metal fitting 14a (see FIG. 2) of the fixing metal fittings 14 on the other end side.

Therefore, when the gap between the upper metal fitting 14b and the lower metal fitting 14a is widened by the force of the solar panel 50 moving upward due to the stress of the wind or the like pushing up the solar panel 50 upward, it becomes difficult to stably fix the solar panel 50 with the upper metal fitting 14b.

Meanwhile, since the lower metal fitting 14a can be fixed to the solar panel 50 by being screwed to the base 54 provided on the solar panel 50, the solar panel 50 remains stably fixed even if the solar panel 50 moves upward. In this way, in the present embodiment, stable fixing of the solar panel 50 can be ensured.

As shown in FIG. 2, in the present embodiment, the other end portion 52 side of the solar panel 50 is fixed to the float 10 at both ends of the float 10 in the direction along the receiving portion 12 receiving the other end portion 52 (the other end side) of the solar panel 50, respectively by the fixing metal fittings 14 on the other end side.

In this way, stable fixing without wobbling from side to side can be realized by fixing at both ends, while the center may be also fixed for more stable fixing.

The float 10 described above is not used alone, and a large number of floats 10 are connected by the passage joint 60 serving as a passage during maintenance to form the collective float unit 120 (see FIG. 22), as shown in FIG. 10.

Specifically, as shown in FIG. 1, the float 10 is formed with a pair of engaging protrusions 61 engaging with the passage joint 60 (see FIG. 10), on a side of a first end portion 10a of the float 10 close to the support portion 1. The passage joint 60 has a concave portion (not shown) engaging with the engaging protrusion 61 on the lower-surface side.

The float 10 comprises bolt holes 62a through which a connection bolt 62 for connecting the passage joints 60 is passed, on a second end portion 10b side of the float 10 close to the receiving portion 12 receiving the other end portion 52 side of the solar panel 50 (the other end side). Further, when a portion on the second end portion 10b side and a portion on the first end portion 10a side overlap, as shown in FIG. 10, bolt holes 62b (see FIG. 1) corresponding to the bolt holes 62a on the second end portion 10b side are provided on the first end portion 10a side of the float 10. As shown in FIG. 10, the passage joint 60 comprises bolt holes 63 corresponding to the bolt holes 62a and the bolt holes 62b.

While the passage joint 60 is engaged with the engaging protrusion 61 of one float 10, the bolt holes 62b (see FIG. 1) on the first end portion 10a side of the one float 10, the bolt holes 62a on the second end portion 10b side of the other float 10, and the bolt holes 63 of the passage joint 60 are connected with the connection bolts 62. In this way, a large number of the floats 10 are connected via the passage joint 60.

As shown in FIG. 10, a pair of passage joints 60 is symmetrically arranged with respect to a portion connecting one float 10 and the other float 10 in a direction (see the Z axis) perpendicular to the arrangement direction of the floats 10 (see the W axis). One end 60a of one passage joint 60 (see 60A) is connected to the one float 10 and the other float 10 described above, while the other end 60b of the passage joint 60 is connected to a connecting portion of other floats 10. On the other hand, one end 60b of the other passage joint 60 (see 60B) of the pair is connected to the one float 10 and the other float 10 described above, while the other end 60a of the passage joint 60 (see 60B) is connected to a connecting portion of other floats 10. In this way, the floats 10 are connected one after another via the passage joint 60 to configure the collective float unit 120 (see FIG. 22).

Since a person walks on the passage joint 60 during maintenance or the like, the float 10 may be deformed by receiving the load of the person if the rigidity of the float 10 is low.

However, as described above, since the rigidity of the float 10, as well as the mounting portion 19 is enhanced in the float 10 of the present embodiment, the deflection (deformation) is less likely to occur even when subjected to such a load. Further, since the float 10 is not easily shaken when the person passes on the passage joint 60, the workability is improved (for example, easier to walk thereon).

Further, the mounting portion 19 with the enhanced rigidity is less likely to be deformed even when subjected to such a load. Since the deformation, due to by work such as maintenance, of the mounting portion 19 to which the fixing metal fittings 14 on the other end side is fixed is avoided, and since the detachment of the rasp-cut nut 19ab (see FIG. 11) provided in the mounting portion 19 is suppressed, the solar panel 50 can be stably fixed.

(Variation of Fixing the Other End Side of Solar Panel)

The aspect in which the lower metal fitting 14a (see FIG. 2) of the fixing metal fittings 14 on the other end side is fixed by a screw to the base 54 (see FIG. 2) provided on the solar panel 50 was described above. However, since it is necessary to fix the lower metal fitting 14a to the base 54 with a screw, there is a problem that the workability is not good in fixing the lower metal fitting 14a to a surface of the base 54 located on the lower side of the solar panel 50 when the fixing is performed on the float 10 arranged on the water surface. In this regard, the workability can be further improved in the following aspect.

FIG. 11 is a cross-sectional view for explaining a variation of fixing the other end portion 52 side of the solar panel 50 (the other end side). More specifically, FIG. 11 is a partial cross-sectional view of the periphery of the mounting portion 19, across one nut housing portion 19a of a pair of nut housing portions 19a (see FIG. 3B) accommodating the rasp-cut nut 19ab of the mounting portion 19 to which the fixing metal fittings 14 on the other end side is attached, showing a state in which the solar panel 50 is fixed to the float 10 with the fixing metal fittings 14 on the other end side.

Here, in this variation, the configuration of the float 10 is different only in the configuration of the lower metal fitting 14a of the fixing metal fittings 14 on the other end side, and the other configurations are the same as those described above.

As shown in FIG. 11, the solar panel 50 is provided with a frame 55 comprising a panel receiving portion 55a and an engagement portion 55b. The panel receiving portion 55a is provided along an outer periphery 50b of the glass part 50a of the solar panel 50 and receives the glass part 50a. The engagement portion 55b extends from an end portion of the panel receiving portion 55a located on the opposite side of the glass part 50a of the solar panel 50 to the inside of the solar panel 50 substantially parallel to the glass part 50a.

Meanwhile, the lower metal fitting 14a of the fixing metal fittings 14 on the other end side is provided, on the one end side, with a U-shaped hook portion 14aa formed by folding the one end side upward. Therefore, the lower metal fitting 14a is configured to engage with the solar panel 50 by engaging the hook portion 14aa with the engagement portion 55b provided on the solar panel 50 and engaged with the hook portion 14aa. When the lower metal fitting 14a is engaged with the solar panel 50 in this way, the lower metal fitting 14a can be prevented from coming off even if the solar panel 50 moves upward due to wind.

Since it is only necessary to engage the hook portion 14aa with the engagement portion 55b, without screwing in this variation, the workability in attaching the lower metal fitting 14a to the solar panel 50 is improved. In this regard, the structure of the solar panel 50 (the engagement portion 55b) corresponding the hook portion 14aa is provided to the frame 55 on the solar panel 50 in this variation, but the base 54 described above may be provided with such a structure (the engagement portion 55b).

Although the configuration for installing the solar panel 50 on the float 10 was described above, the specific example mentioned above is merely an example. For example, in the above description, the concave portion 40 comprises the truncated cone-shaped recesses 41, 42, 43 that taper toward the upper-surface wall 16, at both ends and the center in the direction along the support portion 11; and the groove-shaped recesses 44, 45 connecting the truncated cone-shaped recesses 41, 42, 43 in the direction along the support portion 11 and having a width narrowing toward the upper-surface wall 16. This is merely an example of a suitable concave portion 40, and the configuration thereof is not limited thereto. For example, the shape of a part of the concave portion 40 may be changed.

Further, as described above, the width of the concave portion 40 in the direction along the support portion 11 (Z-axis direction) is substantially same as the width of the support portion 11, but a plurality of concave portions having a smaller width than the support portion 11 may be arranged in the direction along the support portion 11. In addition, as described above, a part of the bottom of the concave portion 40 formed by the lower-surface wall 17 is integrated with the upper-surface wall 16, but the whole may be integrated.

Further, while the base 53 and the base 54 are provided on a part of the outer periphery 50b of the solar panel 50, the base may be configured similarly to the frame 55, covering the entire outer periphery 50b.

(Configuration for Anchoring Floats)

Next, a configuration is described in the case where the solar panel 50 is not installed, and the floats are used as a part of a passage and are anchored with an anchoring member such as an anchor rope.

The float 10 of the present embodiment comprises the annular float portion 30 having the opening 26, as described above. Specifically, as described above, the opening 26 is configured by combining the upper-surface wall 16 and the lower-surface wall 17 corresponding to the opening 26 and is formed by raising the support portion 11 supporting the one end portion 51 side of the solar panel 50 (one end side) toward the upper-surface wall 16 side so as to open the opening 26, using the side 24 continuous to the inner wall surface on the one end side of the opening 26 as the hinge.

As shown in FIG. 6, when the support portion 11 is raised to form the opening 26, the region F on the lower-surface wall 17 side at the center of the float 10 can be accessed from the opening 26.

The region F at the center of the float 10 is almost at the center of gravity, being located around the intersection when the diagonal line is drawn from the four corners of the rectangular float 10. If the anchoring member such as an anchor rope is fixed at the center of gravity, the holding force of the anchoring member pulling the float 10 is applied to the center of gravity when the float 10 is about to move due to a strong wind. Consequently, the float 10 is not tilted, and the position thereof is stable.

Further, if an operator rides near the edge around the float 10, the float 10 may tilt and the operator may fall into the water. If the anchoring member, such as an anchor rope, cannot be fixed to the float 10 unless the operator gets near the edge around the float 10, the workability is extremely poor. In this regard, it is also possible to work by approaching the edge around the float 10 by ship in order not to fall into the water, but even in this case, the workability is not good because the work needs to be performed from the ship.

On the other hand, since the region F at the center of the float 10 is at the center of gravity with high posture stability, as described above, the balance of the float 10 is not easily lost even if the operator is on the vicinity.

Therefore, if the anchoring member such as an anchor rope is fixed to the region F at the center of the float 10, the balance of the float 10 is not lost during the operation of fixing the anchoring member such as an anchor rope to the float 10. The anchoring member such as an anchor rope is easily fixed to the float 10.

An anchoring portion 70, which is specifically described below, for connecting the anchoring member such as an anchor rope is provided in the region F substantially at the center of the float 10. As shown in FIG. 5, the anchoring portion 70 is provided in the vicinity of the opening 26 (near the other end side), more specifically, adjacent to an edge 26a of the opening portion 26 facing the raised support portion 11 across the opening 26.

The anchoring portion 70 is formed by recessing the upper-surface wall 16 toward the lower-surface wall 17, as shown in FIG. 5, and also by recessing the lower-surface wall 17 toward the upper-surface wall 16, as shown in FIG. 6. That is, the anchoring portion 70 is configured by combining the upper-surface wall 16 and the lower-surface wall 17 to enhance the rigidity.

Figure 12A:
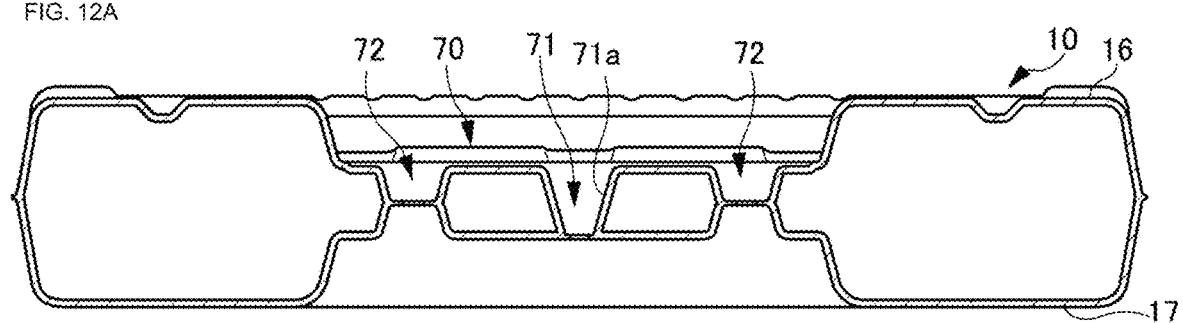
FIG. 12A, FIG. 12B, and FIG. 12C are cross-sectional views taken along a D-D line in FIG. 4B.
Figure 12B:
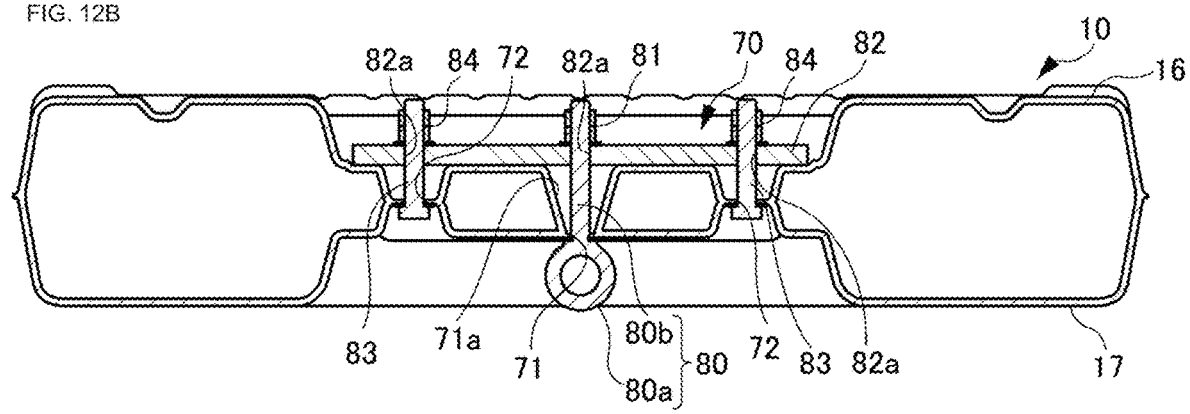
Figure 12C:
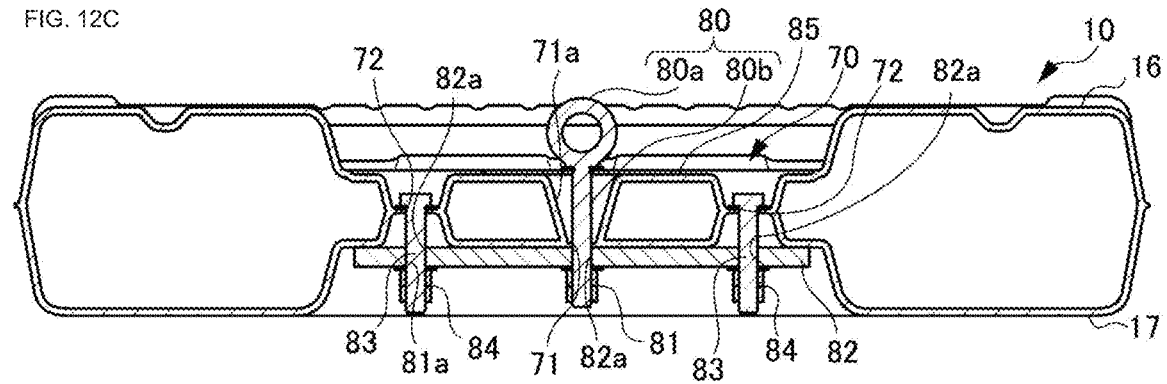

FIG. 12A, FIG. 12B, and FIG. 12C are cross-sectional views taken along a D-D line in FIG. 3B and FIG. 4B. FIG. 12A shows a state in which components for fixing the anchoring member such as an eye bolt 80 are not attached, FIG. 12B shows a state in which the components for fixing the anchoring member, for example, the eye bolt 80, are attached so that a ring 80a of the eye bolt 80 is located on the lower-surface wall 17 side, and FIG. 12C shows a state in which the components for fixing the anchoring member, for example, the eye bolt 80, are attached so that the ring 80a of the eye bolt 80 is located on the upper-surface wall 16 side.

As shown in FIG. 12B and FIG. 12C, the float 10 comprises the eye bolt 80 and a nut 81, as accessory parts. The eye bolt 80 has the ring 80a for fixing the anchoring member, such as an anchor rope. The nut 81 is screwed into a screwing groove of the eye bolt 80 having a main body portion 80b that extends from the 80a and is provided with the screwing groove at the tip thereof. Correspondingly, the anchoring portion 70 has a first through hole 71 through which the main body portion 80b of the eye bolt 80 is passed.

Further, as shown in FIG. 12B and FIG. 12C, the float 10 comprises a first fixing plate 82, a pair of first bolts 83, and a pair of first nuts 84, as accessory parts. The first fixing plate 82 are disposed on the upper-surface wall 16 side or the lower-surface wall 17 side of the anchoring portion 70. The pair of first bolts 83 is configured to fix the first fixing plate 82 to the anchoring part 70. The pair of first nuts 84 are screwed to the first bolts 83. Correspondingly, the anchoring part 70 comprises a pair of second through holes 72 that are provided with the first through hole 71 interposed therebetween and through which the first bolts 83.

The first fixing plate 82 has three through holes 82a provided to correspond to the first through hole 71 and the second through holes 72 and through which the main body portion 80b of the eye bolt 80 and the first bolts 83 are passed.

As shown in FIG. 3B, FIG. 4B, FIG. 5 and FIG. 6, the first through hole 71 and the second through holes 72 are provided in the anchoring portion 70 and in the direction along the edge 26a on the other end side of the opening 26 (see FIG. 5).

A configuration for connecting the anchoring member, such as an anchor rope, configured using such accessory parts is described.

In FIG. 12B, an anchor is submerged in the bottom of a pond or lake, one end of the anchoring member, such as an anchor rope, is connected to this anchor, and the other end of the anchoring member is used to anchor the float 10. The ring 80a of the eye bolt 80 is thus disposed so as to be positioned on the lower-surface wall 17 side (water surface side).

In this case, when the collective float unit 120 (see FIG. 22) is about to move due to wind, the force of the anchoring member, such as an anchor rope, holding the float 10 works as a force that pulls the eye bolt 80 from the lower-surface wall 17 of the float 10 in the direction opposite to the upper-surface wall 16 (the lower side in the drawing).

At this time, if stress concentrates at a local position of the float 10 where the eye bolt 80 is located, the resin-made float 10 may be damaged. For this reason, in the present embodiment, as shown in FIG. 12B, the thick first fixing plate 82 is provided on the upper-surface wall 16 side of the anchoring portion 70. After the first fixing plate 82 is disposed so that the main body portion 80b of the eye bolt 80 penetrates the first fixing plate 82, the first fixing plate 82 is fixed on the upper-surface wall 16 of the anchoring portion 70 by screwing the nut 81 into the tip of the main body portion 80b of the eye bolt 80 penetrating the first fixing plate 82, thereby distributing the pulling force to the entire anchoring portion 70 through the first fixing plate 82.

The first fixing plate 82 is preferably thick and also has a high strength as a material because it directly receives the pulling force of the anchoring member, such as an anchor rope. For example, a metal plate and the like can be used suitably used. Here, the first fixing plate 82 may be provided as necessary and is not necessarily provided.

Consequently, since the pulling force of the anchoring member, such as an anchor rope, hardly concentrates on a local position of the anchoring portion 70, the anchoring portion 70 can be prevented from being damaged.

As in the present embodiment, the first fixing plate 82 can be stably fixed by being fixed to the anchoring portion 70 with the pair of first bolts 83 and the first nuts 84 with the eye bolt 80 interposed therebetween.

Meanwhile, there is a case where one end of the anchoring member such as an anchor rope is not connected to the anchor at the bottom of a pond or a lake but is fixed to the land around the pond or the lake. It is more convenient in this case that the ring 80a of the eye bolt 80 is located on the upper-surface wall 16 side of the float 10.

When the ring 80a of the eye bolt 80 is installed so as to be positioned on the upper-surface wall 16 side, the anchoring member such as an anchor rope will apply the force to hold the float 10 in the opposite direction. In this case, as shown in FIG. 12C, the first fixing plate 82 may be installed on the lower-surface wall 17 side of the anchoring portion 70.

In the present embodiment, the first through-hole 71 (through which the main body portion 80b of the eye bolt 80 is passed provided in the anchoring portion 70 has a taper portion 71a recessed in a shape that tapers the upper-surface wall 16 toward the lower-surface wall 17, thereby having a reinforcing rib structure.

As shown in FIG. 12C, the second fixing plate 85 is provided with a second fixing plate 85 as an accessory part on the upper-surface wall 16 of the anchoring portion 70 so as to cover the taper portion 71a, so that the ring 80a of the eye bolt 80 does not fall into the taper portion 71a when the first fixing plate 82 is disposed on the lower-surface wall 17 side.

In this regard, when the anchoring member such as an anchor rope holds the float 10, the force is not applied to the second fixing plate 85 so strongly. Thus, the second fixing plate 85 does not have to be as thick as the first fixing plate 82, as shown in FIG. 12C.

Since the second fixing plate 85 needs to be configured for passing through the main body 80b of the eye bolt 80, the second fixing plate 85 has a through hole through which the main body portion 80b of the eye bolt 80 is passed, at a position corresponding to the first through hole 71.

In the above description, the anchoring member such as an anchor rope fixed in the water and to the land has been described independently for convenience of explanation, but the collective float unit 120 (see FIG. 22) in which a large number (a plurality) of floats 10 are assembled may include both of the anchoring members such as an anchor rope fixed in the water and on the land.

That is, in the collective float unit 120 (see FIG. 22), the anchoring member such as an anchor rope is connected to a plurality of points so that the unit can be stably anchored. Thus, it is needless to say that some of the points may be connected to the anchoring member such as an anchor rope fixed to the anchor in the water, while the remaining points may be connected to the anchoring member such as an anchor rope fixed to the land.

Here, for example, in Patent Literature 1, fixing ears are provided at the four corners of the float, and fixing ears are also provided at the four corners of a connecting element. These fixing ears are connected by fastening pins to assemble the floats. In this case, if the floats are assembled so as to form a rectangular outer shape, the fixing ears are left only at the four corners of the assembled floats, and thus only four anchor ropes can be connected. If the anchoring member such as an anchor rope is connected with the connection structure of the float, the anchoring member such as an anchor rope cannot be connected to the connection structure already used.

On the other hand, in the present embodiment, the anchoring portion 70 for connecting the anchoring member such as an anchor rope is provided separately from the connection structure for assembling the floats 10. Thus, when the floats 10 are assembled to form the collective float unit 120 (see FIG. 20), the anchoring member, such as an anchor rope, can be connected to any float 10 used for a passage or the like, and the degree of freedom of installation of the anchor rope is extremely high.

In Patent Literature 1, as described above, the anchor rope may be connected only at four points, and each anchor rope receives 25% of the total force when the assembled float portion is about to move. If even one anchor rope breaks, 33% of the total force applied when the assembled float portion is about to move will be applied to each remaining anchor rope. Thus, the probability of breakage of the anchor rope significantly increases, and anchoring stability decreases.

In the float 10 of the present embodiment, the anchoring member, such as an anchor rope, can be connected to any float 10 used for a passage or the like, and thus the number of the anchoring members, such as anchor ropes, for anchoring the collective float unit 120 (see FIG. 22) can be greatly increased. Consequently, the force applied to each anchoring member can be reduced, thereby greatly reducing the probability that the anchoring members such as anchor ropes are damaged and preventing, even if any of the anchoring members is damaged, a large force from being applied to the remaining anchoring members. Therefore, high anchoring stability of the collective float unit 120 (see FIG. 22) can be obtained.

This means that even if the weight of the anchor connected to one anchoring member such as an anchor rope is reduced, the collective float unit can be anchored sufficiently by increasing the number of anchoring members such as an anchor rope connected to the collective float unit. As a result of reducing the weight of the anchor, the anchor can be easily lifted when the use of the solar panel 50 is finished and the collective float unit needs to be removed.

Since the force applied to one anchoring point can be reduced also in the anchoring portion 70 of the float 10 where the anchoring member such as an anchor rope is connected, the probability of damaging the anchoring portion 70 can be also greatly reduced, in the same manner that the probability of damaging the anchoring member such as an anchor rope can be reduced.

In addition, the anchoring portion 70 is provided on the center side of the float 10 at a position where the float 10 can maintain a stable posture without tilting even when the anchoring member such as an anchor rope applies a force to hold the float 10. The float 10 can be thus anchored with good posture stability.

When the anchoring portion 70 is provided on the center side of the float 10, it is difficult to connect the anchoring member such as an anchor rope to the mooring portion 70, without the opening 26 for accessing there.

Since the opening 26 exists in the vicinity of the anchoring portion 70 in the present embodiment, the lower-surface wall 17 side of the anchoring portion 70 can be easily accessed. Even if the ring 80a of the eye bolt 80 is provided on the lower-surface wall 17 side, it is possible to easily connect the anchoring member, such as an anchor rope, to the ring 80a.

Further, even at the center side of the collective float unit 120 (see FIG. 22), the anchoring member such as an anchor rope can be easily connected to the float 10 by providing the float 10 on which the solar panel 50 is not installed.

Therefore, the collective float unit 120 (see FIG. 22) configured with the floats 10 of the present embodiment can be anchored with the anchoring member, such as an anchor rope, at the center side of the collective float unit 120, as well as around the collective float unit 120.

The float 10 of the present embodiment can also be used as a passage or the like. The opening 26 is preferably closed in such a usage mode, while the opening is preferably opened when accessing the lower-surface wall 17 side of the anchoring portion 70. In this regard, as described below, if the opening 26 is configured to be easily opened and closed, the opening 26 can be closed during normal operation to improve the convenience of the passage and can be easily opened when inspecting the anchoring member such as an anchor rope, and thus the inspection work can be easily performed.

Therefore, in the present embodiment, the opening 26 is configured to be easily closed and opened. The configuration for easily closing and opening the opening 26 is described below.

Figure 13:
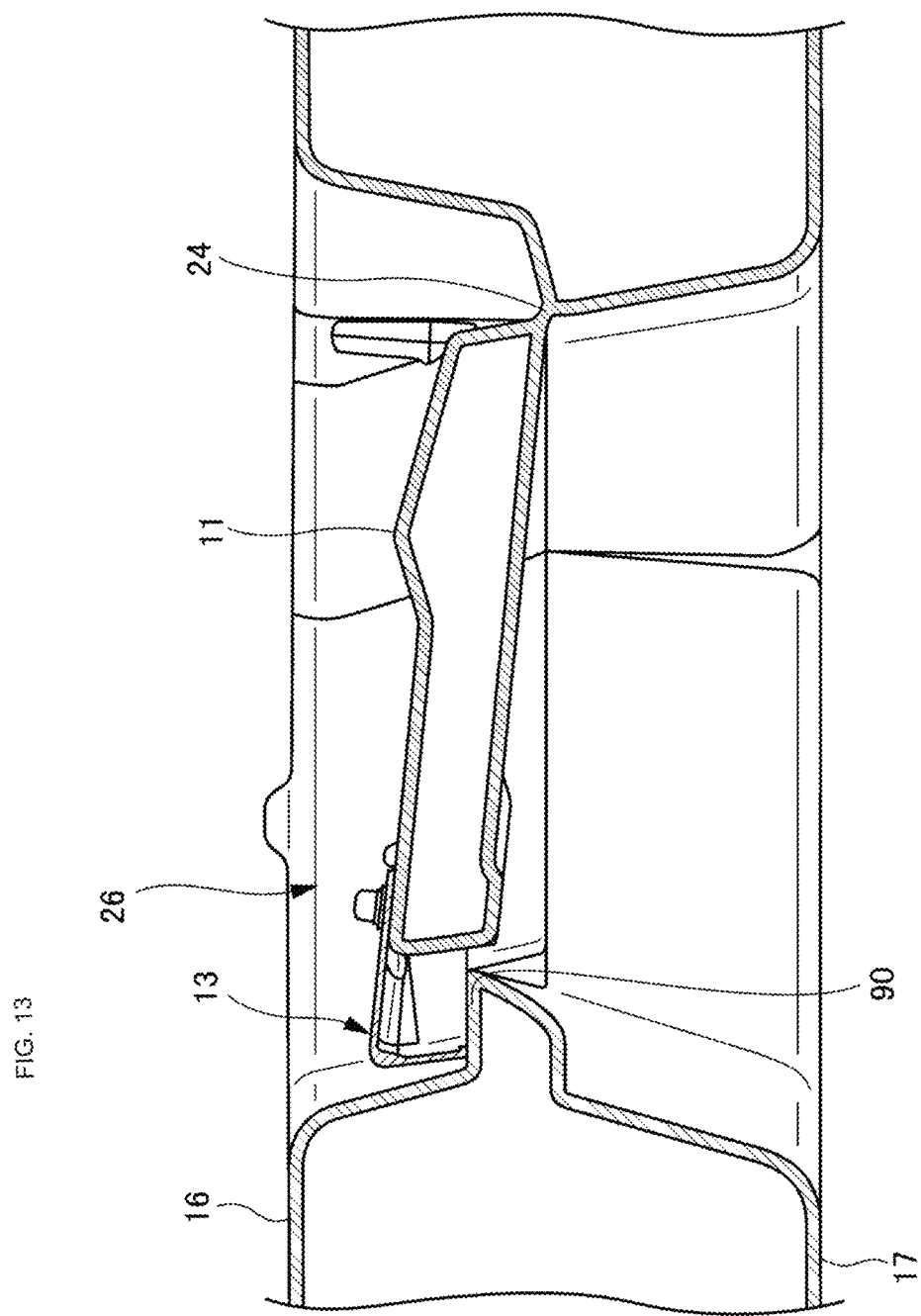
FIG. 13 is a cross-sectional view for explaining an opening and closing mechanism of an opening according to the embodiment of the present invention.

FIG. 13 is a cross-sectional view for explaining an opening and closing mechanism of the opening 26, specifically a cross-sectional view taken along an E-E line in FIG. 10. While FIG. 10 shows a state in which the fixing metal fitting 13 on the one end side is not attached to the support portion 11, FIG. 13 shows a state in which the fixing metal fitting 13 on the one end side is attached to the support portion 11.

As described above, since the opening 26 is formed by raising the support portion 11, the inner shape of the opening 26 and the outer shape of the support portion 11 have substantially the same shape. Consequently, even if the opening 26 is closed by the support portion 11, the support portion 11 easily moves toward the lower-surface wall 17 side if a force pushing the support portion 11 toward the lower-surface wall 17 side is applied.

As shown in FIG. 10 and FIG. 13, stopper portions 90 are provided in the vicinity of both ends of the edge 26a (see FIG. 5) on the end side (a side facing the side 24 serving as a hinge) of the opening 26 when the opening 26 (see FIG. 5) is opened by raising the support portion 11, using the side 24 as the hinge. The stopper portion 90 receives a part of the fixing metal fitting 13 on the one end side when the support portion 11 is tilted so as to cover the opening 26 while the fixing metal fitting 13 on the one end side is attached to the support portion 11.

By providing the float 10 with the stopper portions 90, the support portion 11 can be prevented from moving toward the lower-surface wall 17 even when a force is applied to push the support portion 11 toward the lower-surface wall 17 when the opening 26 is closed with the support portion 11.

The fixing metal fitting 13 on the one end side is an accessory part for fixing the solar panel 50. By using the accessory part, there is no need to add new components.

As shown in FIG. 1, a finger insertion recess 91 is provided, on the surface 11a of the support portion 11 facing the one end side while the support portion 11 is raised on the upper-surface wall 16 side, for inserting a finger between the fixing portion 13b of the fixing metal fitting 13 on the one end side and the support portion 11.

When the support portion 11 is raised to the upper-surface wall 16 side from a state in which the support portion 11 is tilted so as to close the opening 26, a finger is inserted between the fixing portion 13b and the support portion 11 to pull and raise the support portion 11 to the upper-surface wall 16 side, and thus the opening 26 can be easily opened.

The aspect in which the anchoring member such as an anchor rope is connected to the float 10 where the solar panel 50 is not installed is described above. However, even when the solar panel 50 is installed, the anchoring member such as an anchor rope can be connected although the connection work may be more difficult.

Therefore, the anchoring member such as an anchor rope may be connected, as necessary, to the float 10 where the solar panel 50 is installed.

Figure 14:
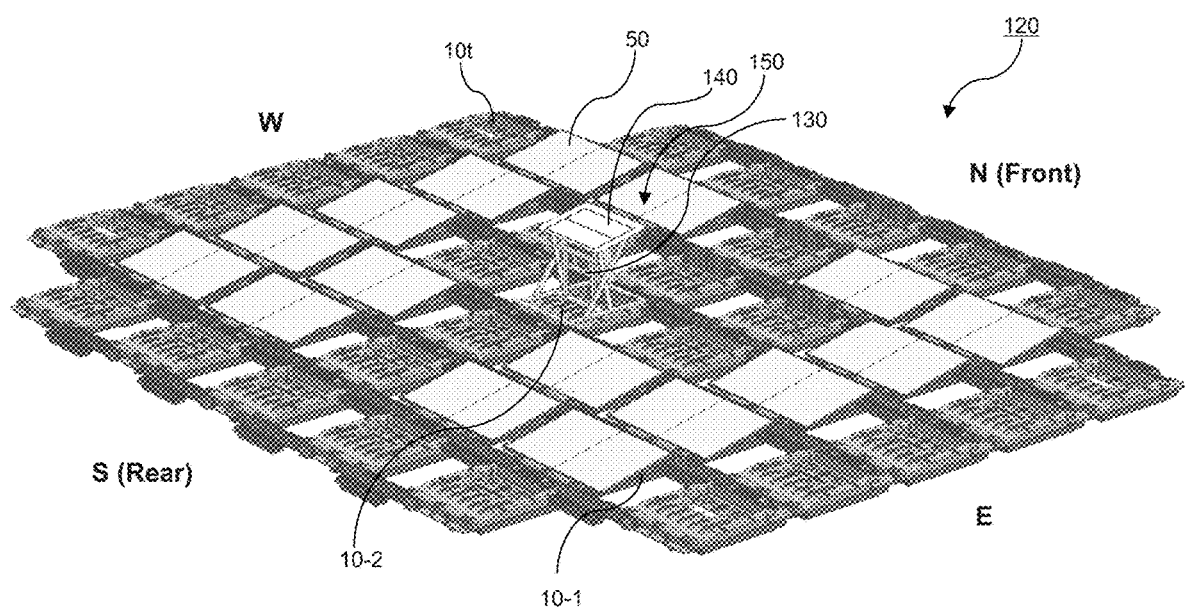
FIG. 14 is a perspective view showing a collective float unit according to a first embodiment of the present invention.

FIG. 14 is a perspective view showing the collective float unit 120 according to the present embodiment. As shown in FIG. 14, the collective float unit 120 is formed by connecting a plurality of floats 10 to each other. The substantially rectangular collective float unit 120 is shown here, including a total of 45 sheets of the floats 10 excluding four sheets at the four corners from seven sheets in the north-south direction and seven sheets in the east-west direction. The collective float unit 120 is arranged so that the front of the float 10 faces the north side. Accordingly, the north side is referred to as the front side of the collective float unit 120, and the south side is referred to as the rear side of the collective float unit 120. Here, the arrangement and the number of the floats 10 are merely examples and are not limited thereto. In practice, hundreds or thousands of floats 10 are connected via the passage joint 60, and an enormous number of solar panels 50 are installed.

The 45 floats 10 according to the present embodiment include 16 first floats 10-1 on which the solar panel 50 is installed, one second float 10-2 on which a power conditioner 130 (power conditioner: see FIG. 15 to FIG. 20) is installed and the solar panel 50 is not installed, and third floats 10t on which neither the solar panel 50 nor the power conditioner 130 is installed. The same float 10 is used for these floats. Here, the power conditioner 130 is a device that converts DC power generated by solar power generation through the solar panel 50 into AC power.

As shown in FIG. 14, the second float 10-2 is located substantially at the center of the collective float unit 120. That is, in the present embodiment, the power conditioner 130 is located substantially at the center of the collective float unit 120. The four floats 10 adjacent to the second float 10-2 in the north-south direction and the east-west direction are the third floats 10t. Most of the floats 10 located near the third floats 10t are the first floats. In summary, the second float 10-2 is arranged to be indirectly surrounded by the first floats 10-1 via the third floats 10-3. That is, the power conditioner 130 is configured to be surrounded by a plurality of solar panels 50 at a certain distance. Such a configuration prevents an excessive load from being applied to one float 10, thereby providing the power conditioner 130 on the water while avoiding sinking below the water surface.

(Installation of Power Conditioner)

Figure 15:
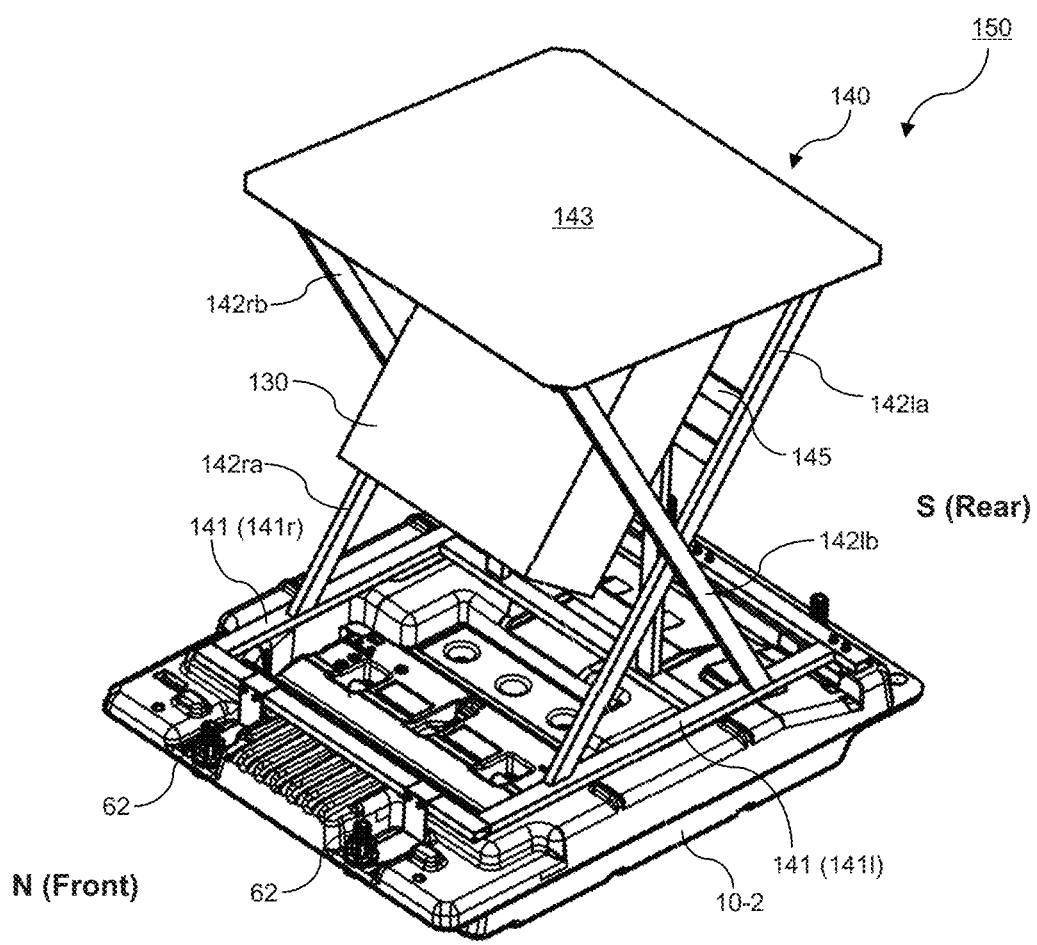
FIG. 15 is a perspective view showing an aspect in which a mount is provided on a second float according to the first embodiment of the present invention and a power conditioner is installed thereon (power conditioner unit).
Figure 16:
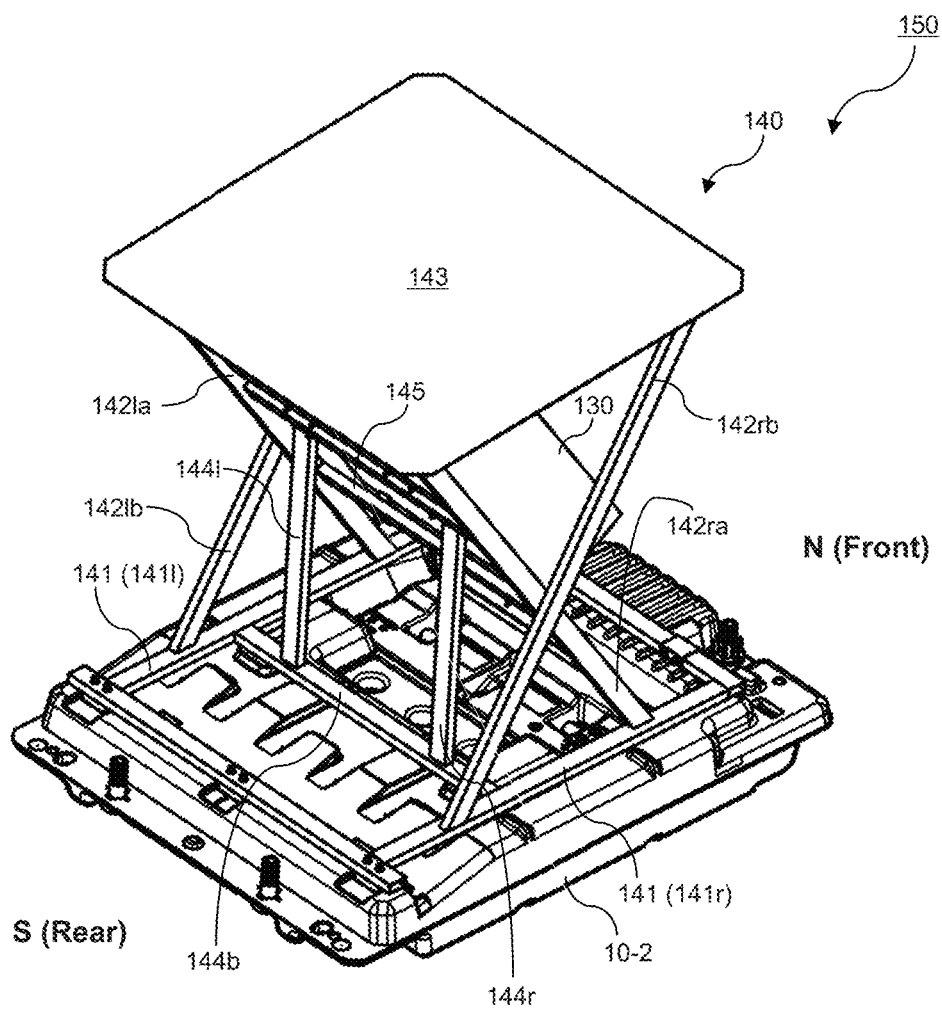
FIG. 16 is a perspective view of the power conditioner unit according to the first embodiment of the present invention as seen from another angle.
Figure 17:
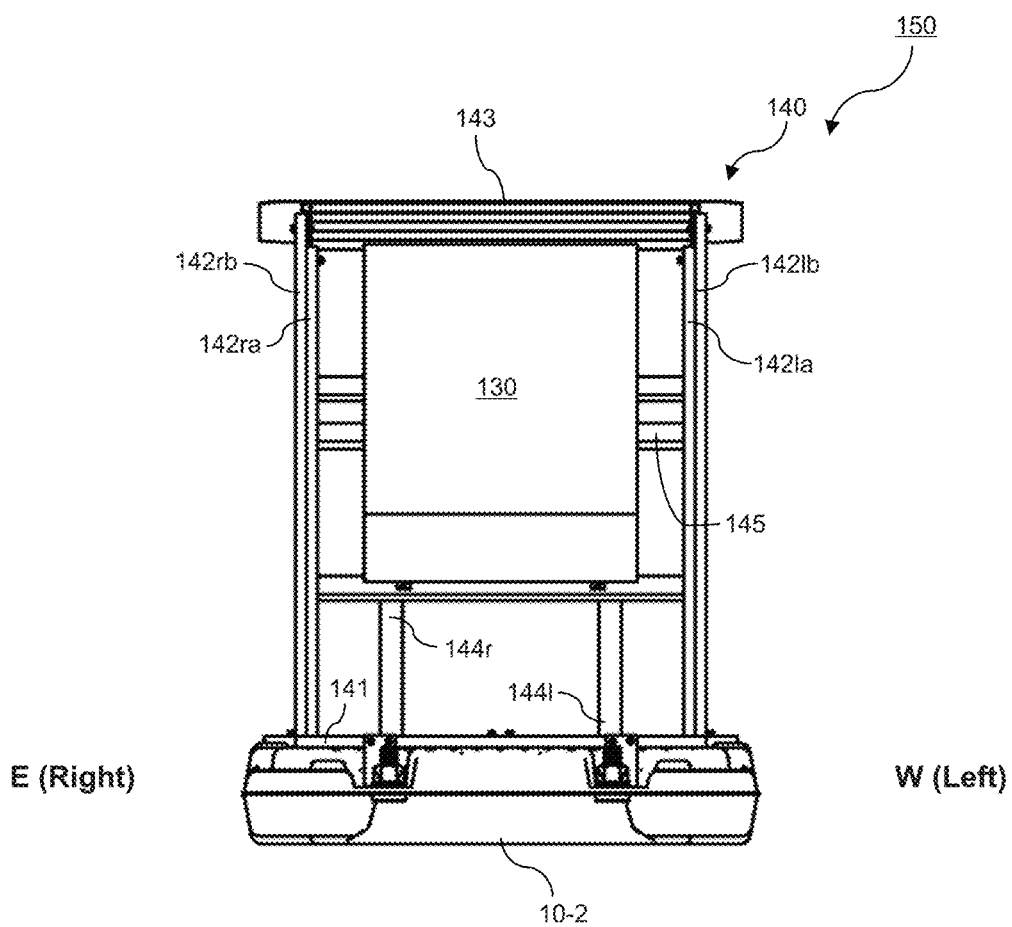
FIG. 17 is a front view of the power conditioner unit according to the first embodiment of the present invention.
Figure 18:
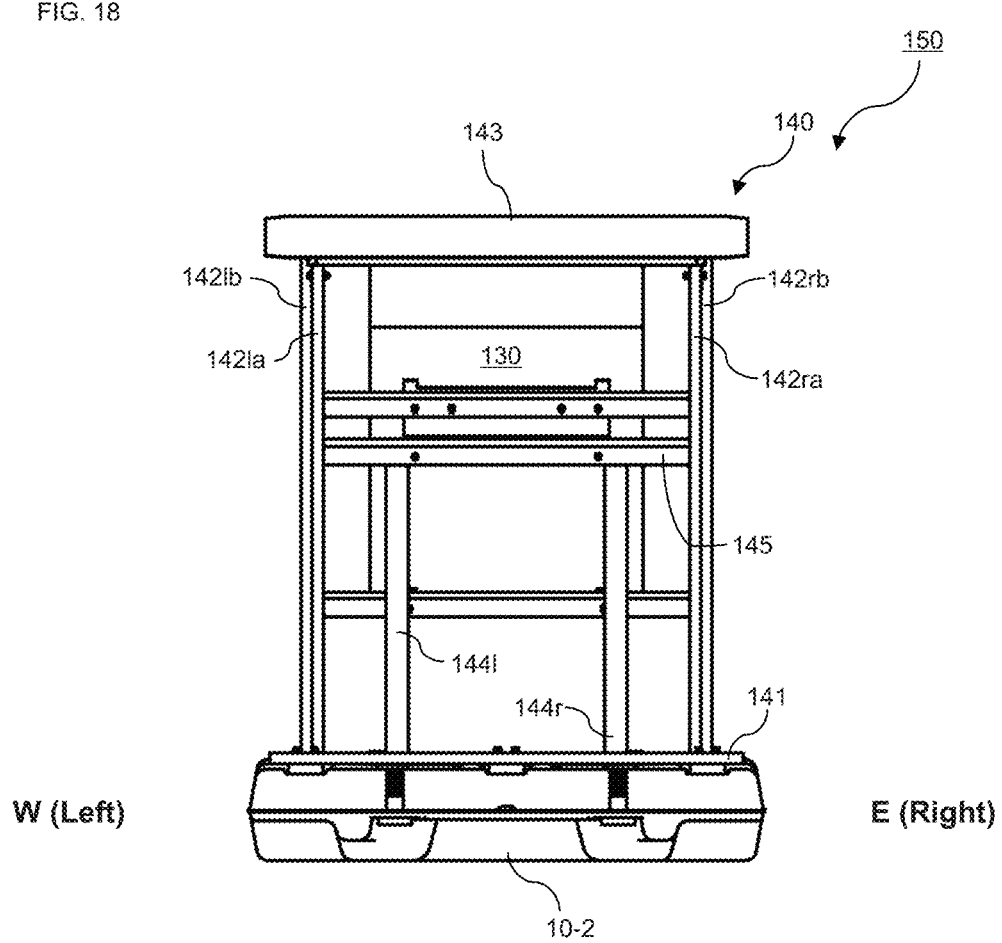
FIG. 18 is a rear view of the power conditioner unit according to the first embodiment of the present invention.
Figure 19:
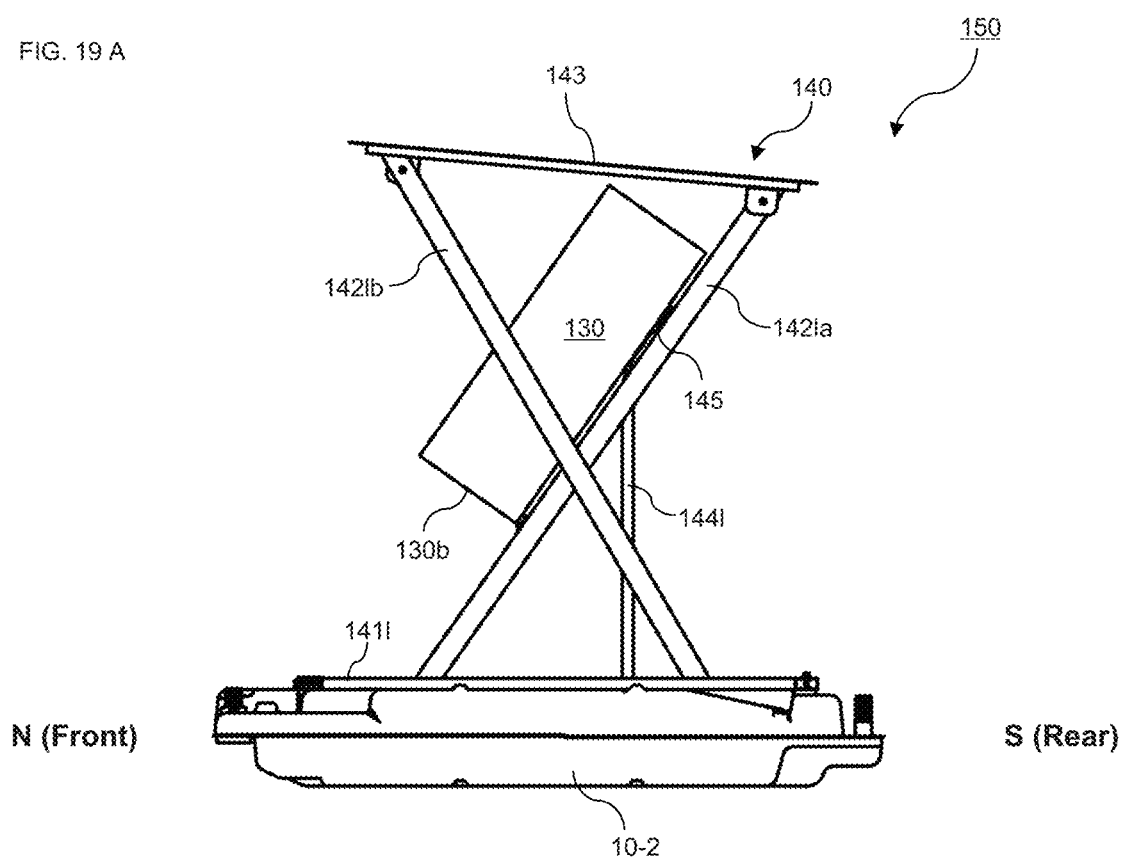
FIG. 19A and FIG. 19B are side views of the power conditioner unit according to the first embodiment of the present invention.
Figure 19:
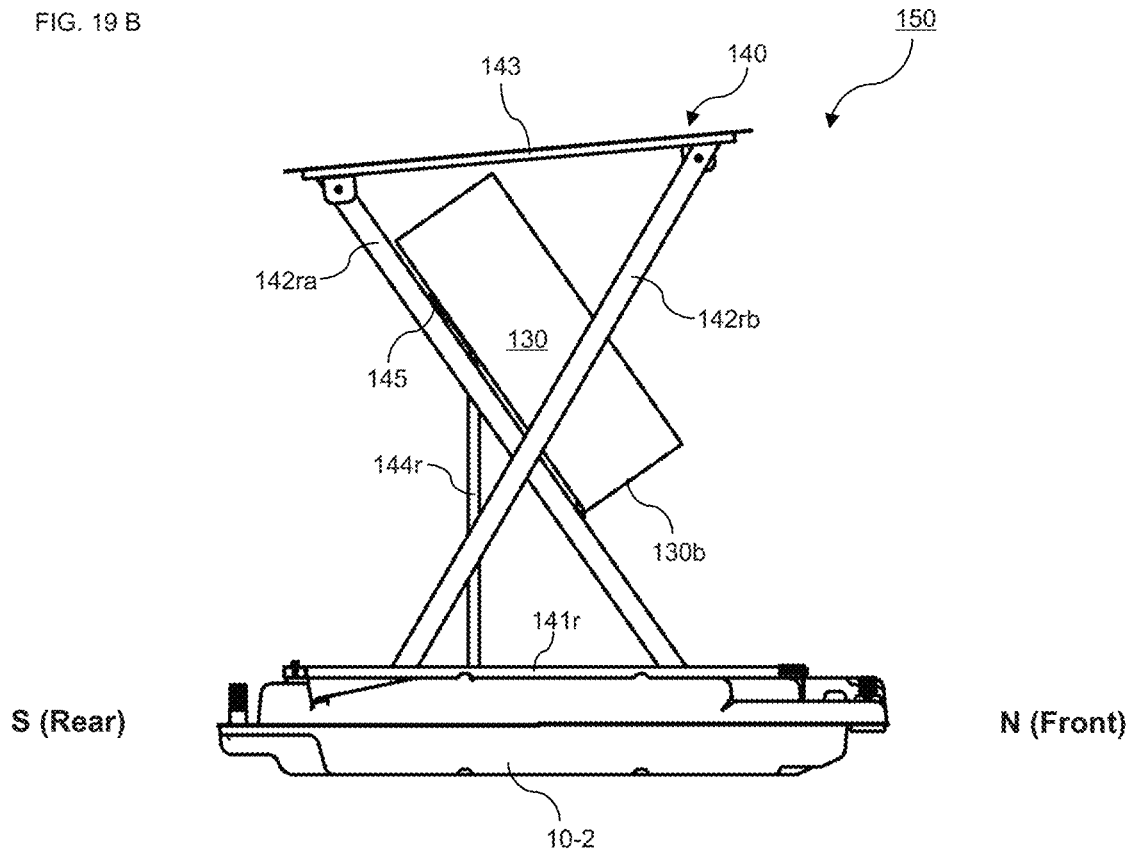
Figure 20:
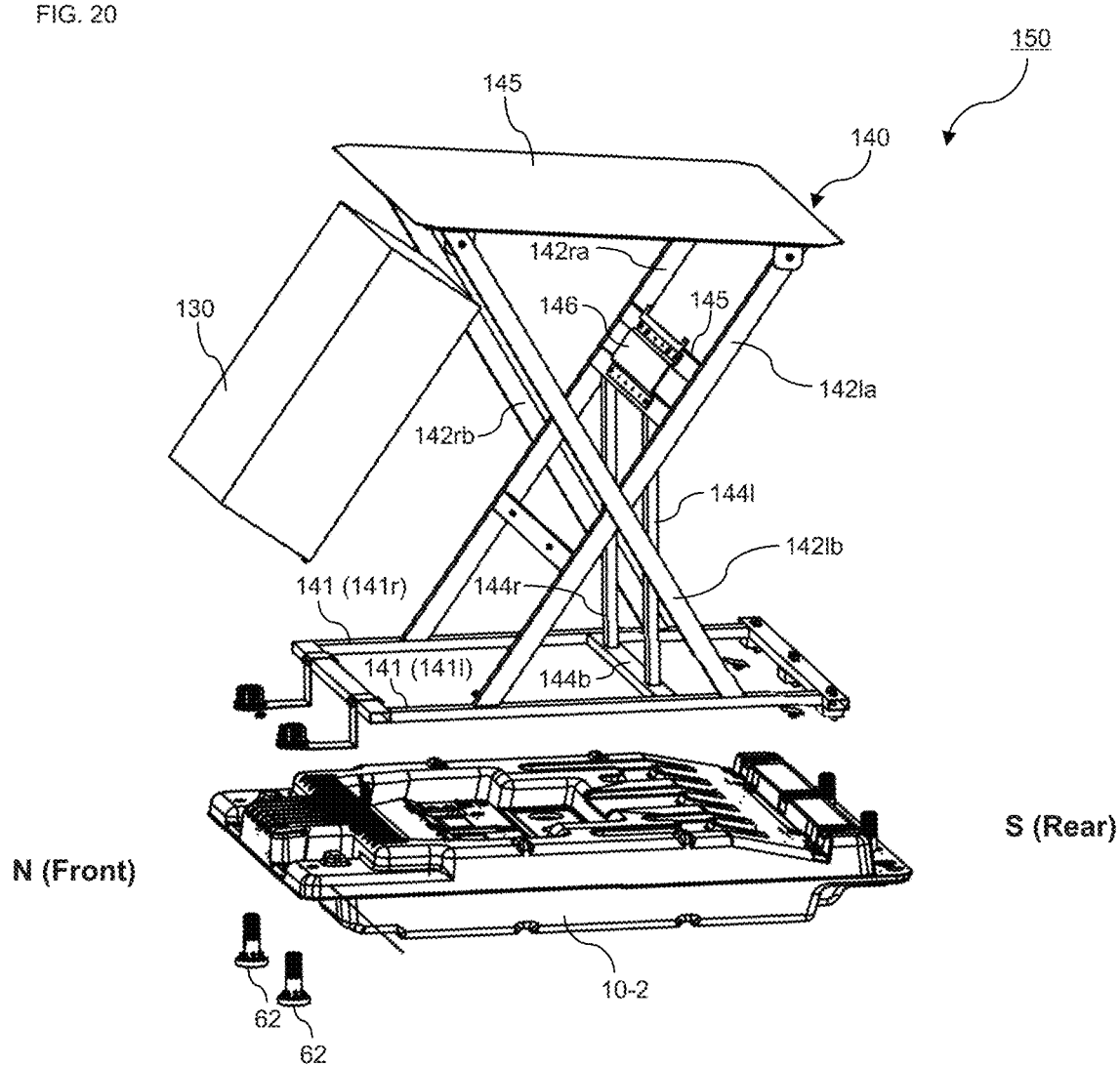
FIG. 20 is an exploded view of the power conditioner unit according to the first embodiment of the present invention.

Subsequently, the installation of the power conditioner 130 on the second float 10-2 will be described. FIG. 15 and FIG. 16 are perspective views showing an aspect in which a mount 140 is provided on the second float 10-2 and the power conditioner 130 is installed thereon (power conditioner unit 150). Similarly, FIG. 17 is a front view of the power conditioner unit 150, FIG. 18 is a rear view, FIG. 19A is a right-side view, FIG. 19B is a left-side view, FIG. 20 is an exploded view, FIG. 21A is a plan view, and FIG. 21B is a cross-sectional view along a P-P line.

As shown in FIG. 15 to FIG. 20, the power conditioner 130 is installed on the second float 10-2 via the mount 140. The mount 140 comprises a bottom frame 141, left-side frames 142*la*, 142*lb*, right-side frames 142*ra*, 142*rb*, a top plate 143, and subframes 144*l*, 144*r*, 144*b*.

The bottom frame 141 is a frame that can be fixedly installed via the surface of the second float 10-2 and the connecting bolt 62 and the like, and two bottom frames 141 extend respectively at the front, rear, left and right.

The left-side frame 142*la* extends upward from the left side bottom frame 141*l*, being inclined with a predetermined angle from the zenith direction, and the left-side frame 142*lb* extends upward from the left side bottom frame 141*l*, being inclined with a predetermined angle from the zenith direction. The inclination angles may differ or may be the same. In this way, the left-side frames 142*la*, 142*lb* are provided so as to intersect with each other. The right-side frame 142*ra* extends upward from the right bottom frame 141*r*, being inclined with a predetermined angle θ1 from the zenith direction, and the right-side frame 142*rb* extends upward from the right-side bottom frame 141*r*, being inclined with a predetermined angle from the zenith direction. The inclination angles may differ or may be the same. In this way, the right-side frames 142*ra*, 142*rb* are provided so as to intersect with each other.

The top plate 143 is supported by the left-side frames 142*la*, 142*lb* and the right-side frames 142*ra*, 142*rb* and avoids direct sunlight on the power conditioner 130 provided therebelow. That is, the left-side frames 142*la*, 142*lb* and the right-side frames 142*ra*, 142*rb* can function as strut members, and the top plate 143 can function as a sunshade member. Here, it should be noted that the top plate 143 is slightly inclined from the horizontal plane to the rear side of the second float 10-2. It is possible, by such a slight inclination, to reduce a probability that dust, such as rainwater, snow, dirt, leaves, and bird droppings, accumulates on the top plate 143. That is, the maintainability of the mount 140 is improved by such inclination. In this regard, since it will become easy to receive the influence of a wind pressure if inclined too much, it is preferable to set the inclination to the extent that the above-mentioned accumulation can be reduced (for example, the installation inclination of the solar panel 50 at a maximum).

Sub frames 144*l*, 144*r* are provided to extend downward from a power conditioner support frame 145 so as to support the rear side of the power conditioner 130 installed along the left-side frame 142*la* and the right-side frame 142*ra*. The sub-frame 144*b* connected to these and located on the bottom is connected to the bottom frames 141*l*, 141*r*.

Figure 21:
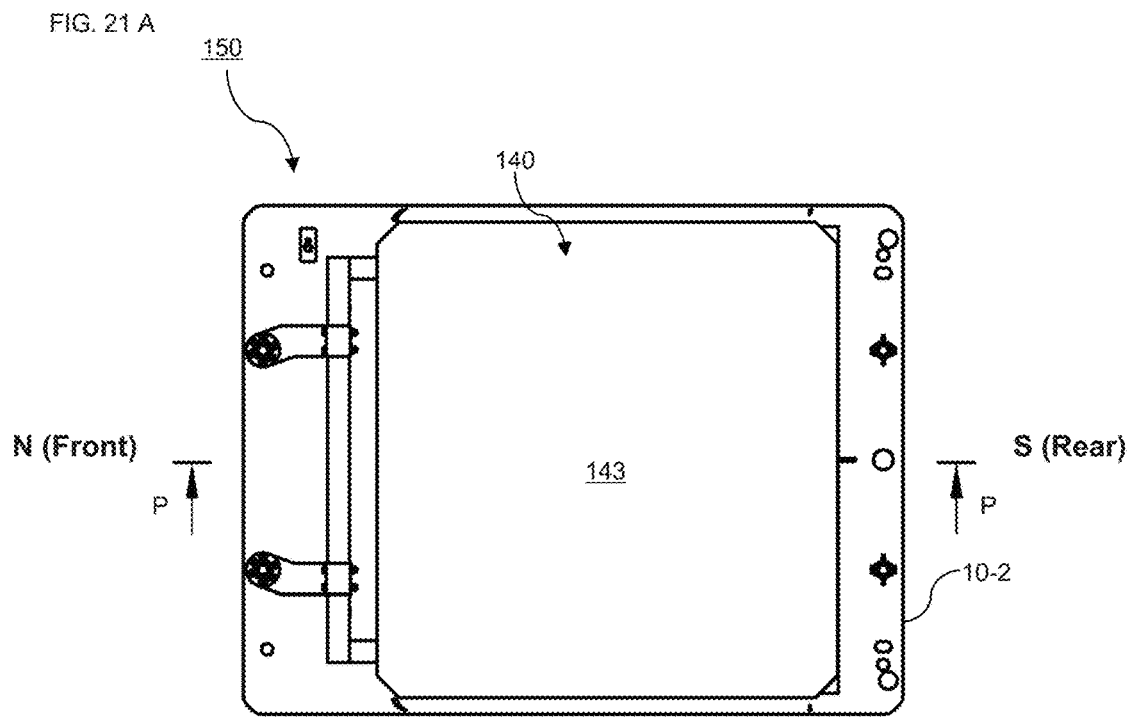
FIG. 21A and FIG. 21B show the power conditioner unit according to the first embodiment of the present invention.
Figure 21:
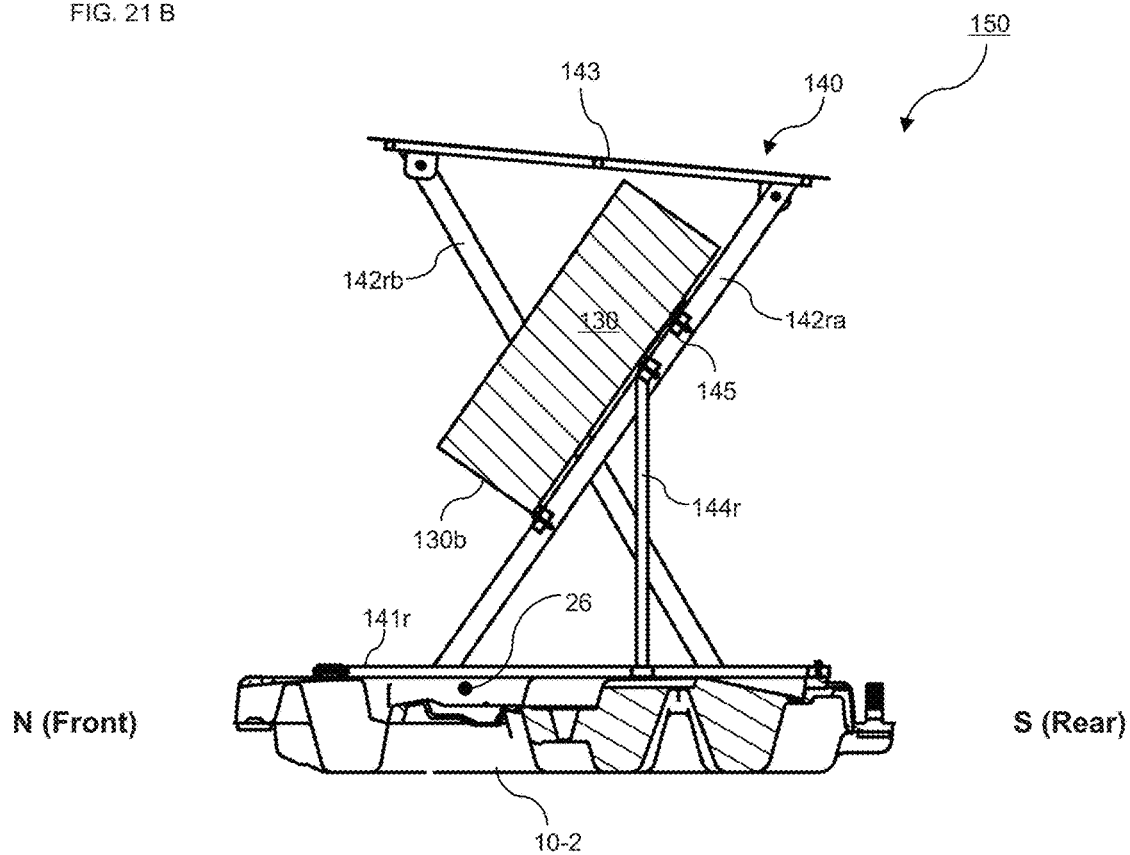

By using the mount 140 configured in this way, the power conditioner 130 can be installed on the second float 10-2 in a non-contact manner with the second float 10-2. Preferably, the power conditioner 130 is installed at a distance of 30 cm or more from the surface of the second float 10-2. In particular, as shown in FIG. 21, the power conditioner 130 is disposed such that the bottom surface 130*b* is located above the opening 26 of the second float 10-2. In this regard, the opening 26 is not limited thereto, and the opening part 26 may be configured as a through-hole.

A power transmission cable (not shown) is led out from the bottom 130*b* (see FIG. 19A and FIG. 19B) of the power conditioner 130. By separating the power conditioner 130 and the second float 10-2, it is not necessary to bend the power transmission cable at a sharp curve along the surface of the second float 10-2, and thus the load on the power transmission cable can be reduced. In this regard, the power transmission cable led out from the power conditioner 130 extends to the land. Since the power transmission cable is installed on the object like the float 10 which may move unstably in the horizontal and vertical directions, there is variation in the state of the transmission cable. For example, a large tension may be applied to a certain part while the other part may be loose. It is preferable that such a power transmission cable can be maintained in a good state as much as possible.

Further, the power conditioner 130 is installed along the left-side frame 142*la* and the right-side frame 142*ra*. More specifically, the power conditioner 130 is inclined and installed via a predetermined fixture 146 and on the power conditioner support frame 145 provided so as to connect the left-side frame 142*la* and the right-side frame 142*ra*. Although the left-side frame 142*la* and the right-side frame 142*ra* are loaded, the loads are reduced by the sub-frames 144*l*, 144*r* extending from the power conditioner support frame 145 and by the sub-frame 144*b* connecting them to the bottom frame 141.

As described above, according to the present embodiment, it is possible to provide the float aggregate comprising a power conditioner while avoiding sinking below the water surface.

2. Second Embodiment (Corresponding to Second Viewpoint)

In this section, the second embodiment will be described. A description common to the first embodiment will be omitted.

(Collective Float Unit)

The collective float unit 120 formed with the float 10 and the passage joint 60 is described. In the present embodiment, the collective float unit 120 is mainly an aggregate of the floats 10 on which the solar panel 50 is installed and is a main part of the so-called float aggregate. Here, although the actual float aggregate includes not only the collective float unit 120 but also a jetty (long connected floats 10 on which the solar panel 50 is not installed) connected from the land to the collective float unit 120 floating on water, and a connecting float portion for connecting the jetty and the collective float unit 120, the illustration and description thereof is omitted here.

The collective float unit 120 is formed by connecting a plurality of floats 10 to each other. Here, an aspect of the collective float unit 120 in which a total of 81 sheets of the floats 10 of nine sheets in the north-south direction and nine sheets in the east-west direction are disposed is shown. The floats 10 except for a base float 10*sf* described later are arranged so that the front faces the north side. Accordingly, the north side is referred to as the front side of the collective float unit 120, and the south side is referred to as the rear side of the collective float unit 120. In this regard, the arrangement and the number of the floats 10 are merely examples and are not limited thereto. In practice, hundreds or thousands of floats 10 are connected via the passage joint 60, and an enormous number of solar panels 50 are installed.

The 81 floats 10 according to the present embodiment include 32 outer peripheral floats 10*s* constituting the periphery and 49 inner floats 10*i*, and the same float 10 is used for these floats. In the present embodiment, the solar panel 50 is installed on each of the internal floats 10*i*, but the solar panel 50 is not installed on the outer peripheral floats 10s. The outer peripheral floats 10s which are located at one end on the north side of the collective float unit 120 (for convenience, defined as the base end of the collective float unit 120) is the base end float 10sf. In the present embodiment, since the collective float unit 120 has a rectangular shape, the base end float 10sf is the outer peripheral float 10s arranged along one predetermined side of the rectangle.

Figure 24:
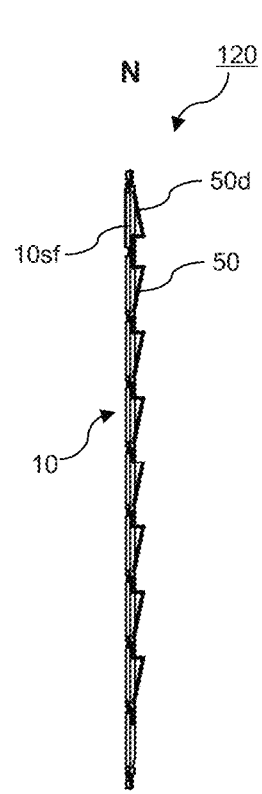
FIG. 24A and FIG. 24B show the collective float unit according to the second embodiment of the present invention.
Figure 24:
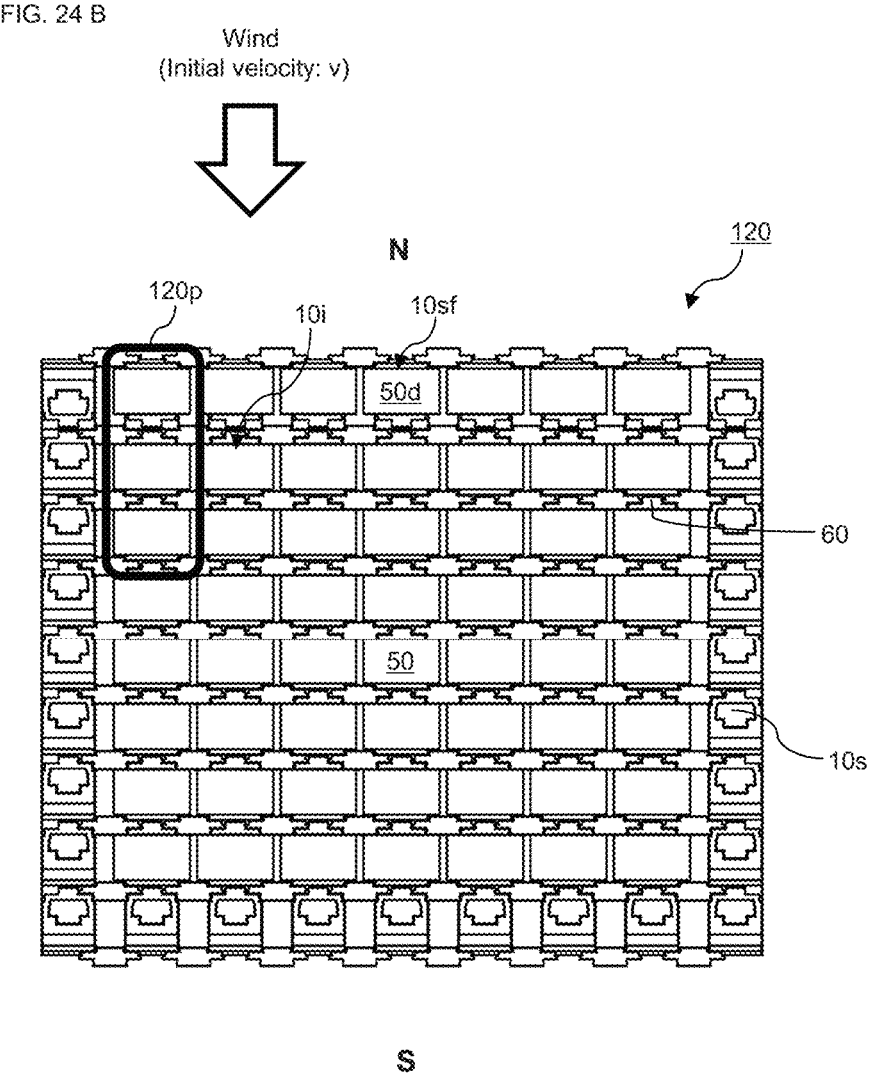
Figure 25:
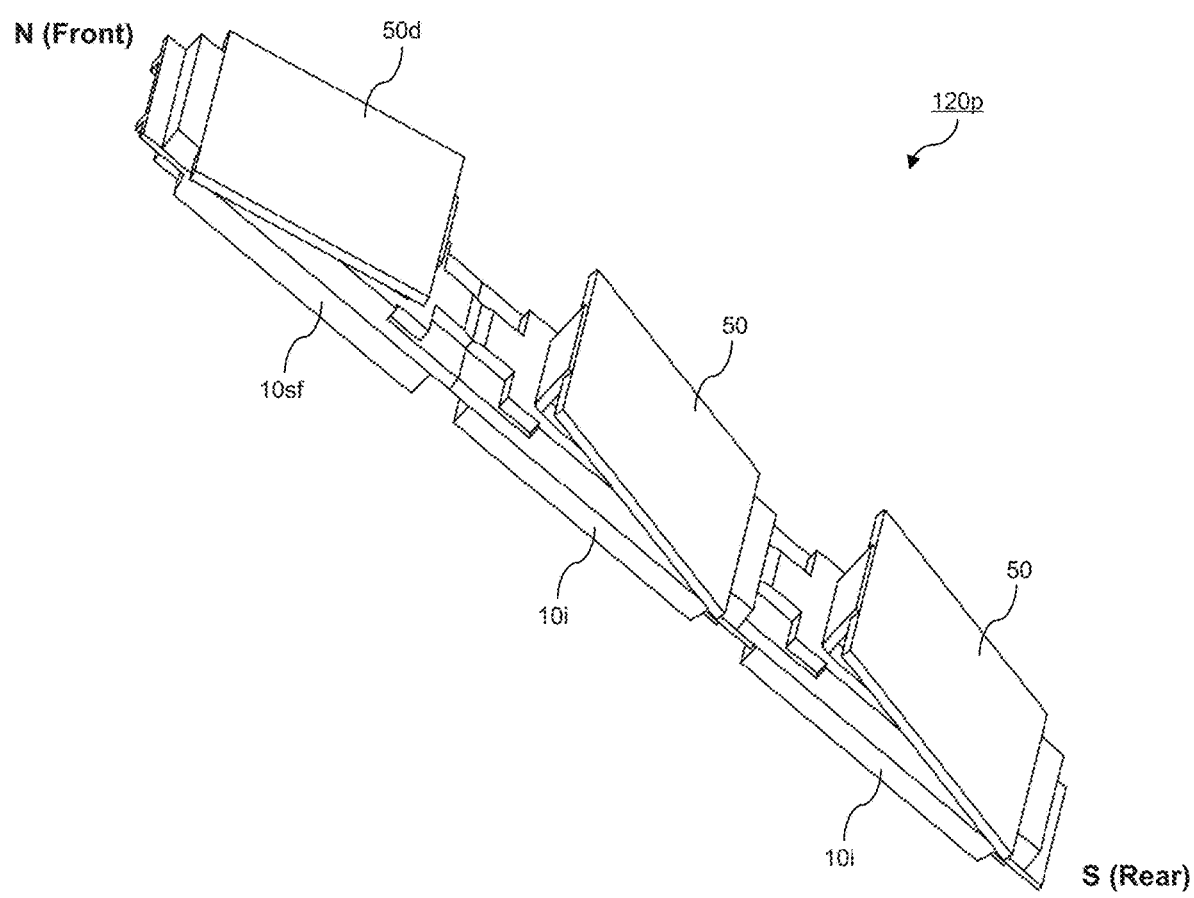
FIG. 25 is a perspective view showing a part of the collective float unit according to the second embodiment of the present invention.
Figure 26:
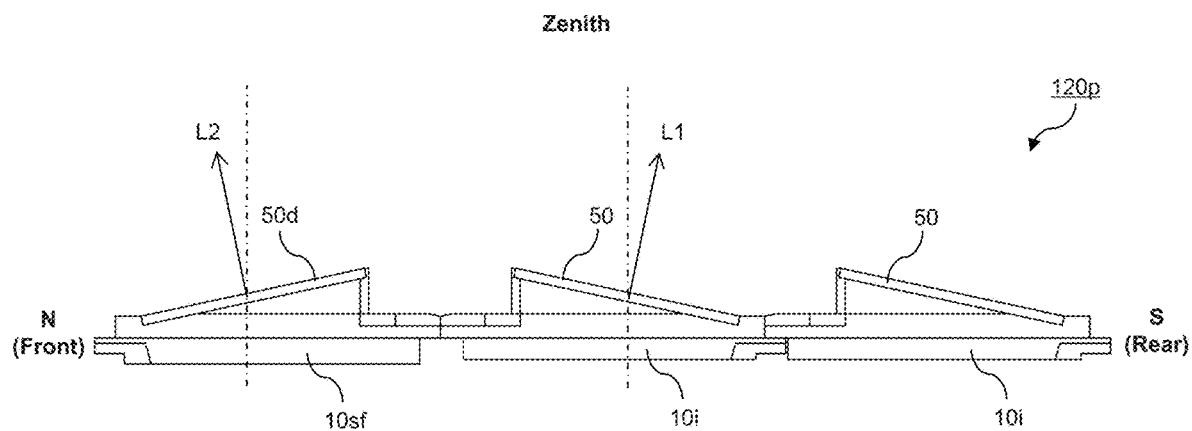
FIG. 26A and FIG. 26B show a part of the collective float unit shown in FIG. 25 and show an aspect in which a base end float and the other floats are connected to each other in inverted directions.
Figure 26:
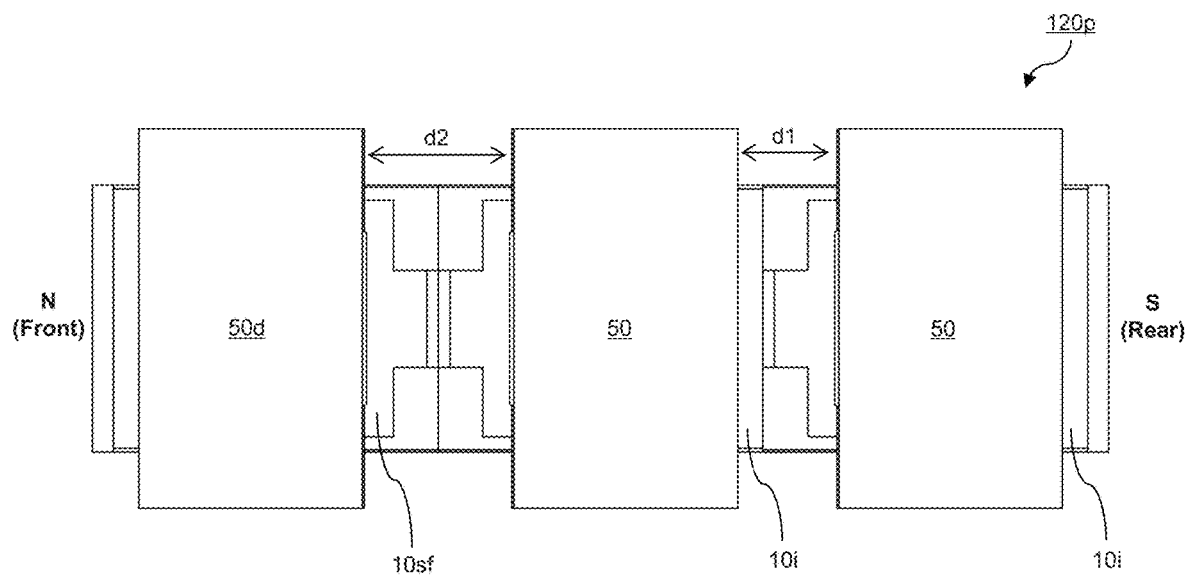

Here, attention should be paid to the collective float unit 120p, which is a part of the collective float unit 120 in FIG. 24B. FIG. 25 is a perspective view of the collective float unit 120p, FIG. 26A is a side view seen from the west side of the collective float unit 120p, and FIG. 26B is a plan view of the collective float unit 120p. As shown in these drawings, the base end float 10sf is disposed in the reverse direction to the other floats 10. The fixing method between the base end float 10sf and the adjacent inner float 10i is not particularly limited, but for example, a dedicated joint (not shown) connecting one end of the floats 10 may be used, or a string (not shown) may be used for binding.

A dummy panel 50d that functions as a windbreak member is installed on the proximal float 10fs. The structure of the dummy panel 50d is the same as that of the solar panel 50, and the installation method on the float 10 is the same as described and thus is omitted herein. By adopting the same structure, the float 10 can be used as it is, and a member that is different from and more advantageous than that of the solar panel 50 (for example, cost, lightness, rigidity, and the like) can be selected. Thus, the initial cost can be reduced as a whole. As a matter of course, the solar panel 50 may be employed as a windshield member. It is preferable to select these appropriately and selectively depending on the installation conditions.

Since the base end float 10sf is disposed in an inverted direction from the inner float 10i, the dummy panel 50d installed on the base end float 10sf and the solar panel 50 installed on the inner float 10i adjacent to the base end float 10sf are inclined in inverted directions. In other words, the solar panel 50 is installed so as to be inclined with respect to the surface of the inner float 10i to face the south side (the rear side of the collective float unit 120), and the dummy panel 50d is installed so as to be inclined with respect to the surface of the base end float 10sf to face the north side (the front side of the collective float unit 120). More specifically, as shown in FIG. 26A, the normal line L1 of the solar panel 50 is inclined so as to face the south from the zenith direction, and the normal line L2 of the dummy panel 50d is inclined to face the north than the zenith direction.

Further, since the base end float 10sf and the inner float 10i are disposed in the inverted directions, as shown in FIG. 26B, the distance d1 between the solar panels 50 installed on the inner float 10i adjacent to each other is shorter than the distance d2 between the dummy panel 50d installed on the base end float 10sf and the solar panel 50 installed on the internal float 10i adjacent to the base end float 10sf, as shown in FIG. 26B. As to the connection between the inner floats 10i, refer to the description of "fixing the other end side of the solar panel" described above.

As described above, by installing the dummy panel 50d functioning as a windshield member at the base end of the collective float unit 120, problems, for example, the solar panel 50 being detached from the mount, and the mount being lifted, are solved. Meanwhile, when the windshield member is individually provided for each solar panel 50, the use on the water may cause sinking under the water surface. In the present embodiment, by installing the dummy panel 50d as a windbreak member on the proximal float 10sf for the whole collective float unit 120, the problem of sinking can be solved, and the cost can be reduced as compared with the case where the windbreak member is provided individually.

As a matter of course, the collective float unit 120 of a rectangular shape described above is merely an example. Regardless of the shape of the collective float unit 120, the above-described effects can be obtained by installing the dummy panel 50d on a float (the base end float 10 sf) located at one end (the base end) on the north side of the collective float unit 120.

(Analysis of Wind Pressure Load)

Figure 27:
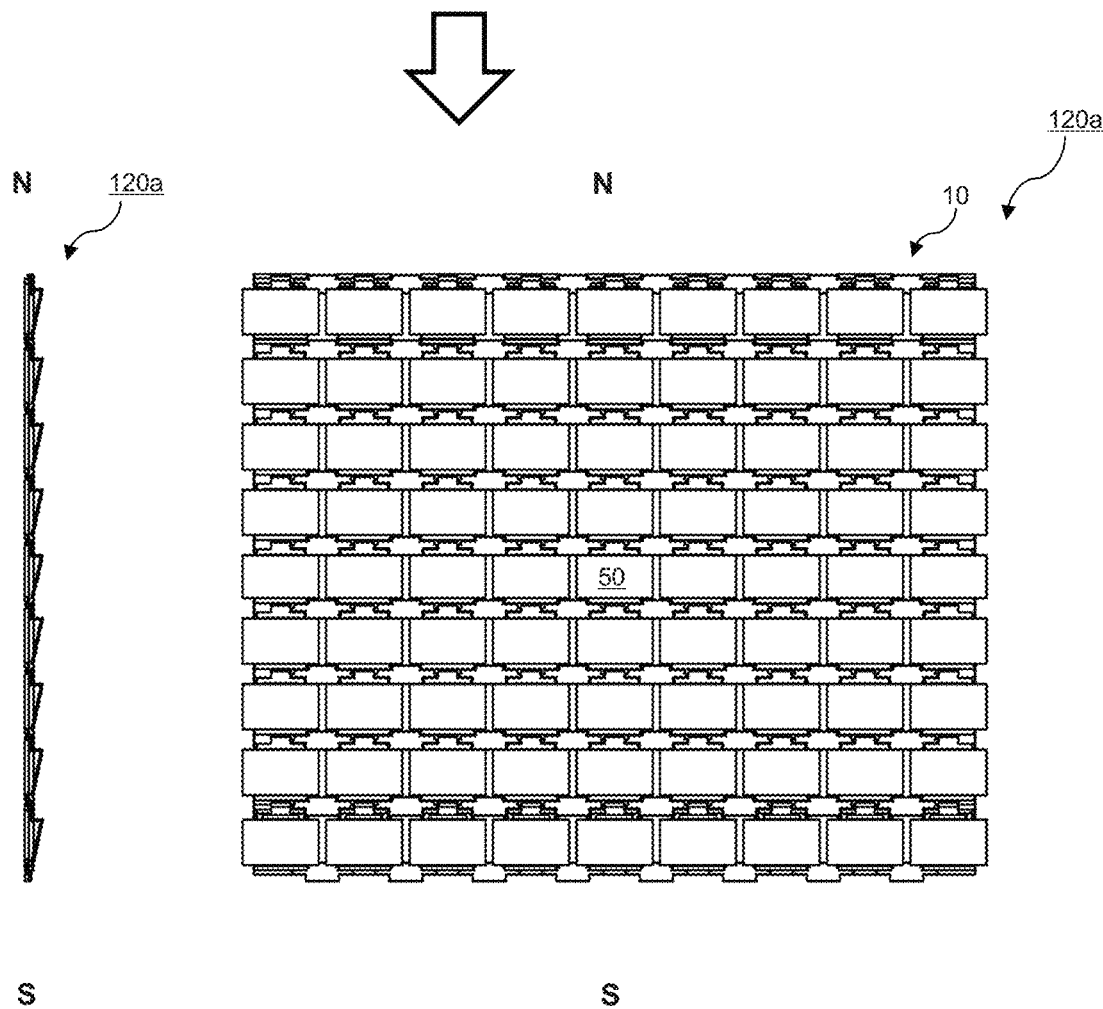
FIG. 27A and FIG. 27B show a collective float unit according to a comparative example 1.

Next, an analysis result for verifying effect of the collective float unit 120 according to the present embodiment is described. Here, the above-described collective float unit 120 according to the present embodiment is used as an example, and the collective float units 120a and 120b illustrated in FIG. 27A, FIG. 27B, FIG. 28A, and FIG. 28B are employed as comparative examples. FIG. 27A is a side view seen from the west side of the collective float unit 120a, and FIG. 27B is a plan view of the collective float unit 120a. FIG. 28A is a side view seen from the west side of the collective float unit 120b, and FIG. 28B is a plan view of the collective float unit 120b.

As shown in FIG. 27A and FIG. 27B, in the collective float unit 120a according to the comparative example 1, the solar panels 50 is installed on all 81 floats 10 of nine sheets in the east-west direction and nine sheets in the north-south direction, and a configuration of arranging the base end float 10sf in the inverted direction as in the collective float unit 120 according to the example is not employed. Further, as shown in FIG. 28A and FIG. 28B, in the collective float unit 120b according to the comparative example 2, the solar panel 50 is installed on the inner float 10i out of the total of 81 floats 10 of nine sheets in the east-west direction and nine sheets in the north-south direction. The solar panel 50 is not installed on the outer peripheral float 10s. In particular, the configuration of arranging the base end float 10sf in the inverted direction and arranging the dummy panel 50d thereon as in the collective float unit 120 according to the example is not employed.

TABLE 1

| | | 1st row | 2nd row | 3rd row | 4th row | 5th row | 6th row | 7th row | 8th row | 9th row | Total |
|---|---|---|---|---|---|---|---|---|---|---|---|
| Example | Horizontal | 4.43 | 1.66 | 1.66 | 2.47 | 2.92 | 3.04 | 3.04 | 3.14 | 1.36 | 22.37 |
| | Vertical | 0.42 | 12.84 | 7.75 | 9.10 | 9.41 | 9.44 | 9.26 | 9.71 | 3.71 | 67.92 |
| Comparative | Horizontal | 11.46 | 1.75 | 4.01 | 3.80 | 3.65 | 3.38 | 3.26 | 3.08 | 3.95 | 34.37 |
| Example 1 | Vertical | 28.94 | 12.06 | 12.63 | 10.97 | 9.86 | 8.95 | 8.47 | 8.11 | 9.20 | 100.00 |
| Comparative | Horizontal | 2.23 | 4.40 | 1.87 | 2.98 | 3.23 | 3.26 | 3.41 | 3.71 | 1.63 | 25.08 |
| Example 2 | Vertical | 7.24 | 12.96 | 8.44 | 9.44 | 9.35 | 8.98 | 9.20 | 10.58 | 3.41 | 76.18 |

Table 1 shows wind load in the horizontal direction and vertical direction (lift force direction) when the wind blows from north to south with a predetermined wind speed v (see arrows in FIG. 24A, FIG. 24B, FIG. 27A, FIG. 27B, FIG.

28A, and FIG. 28B). Here, the "row" is a unit of the floats 10 arranged in the east-west direction. For example, the first row indicates the base end floats 10sf. Here, the relative value is shown, taking the total value of the load in the vertical direction (i.e. lift force) in the comparative example 1 as 100. In the present embodiment, a load reduction of about 35% in the horizontal direction and about 32% in the vertical direction is expected as compared with the comparative example 1. Compared to the comparative example 2, a load reduction of about 10% is expected in both the horizontal and vertical directions. That is, the wind pressure load can be effectively reduced in the collective float unit 120 according to the example as compared with the comparative examples 1 and 2.

As described above, according to the present embodiment, it is possible to provide a float aggregate manufactured at low cost which comprises countermeasures against wind pressure which are suitable for installing on the water.

3. Third Embodiment (Corresponding to Third Viewpoint)

In this section, the third embodiment will be described. A description common to the first and second embodiments will be omitted.

(Anchoring Member)

Figure 29:
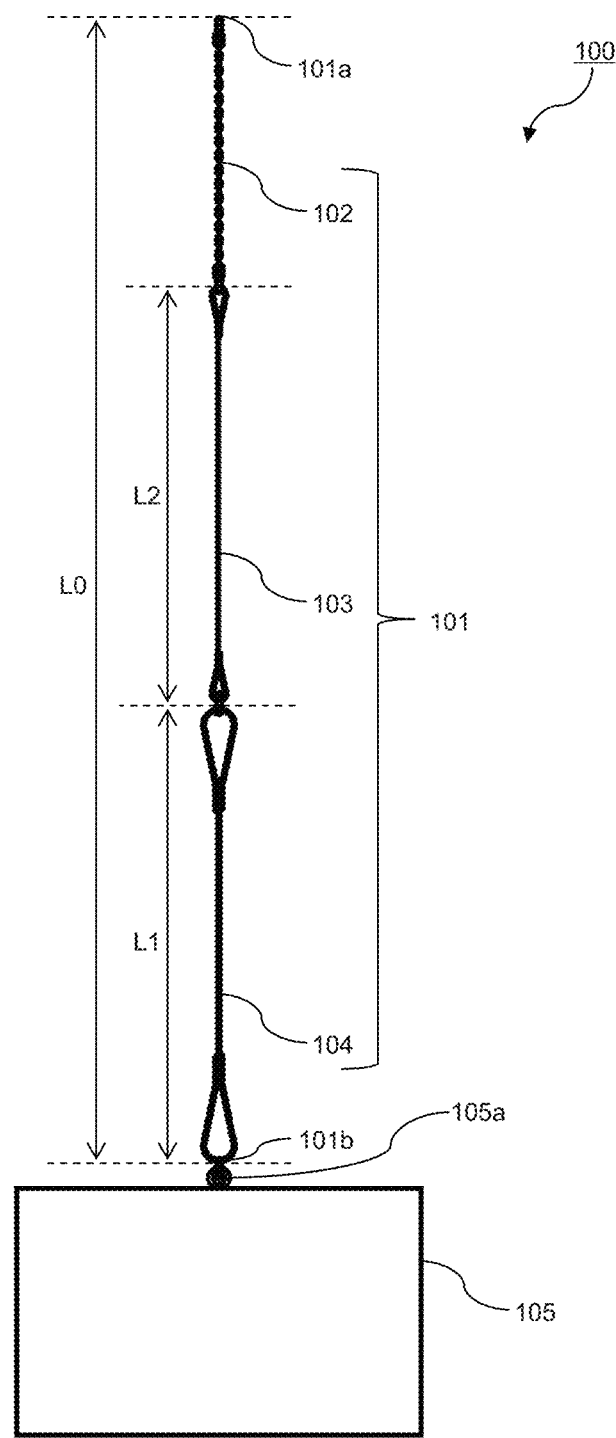
FIG. 29 is a conceptual diagram showing an anchoring member according to a third embodiment of the present invention.

Here, the anchoring member 100 for anchoring the float 10 at a predetermined position on water will be described. FIG. 29 is a conceptual diagram showing the anchoring member 100 according to the present embodiment. In the present embodiment, the anchoring member 100 comprises a linear member 101 and a fixing member 105. For example, one end 101a of the linear member 101 functions as a first connection portion and is connected to the anchoring portion 70 (described later) in the float 10 floating on water, being suspended in water. The other end 101b functions as a second connection portion and is connected to the fixing member 105 located at the water bottom.

In the present embodiment, the linear member 101 comprises a chain 102, a metal wire 103 (these are examples of a "metal member" in the claims), and a resin rope 104 in order from the surface of the water (water surface) toward the water bottom, and these are connected in this order.

Figure 30:
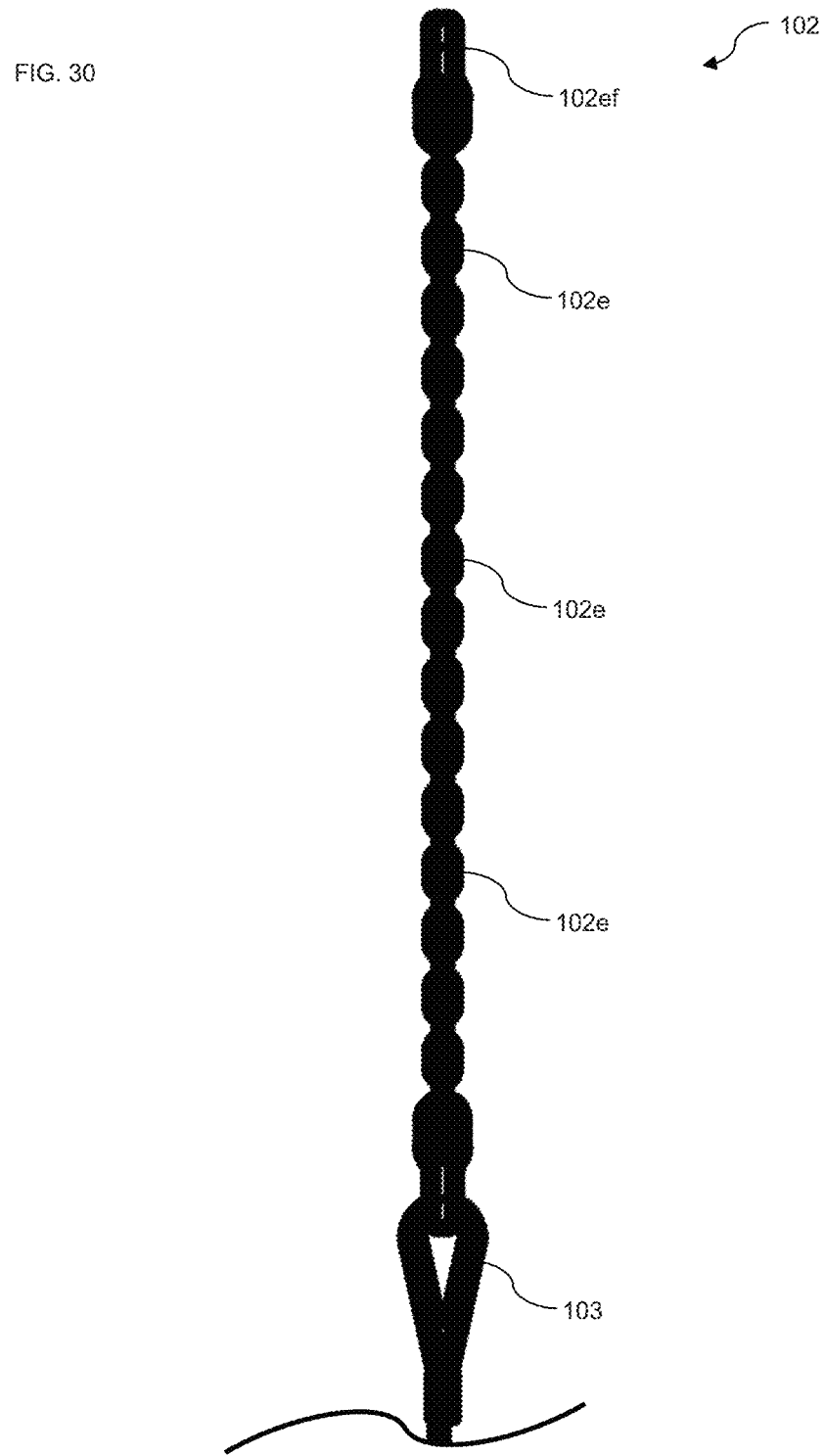
FIG. 30 is a partial enlarged view of the anchoring member shown in FIG. 29, particularly a conceptual diagram showing a chain in a linear member.

FIG. 30 is a partial enlarged view of the anchoring member 100 shown in FIG. 29 and is a conceptual diagram showing the chain 102 in the linear member 101. The chain 102 is a general chain member in which a plurality of chain elements 102e are inserted and connected to each other. By adopting the chain 102, the length of the linear member 101 can be finely adjusted. That is, when the linear member 101 is used with the longest length, the chain element 102ef located at the base end of the chain elements 102e constituting the chain 102 is connected to the anchoring portion 70 described later, as the first connection portion. Alternatively, when the length needs to be shorter, the chain element 102e subsequent to the chain element 102ef (that is, on the side closer to the water bottom) is appropriately connected to the anchoring portion 70 as the first connection portion. In particular, the distance (water depth) to the bottom of a pond or lake varies depending on the position. By adopting the chain 102, the linear member 101 can be adjusted to an appropriate length regardless of the water depth.

In addition, it should be noted that not only the chain 102 and the metal wire 103 but also the resin rope 104 is adopted. In the float 10, the solar panel 50 is inclined to a predetermined one end side (south side) of the float 10 in order to increase the power generation efficiency. Consequently, a considerable load is applied to the linear member 101. In the present embodiment, a more elastic resin rope 104 is employed in addition to a metal member, such as the metal wire 103 and the chain 102, thereby suppressing the deterioration of the linear member 101 due to a load applied thereto.

In this regard, it is preferable that the above-mentioned effect is produced by using the resin rope 104, and the present invention is not limited to the above-mentioned configuration. The same resin rope 104 is preferably used, and in particular, the resin rope 104 having the same length can be used. As a variation, for example, the resin ropes 104 having the same length may be adopted at all positions regardless of the water depth, or k resin ropes 104 of the adjacent n resin ropes 104 may be the same (1<k<n). Here, (n, k)=(3,2), (4,2), (4,3), (5,2), (5,3), (5,4), (6,2), (6,3), (6,4), (6,5), (7,2), (7,3), (7,4), (7,5), (7,6) is preferable.

The anchoring member 100 is connected to the end portion (referred to as a side for convenience) of the aggregate of the floats 10, and the resin ropes 104 having the same length as described above may be adopted for each side (for example, the north and south sides). Preferably, P % or more of the resin ropes 104 of the anchoring members 100 connected to each side has the same length. Preferably, P=40, 45, 50, 55, 60, 65, 70, 75, 80, 85, 90, 95, 100, and may be within a range between any two of the values exemplified herein.

Figure 31:
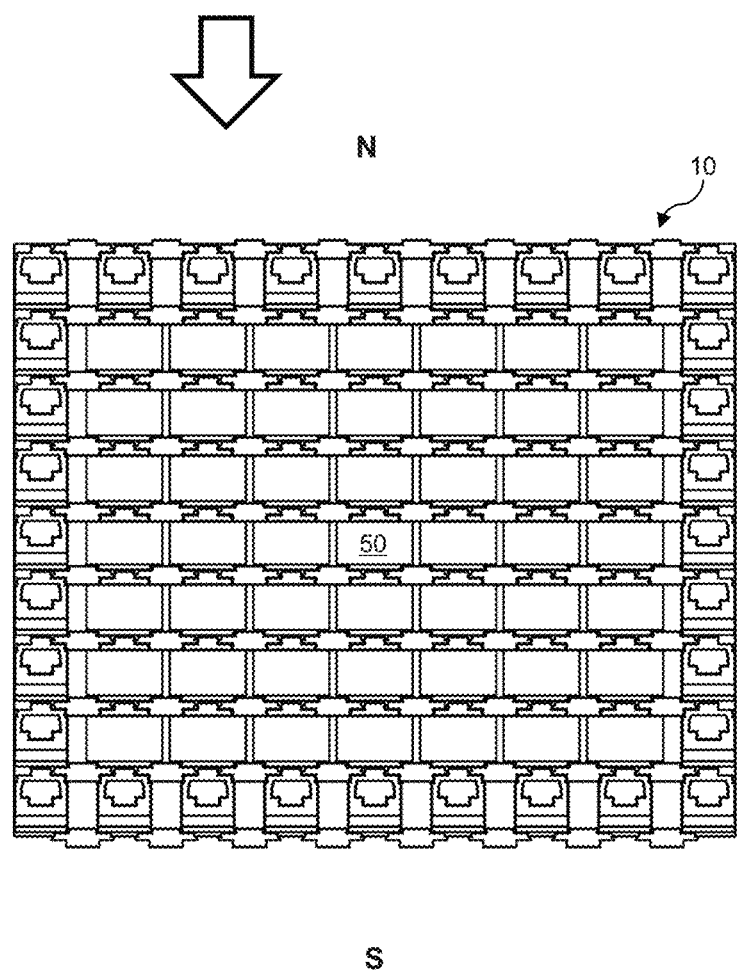
FIG. 31 is a conceptual diagram showing the influence of wind on a float aggregate according to a fourth embodiment of the present invention.

As shown in FIG. 31, the wind blows from the north to the south in the aggregate of the floats 10. Since the lift force applied to the floats 10 forming the north side is large when the wind blows, the number of the resin ropes 104 installed on the north side is inevitably increased. In this regard, it is preferable to increase the ratio of the resin ropes 104 having the same length (that is, increase the installation density of the resin ropes 104 having the same length). In other word, it is preferable to increase the value of P described above compared to the other sides. Further, since the lift force is further larger at both corners on the north side, it is preferable to set the ratio of the resin ropes 104 having the same length higher in the resin ropes 104 included in the anchoring member 100 located there. In addition, in FIG. 31, the solar panel 50 may be installed on the float 10 to which the anchoring member 100 is connected, but it is preferable to provide the float 10 on which the solar panel 50 is not installed (so-called empty float) from the viewpoint of assembly workability (ease of inspection after assembly, replacement workability). Here, the solar panel 50 is not provided on the floats 10 forming four sides of the rectangular aggregate of the floats 10. In this regard, this is merely an example, and not limited thereto. For example, only the floats 10 forming the north side may be the empty floats. Here, it is preferable to arrange the anchoring member 100 on the empty float.

It is preferable that the resin ropes 104 of Q % or more among all the anchoring members 100 have the same length. Preferably, Q=40, 45, 50, 55, 60, 65, 70, 75, 80, 85, 90, 95, 100, and may be within a range between any two of the values exemplified herein.

With this configuration, the stretch width of the resin rope 104 in each anchoring member 100 becomes equal, and it is possible to prevent the force from being applied to a specific resin rope 104 (especially a short one). Further, at a position where the water depth is shallow, the metal wire 103 may not be used, and the linear member 101 including the chain 102 and the resin rope 104 may be used. Furthermore, the linear members 101 may be entirely composed of the resin rope 104.

In particular, it is preferable to employ polypropylene, polyethylene, polyamide, polyester, polyvinyl chloride, polyurethane, polyether, fluororesin, or the like as the resin rope 104. Furthermore, an ultraviolet absorber, an antioxidant, carbon black, and an elastomer (soft component) may be contained as an additive. Polypropylene and polyethylene have a specific gravity smaller than that of water. On the other hand, the specific gravity of the metal wire 103 is greater than that of water. Since the linear member 101 is configured to connect the float 10 and the fixing member 105 described later, if the specific gravity of the linear member 101 is larger than that of water, the force is applied to pull the float 10 in the bottom direction (vertically downward). On the other hand, if the specific gravity of the linear member 101 is smaller than that of water, the force is applied to pull the fixing member 105 in the water surface direction (vertically upward). For this reason, in order to reduce the force applied to the float 10 and the fixing member 105, it is preferable that the chain 102, the metal wire 103, and the resin rope 104 are appropriately combined so that the specific gravity of the linear member 101 approaches the specific gravity of water. Further, by adopting polyamide as the resin rope 104, it is possible to produce a suitable resin rope 104 that is hard and has a high elongation rate and resistance to abrasion.

For example, the value of L1/L0 (where L0 represents the entire length of the linear member 101; and L1 represents the length of the resin rope 104 in the linear member 101) is, for example, 0.2 to 0.9, preferably 0.3 to 0.8, more preferably 0.4 to 0.6. Specifically, for example, L1/L0=0.20, 0.25, 0.30, 0.35, 0.40, 0.45, 0.50, 0.55, 0.60, 0.65, 0.70, 0.75, 0.80, 0.85, 0.90, and may be within a range between any two of the values exemplified herein. The value of L1/L2 (where L2 represents the length of the metal wire 103) is, for example, 0.3 to 10.0, preferably 0.4 to 7.0, and more preferably 0.5 to 5.0. Specifically, for example, L1/L2=0.3, 0.4, 0.5, 0.6, 0.7, 0.8, 0.9, 1.0, 2.0, 3.0, 4.0, 5.0, 6.0, 7.0, 8.0, 9, 10.0, and may be within a range between any two of the values exemplified herein.

The fixing member 105 connected to the other end 101b at the water bottom side of the linear member 101 (resin rope 104) is, for example, an anchor. That is, the fixing member 105 is embedded in the ground at the water bottom, so that the fixing member 105 is fixed. The shape is not particularly limited, and for example, the fixing member 105 may have a plurality of long parts with different angles to be embedded in the ground at the water bottom. By embedding at different angles in this way, it is possible to prevent the fixing member 105 from coming out of the ground. Advantages of adopting the anchor include that the anchor is light and suitable for transportation. However, there is also a demerit that divers and special equipment are required for embedding in the ground.

It is preferable that the force applied to the linear members 101 of the anchoring members 100 for anchoring a plurality of floats 10 at different positions is equal. However, the water depth varies depending on the position as described above, and if sludge or the like accumulates at the water bottom, there is a difference in anchor fixation. Consequently, the load on the linear members 101 is also dispersed. Further, it is probable that the allowance of the linear member 101 is displaced, and that the force applied to the relatively short linear member 101 is so increased that the linear member 101 is cut. In the present embodiment, such probability is reduced by adopting the resin rope 104 as described above.

In this regard, a plurality of sinkers may be adopted as the fixing member 105 instead of the anchor. A sinker is a weight of concrete, heavy metal, or the like with a significantly higher specific gravity than water. Unlike the anchors described above, the sinker has the advantages that a diver or special equipment is not required, and that stable fixing can be achieved regardless of the state of the water bottom compared to the anchor. On the other hand, the disadvantage is that a plurality of heavy sinkers is required, and thus it is difficult to lift (collect) the sinkers from the water bottom after a photovoltaic power generation project is completed.

The fixing member 105 comprises a fixing portion 105a (for example, an eyebolt or the like) for fixing the other end 101b of the linear member 101. Since a considerable strength is usually required, a metal fixing portion 105a is employed. When different metals come into contact with each other, electric corrosion occurs, causing brittleness and rusting. When installed for a long period (for example, for 20 years) as in the float 10 according to the present embodiment, the members are often rubbed, and it is necessary to pay particular attention to the afore-mentioned brittleness and rusting. Therefore, in order to prevent electric corrosion, it is preferable to employ the same type of metal for the members in contact with each other or to perform plating for preventing electric corrosion. In the present embodiment, it should be noted that the resin rope 104 is disposed between the fixing member 105 and the metal wire 103 in consideration of such electric corrosion.

(Anchoring Method)

Next, the anchoring method of the float 10 using the anchoring member 100 is described. Hereinafter, description is given along steps S1 to S8.

[Start]

(Step S1)

Prior to anchoring the float 10, the shape of the pond or lake, including the rough distance to the water bottom, is checked. The shape may be measured by a depth meter or the like or may be provided in advance by an owner of the pond or lake (followed by the step S2).

(Step S2)

Based on the shape of the pond or lake and the size (particularly depending on the number of the solar panels 50 to be installed) of the aggregate of the floats 10 (including the collective float unit) as determined in step S1, the overall layout, for example, the layout of each of the floats 10 and the passage joint 60 is determined (followed by the step S3).

(Step S3)

A wind tunnel analysis is performed to determine the number of the anchoring member 100 necessary for floating the aggregate of the floats 10 at a predetermined position of the pond or lake, and a specific position, for example, the number of points on the north side (followed by the step S4).

(Step S4)

The depth of the specific installation point is measured. Here, a predetermined measuring tool configured such that a rod-shaped member passes through a linear tubular member is used. The depth can be measured by advancing the rod-shaped member until the rod-shaped member does not advance further (cannot be driven further) (followed by the step S5).

(Step S5)

The specific member for the anchoring member 100 is selected according to the depth measured in the step S4. For example, the length of the resin rope 104 (in principle, the ropes of the same length are adopted as described above) and the length of the metal wire 103 can be determined in this step (followed by the step S6).

(Step S6)

The fixing member 105 is installed at the water bottom (followed by the step S7).

(Step S7)

The distance from the fixing member 105 installed in the step S6 to the water surface is measured. In particular, when the anchor is employed as the fixing member 105, the distance tends to be different from the measurement value obtained in the step S4 (usually deeper than the measurement value obtained in the step S4), and thus the measurement is performed in this step (followed by the step S8).

(Step S8)

Finally, the length of the chain 102 is adjusted by selecting the chain element 102e connected to the anchoring portion 70 in the float 10, and the length of the linear member 101 in the anchoring member 100 is adjusted accordingly.

[End]

(Float Configuration for Anchoring)

Next, the configuration of the float 10 for anchoring by means of the anchoring member 100 is described. The float 10 of the present embodiment comprises the annular float portion 30 having the opening 26, as described above. Specifically, as described above, the opening 26 is configured by combining the upper-surface wall 16 and the lower-surface wall 17 corresponding to the opening 26 and is formed by raising the support portion 11 supporting the one end portion 51 side of the solar panel 50 (one end side) toward the upper-surface wall 16 side so as to open the opening 26, using the side 24 continuous to the inner wall surface on one end side of the opening 26 as the hinge.

As shown in FIG. 6, when the support portion 11 is raised to form the opening 26, the region F on the lower-surface wall 17 side at the center of the float 10 can be accessed from the opening 26.

The region F at the center of the float 10 is almost at the center of gravity, being located around the intersection when the diagonal line is drawn from the four corners of the rectangular float 10. If the linear member 101 (in particular, the chain 102) of the anchoring member 100 is fixed at the center of gravity, the retaining force of the linear member 101 pulling the float 10 is applied to the center of gravity when the float 10 is about to move due to a strong wind. Consequently, the float 10 is not tilted, and the position thereof is stable.

Further, if an operator rides near the edge around the float 10, the float 10 may tilt and the operator may fall into the water. If the linear member 101 cannot be fixed to the float 10 unless the operator gets near the edge around the float 10, the workability is extremely poor. In this regard, it is also possible to work by approaching the edge around the float 10 by ship in order not to fall into the water, but even in this case, the workability is not good because the work needs to be performed from the ship.

On the other hand, since the region F at the center of the float 10 is at the center of gravity with high posture stability as described above, the balance of the float 10 is not easily lost even if the operator is on the vicinity.

Therefore, if the linear member 101 is fixed to the region F at the center of the float 10, the balance of the float 10 is not lost during the operation of fixing the linear member 101 to the float 10. The linear member 101 is easily fixed to the float 10.

The anchoring portion 70, which is specifically described below, for anchoring the linear member 101 is provided in the region F substantially at the center of the float 10. As shown in FIG. 5, the anchoring portion 70 is provided in the vicinity of the opening 26 (near the other end side), more specifically, adjacent to an edge 26a of the opening portion 26 facing the raised support portion 11 across the opening 26.

The anchoring portion 70 is formed by recessing the upper-surface wall 16 toward the lower-surface wall 17, as shown in FIG. 5, and also by recessing the lower-surface wall 17 toward the upper-surface wall 16, as shown in FIG. 6. That is, the anchoring portion 70 is configured by combining the upper-surface wall 16 and the lower-surface wall 17 to enhance the rigidity.

FIG. 12A, FIG. 12B, and FIG. 12C are cross-sectional views taken along a D-D line in FIG. 3B and FIG. 4B. FIG. 12A shows a state in which components for fixing the anchoring member such as an eye bolt 80 are not attached, FIG. 12B shows a state in which the components for fixing the anchoring member, for example, the eye bolt 80, are attached so that a ring 80a of the eye bolt 80 is located on the lower-surface wall 17 side, and FIG. 12C shows a state in which the components for fixing the anchoring member, for example, the eye bolt 80, are attached so that the ring 80a of the eye bolt 80 is located on the upper-surface wall 16 side.

As shown in FIG. 12B and FIG. 12C, the float 10 comprises the eye bolt 80 and the nut 81 as accessory parts. The eye bolt 80 has the ring 80a for fixing the linear member 101 (the chain 102). The nut 81 is screwed into a screwing groove of the eye bolt 80 having a main body portion 80b that extends from the 80a and is provided with the screwing groove at the tip thereof. Correspondingly, the anchoring portion 70 has a first through hole 71 through which the main body portion 80b of the eye bolt 80 is passed.

Further, as shown in FIG. 12B and FIG. 12C, the float 10 comprises the first fixing plate 82, the pair of first bolts 83, and the pair of first nuts 84 as accessory parts. The first fixing plate 82 are disposed on the upper-surface wall 16 side or the lower-surface wall 17 side of the anchoring portion 70. The pair of first bolts 83 is configured to fix the first fixing plate 82 to the anchoring part 70. The pair of first nuts 84 are screwed to the first bolts 83. Correspondingly, the anchoring part 70 comprises a pair of second through holes 72 that are provided with the first through hole 71 interposed therebetween and through which the first bolts 83 passed.

The first fixing plate 82 has three through holes 82a provided to correspond to the first through hole 71 and the second through holes 72 and through which the main body portion 80b of the eye bolt 80 and the first bolts 83 are passed.

As shown in FIG. 3B, FIG. 4B, FIG. 5 and FIG. 6, the first through hole 71 and the second through holes 72 are provided in the anchoring portion 70 and in the direction along the edge 26a on the other end side of the opening 26 (see FIG. 5).

FIG. 12B shows a case in which the chain element 102e of the chain 102 (not shown in FIG. 12B in view of visibility) and the ring 80a are inserted and connected to each other to be used for anchoring the float 10. The ring 80a of the eye bolt 80 is thus disposed so as to be positioned on the lower-surface wall 17 side (water surface side).

In this case, when the float 10 is about to move due to wind, the force by the linear member 101 holding the float 10 works as a force that pulls the eye bolt 80 from the lower-surface wall 17 of the float 10 in the direction opposite to the upper-surface wall 16 (the lower side in the drawing).

At this time, if stress concentrates at a local position of the float 10 where the eye bolt 80 is located, the resin-made float 10 may be damaged. For this reason, in the present embodiment, as shown in FIG. 12B, the thick first fixing plate 82 is provided on the upper-surface wall 16 side of the anchoring portion 70. After the first fixing plate 82 is disposed so that the main body portion 80b of the eye bolt 80 penetrates the first fixing plate 82, the first fixing plate 82 is fixed on the upper-surface wall 16 of the anchoring portion 70 by screwing the nut 81 into the tip of the main body portion 80b of the eye bolt 80 penetrating the first fixing plate 82, thereby distributing the pulling force to the entire anchoring portion 70 through the first fixing plate 82.

The first fixing plate 82 is preferably thick and also has a high strength as a material because it directly receives the pulling force of the linear member 101. For example, a metal plate and the like can be used suitably used. Here, the first fixing plate 82 may be provided as necessary and is not necessarily provided.

Consequently, since the pulling force of the linear member 101 hardly concentrates on a local position of the anchoring portion 70, the anchoring portion 70 can be prevented from being damaged.

As in the present embodiment, the first fixing plate 82 can be stably fixed by being fixed to the anchoring portion 70 with the pair of first bolts 83 and the first nuts 84 with the eye bolt 80 interposed therebetween.

Meanwhile, there is a case where the other end 101b of the linear member 101 rope is not connected to the fixing member 105 at the bottom of a pond or a lake, but is fixed to the land around the pond or the lake. It is more convenient in this case that the ring 80a of the eye bolt 80a is located on the upper-surface wall 16 side of the float 10.

When the ring 80a of the eye bolt 80 is installed so as to be positioned on the upper-surface wall 16 side, the linear member 101 will apply the force to hold the float 10 in the opposite direction. In this case, as shown in FIG. 12C, the first fixing plate 82 may be installed on the lower-surface wall 17 side of the anchoring portion 70.

In the present embodiment, the first through-hole 71 (through which the main body portion 80b of the eye bolt 80 is passed) provided in the anchoring portion 70 has a taper portion 71a recessed in a shape that tapers the upper-surface wall 16 toward the lower-surface wall 17, thereby having a reinforcing rib structure.

As shown in FIG. 12C, the second fixing plate 85 is provided with the second fixing plate 85 as an accessory part on the upper-surface wall 16 of the anchoring portion 70 so as to cover the taper portion 71a, so that the ring 80a of the eye bolt 80 does not fall into the taper portion 71a when the first fixing plate 82 is disposed on the lower-surface wall 17 side.

In this regard, when the linear member 101 holds the float 10, the force is not applied to the second fixing plate 85 so strongly. Thus, the second fixing plate 85 does not have to be as thick as the first fixing plate 82, as shown in FIG. 12C.

Since the second fixing plate 85 needs to be configured for passing through the main body 80b of the eye bolt 80, the second fixing plate 85 has a through hole through which the main body portion 80b of the eye bolt 80 is passed, at a position corresponding to the first through hole 71.

In the above description, the anchoring member such as an anchor rope fixed in the water and to the land has been described independently for convenience of explanation, but the collective float unit 120 in which a large number (a plurality) of floats 10 are assembled may include both of the linear member 101 fixed in the water and on the land.

That is, in the collective float unit 120, the linear member 101 is connected to a plurality of points so that the unit can be stably anchored. Thus, it is needless to say that some of the points may be connected to the linear member 101 fixed to the anchor in the water via the fixing member 105, while the remaining points may be connected to the linear member 101 fixed to the land.

Here, for example, in Patent Literature 1, fixing ears are provided at the four corners of the float 10, and fixing ears are also provided at the four corners of a connecting element. These fixing ears are connected by fastening pins to assemble the floats 10. In this case, if the floats 10 are assembled so as to form a rectangular outer shape, the fixing ears are left only at the four corners of the assembled floats, and thus only four linear members 101 can be connected. If the linear member 101 is connected with the connection structure of the float 10, the anchoring member 100 cannot be connected to the connection structure already used.

On the other hand, in the present embodiment, the anchoring portion 70 for connecting the linear member 101 (the chain 102) is provided separately from the connection structure for assembling the floats 10. Thus, when the floats 10 are assembled to form the collective float unit 120, the linear member 101 can be connected to any float 10 used for a passage or the like, and the degree of freedom of installation of the anchoring member 100 is extremely high.

In Patent Literature 1, as described above, the linear member 101 may be connected only at four points, and each linear member 101 receives 25% of the total force when the assembled float portion is about to move. If even one linear member 101 breaks, 33% of the total force applied when the assembled float portion is about to move will be applied to each remaining linear member 101. Thus, the probability of breakage of the linear member 101 significantly increases, and anchoring stability decreases.

In the float 10 of the present embodiment, the linear member 101 can be connected to any float 10 used for a passage or the like, and thus the number of the linear member 101 for anchoring the collective float unit 120 (see FIG. 22) can be greatly increased. Consequently, the force applied to each anchoring member can be reduced, thereby greatly reducing the probability that the linear member 101 will be damaged and preventing, even if any of the anchoring members is damaged, a large force from being applied to the remaining anchoring members. Therefore, high anchoring stability of the collective float unit 120 (see FIG. 22) can be obtained.

This means that even if the weight of the fixing member 105 connected to one linear member 101 is reduced, the collective float unit can be anchored sufficiently by increasing the number of linear members 101 connected to the collective float unit. As a result of reducing the weight of the fixing member 105, the fixing member 105 can be easily lifted when the use of the solar panel 50 is finished and the collective float unit needs to be removed.

Since the force applied to one anchoring point can be reduced also in the anchoring portion 70 of the float 10 where the linear member 101 is connected, the probability of damaging the anchoring portion 70 can be also greatly reduced, in the same manner that the probability of damaging the linear member 101 can be reduced.

In addition, the anchoring portion 70 is provided on the center side of the float 10 at a position where the float 10 can maintain a stable posture without tilting even when the linear member 101 applies a force to hold the float 10. The float 10 can be thus anchored with good posture stability.

When the anchoring portion 70 is provided on the center side of the float 10, it is difficult to connect the linear member 101 to the mooring portion 70, without the opening 26 for accessing there.

Since the opening 26 exists in the vicinity of the anchoring portion 70 in the present embodiment, the lower-surface wall 17 side of the anchoring portion 70 can be easily accessed. Even if the ring 80a of the eye bolt 80 is provided on the lower-surface wall 17 side, it is possible to easily connect (for anchoring) the desired chain element 102e of the linear member 101 to the ring 80a.

Further, even at the center side of the collective float unit, the linear member 101 can be easily connected to the float 10 by providing the float 10 on which the solar panel 50 is not installed.

Therefore, the collective float unit configured with the floats 10 of the present embodiment can be anchored with the linear member 101, at the center side of the collective float unit, as well as around the collective float unit.

The float 10 of the present embodiment can also be used as a passage or the like. The opening 26 is preferably closed in such a usage mode, while the opening is preferably opened when accessing the lower-surface wall 17 side of the anchoring portion 70. In this regard, as described below, if the opening 26 is configured to be easily opened and closed, the opening 26 can be closed during normal operation to improve the convenience of the passage and can be easily opened when inspecting the linear member 101, and thus the inspection work can be easily performed.

Therefore, in the present embodiment, the opening 26 is configured to be easily closed and opened. The configuration for easily closing and opening the opening 26 is described below.

FIG. 13 is a cross-sectional view for explaining an opening and closing mechanism of the opening 26, specifically a cross-sectional view taken along an E-E line in FIG. 10. While FIG. 10 shows a state in which the fixing metal fitting 13 on the one end side is not attached to the support portion 11, FIG. 13 shows a state in which the fixing metal fitting 13 on the one end side is attached to the support portion 11.

As described above, since the opening 26 is formed by raising the support portion 11, the inner shape of the opening 26 and the outer shape of the support portion 11 have substantially the same shape. Consequently, even if the opening 26 is closed by the support portion 11, the support portion 11 easily moves toward the lower-surface wall 17 side if a force pushing the support portion 11 toward the lower-surface wall 17 side is applied.

As shown in FIG. 10 and FIG. 13, stopper portions 90 are provided in the vicinity of both ends of the edge 26a (see FIG. 5) on the end side (a side facing the side 24 serving as a hinge) of the opening 26 when the opening 26 (see FIG. 5) is opened by raising the support portion 11, using the side 24 as the hinge. The stopper portion 90 receives a part of the fixing metal fitting 13 on the one end side when the support portion 11 is tilted so as to cover the opening 26 while the fixing metal fitting 13 on the one end side is attached to the support portion 11.

By providing the float 10 with the stopper portions 90, the support portion 11 can be prevented from moving toward the lower-surface wall 17 even when a force is applied to push the support portion 11 toward the lower-surface wall 17 when the opening 26 is closed with the support portion 11.

The fixing metal fitting 13 on the one end side is an accessory part for fixing the solar panel 50. By using the accessory part, there is no need to add new components.

As shown in FIG. 1, a finger insertion recess 91 is provided, on the surface 11a of the support portion 11 facing the one end side while the support portion 11 is raised on the upper-surface wall 16 side, for inserting a finger between the fixing portion 13b of the fixing metal fitting 13 on the one end side and the support portion 11.

When the support portion 11 is raised to the upper-surface wall 16 side from a state in which the support portion 11 is tilted so as to close the opening 26, a finger is inserted between the fixing portion 13b and the support portion 11 to pull and raise the support portion 11 to the upper-surface wall 16 side, and thus the opening 26 can be easily opened.

The aspect in which the linear member 101 is connected to the float 10 where the solar panel 50 is not installed is described above. However, it is not impossible to connect the linear member 101 to the float 10 on which the solar panel 50 is installed although the connection work may be more difficult.

Therefore, the linear member 101 may be connected, as necessary, to the float 10 where the solar panel 50 is installed.

As described above, according to the present embodiment, the solar panel float system configured to suppress the deterioration of the linear member can be provided.

4. Fourth Embodiment (Corresponding to Fourth to Sixth Viewpoint)

Hereinafter, the float 10 according to the fourth embodiment of the present invention (particularly a new float 10n) and the float aggregate 1 including the float 10 will be described in detail with reference to the drawings.

Figure 32:
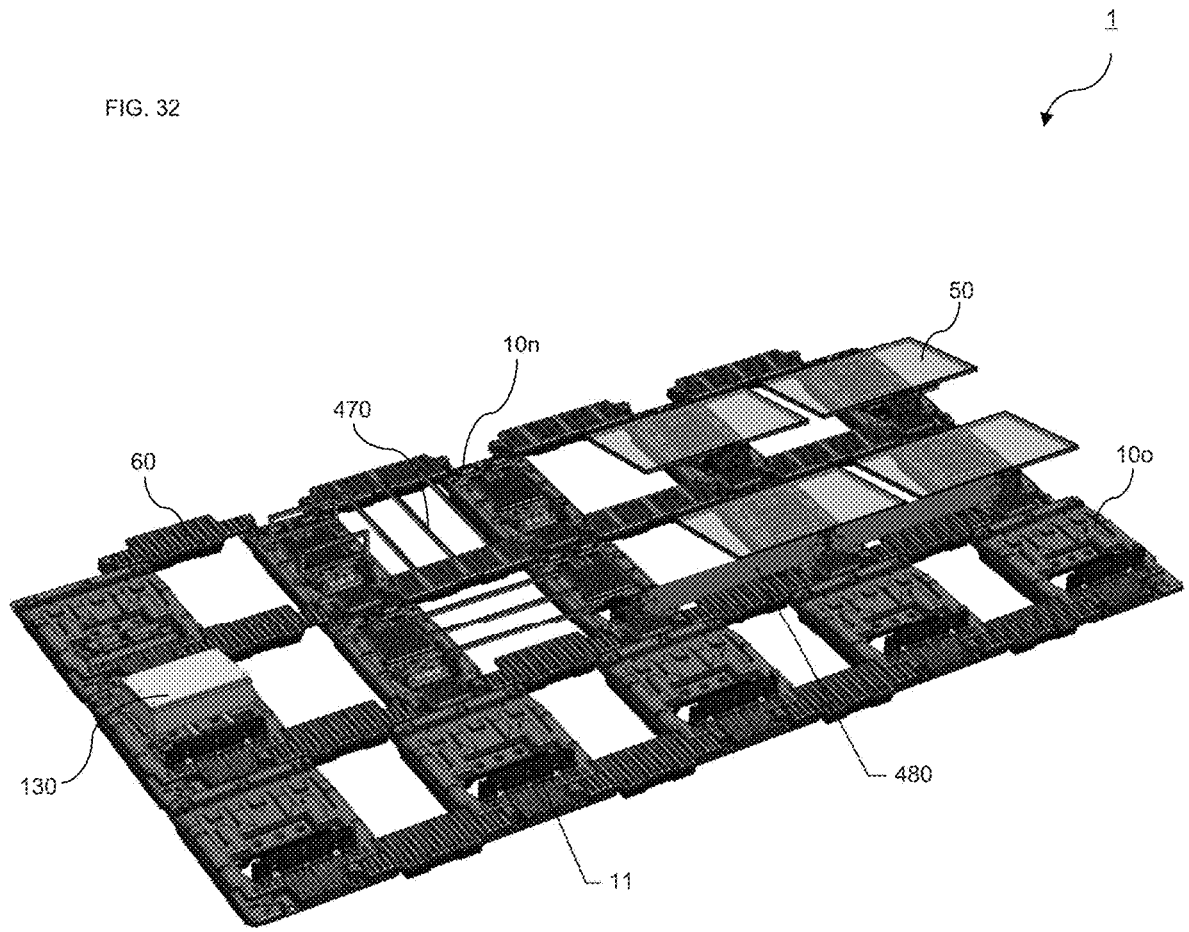
FIG. 32 is a schematic perspective view of a float aggregate 1.

FIG. 32 shows an example and a part of the float aggregate 1, and the solar panel 50 is installed on the new float 10n which is the float 10 formed as a plastic molded body. On the other hand, the float 10 on which the solar panel 50 is not installed is an old (conventional) float 10o and has a wider shape than the new float 10n according to the present embodiment. Hereinafter, when the old and new types are not distinguished, they are simply referred to as the float 10.

Each float 10 is connected by the passage joint 60 (common to the new and old types) formed as a plastic molded body. Here, the passage joint 60 is coupled to the float 10 on the upper surface of each float 10, and the floats 10 are coupled at a predetermined interval in the connecting direction of the passage joint 60. Thus, a predetermined interval is formed between the adjacent floats 10.

Figure 42:
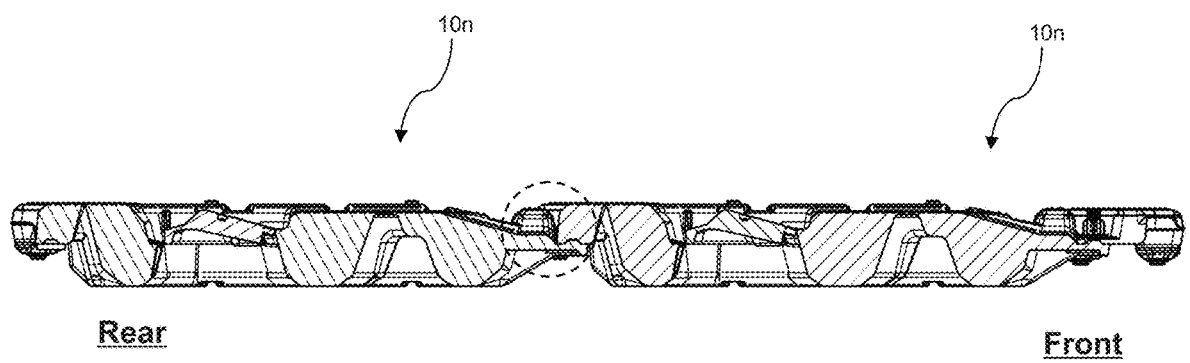
FIG. 42 is a cross-sectional view showing two new floats 10n connected to each other.
Figure 43:
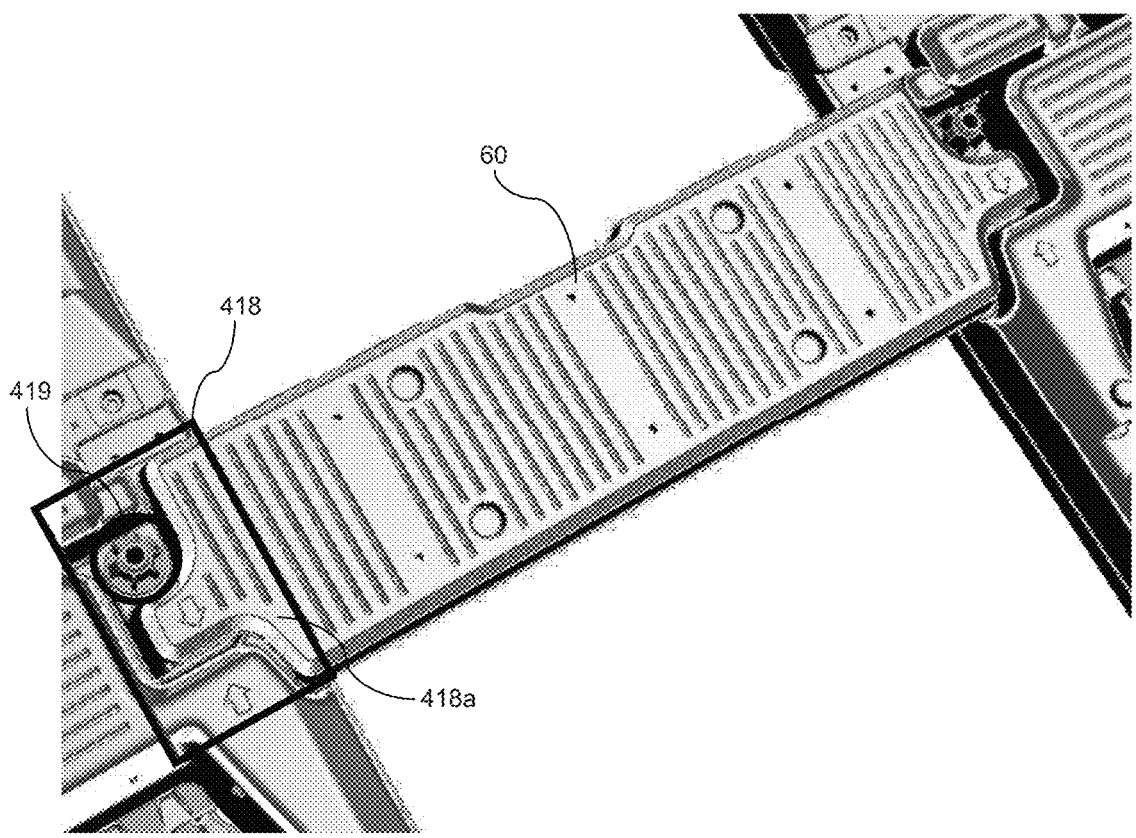
FIG. 43 is a schematic perspective view showing a connection between the new float 10n and the passage joint 60.

Meanwhile, the connection in the direction orthogonal to the connection direction by the passage joint 60 is performed by connecting the eaves-shaped end portions of the floats 10. The eaves-shaped end portion is separated from the water surface when the float is floated, and thus an interval is formed between the floats 10 also in this direction (the direction orthogonal to the connecting direction by the passage joint 60). In this regard, as shown in FIG. 42, the two connected floats 10 (particularly, the new floats 10n) are partially overlapped. With such a configuration, a load applied to one float 10 can be distributed to the front and rear floats 10. Similarly, when the float 10 and the passage joint 60 are connected, they are partially overlapped. With such a configuration, a load applied to one passage joint 60 can be distributed to the adjacent floats 10. In particular, such a force distribution is important when a person walks on the passage joint 60. As shown in FIG. 43, in the overlapping connection region 418, the width or area of the overlapping region 418a is larger than the width or area of the compression portion 419 used for fixing.

The float aggregate 1 configured as described above is connected by the passage joint 60 formed as a plastic molded body in a predetermined connection direction, while the eaves-shaped end portions of the floats 10 are connected in a direction orthogonal thereto, all the intervals being kept constant (invariable). Therefore, the resistance to water is kept always small.

Moreover, the float aggregate 1 is connected by the passage joint 60, and the interval between the floats 10 can be taken large. By increasing the interval between the floats 10, the float aggregate 1 is not easily affected by the waves, thereby preventing the float aggregate 1 from moving from a floating position. The float aggregate 1 is usually provided with the anchor or connected to the land so as not to move by waves, and the allowance is provided in anchoring in case of fluctuations in water volume due to a high and low tides or before and after rain. Since the interval between the floats 10 is large in the float aggregate 1, the float aggregate 1 can easily allow a water flow due to waves to pass through and does not move easily.

In addition, as described with reference to the background art, since the power generated by solar power generation through the solar panel is direct current and the power used for the household power source is alternating current, a power conditioner converting direct current to alternating current is required. In the float aggregate 1 according to the present embodiment, the power conditioner 130 is installed, as an example, on the old float 10o, as shown in FIG. 32. Although not shown, the solar panel 50 and the power conditioner 130 are connected via a large number of power cables, and another power cable for transmitting power from the power conditioner 130 to the land is also required.

Next, the components of the float aggregate 1, such as the new float 10n, the passage joint 60, and the solar panel 50 placed on the new float 10n, are described in detail.

Figure 37:
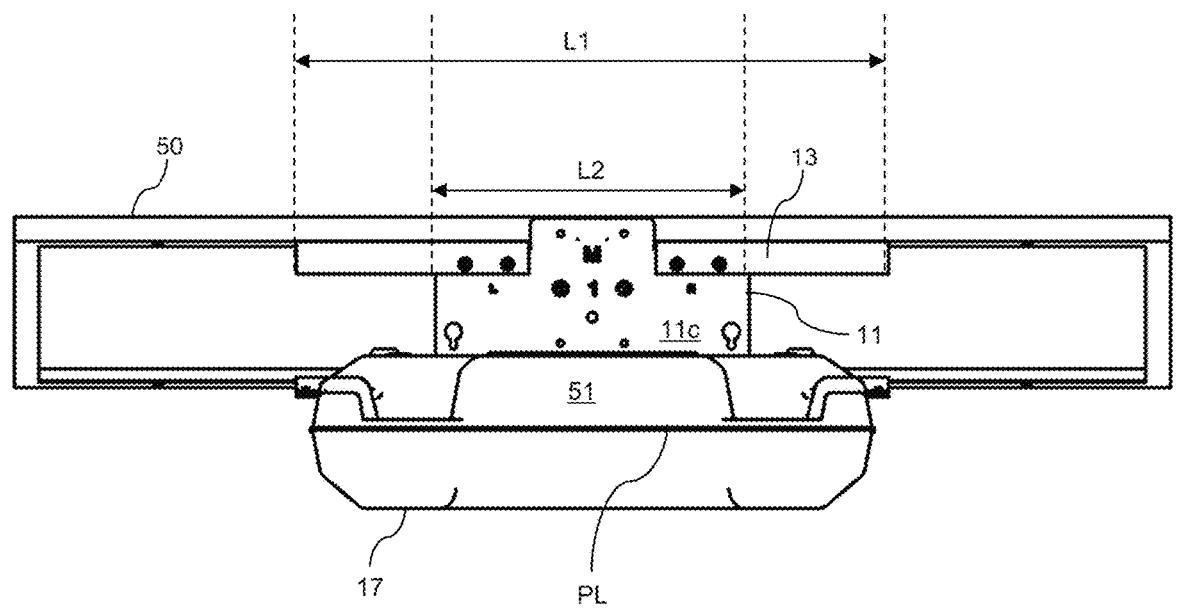
FIG. 37 is a front view showing the state in which the solar panel 50 is attached to the new float 10n.
Figure 38:
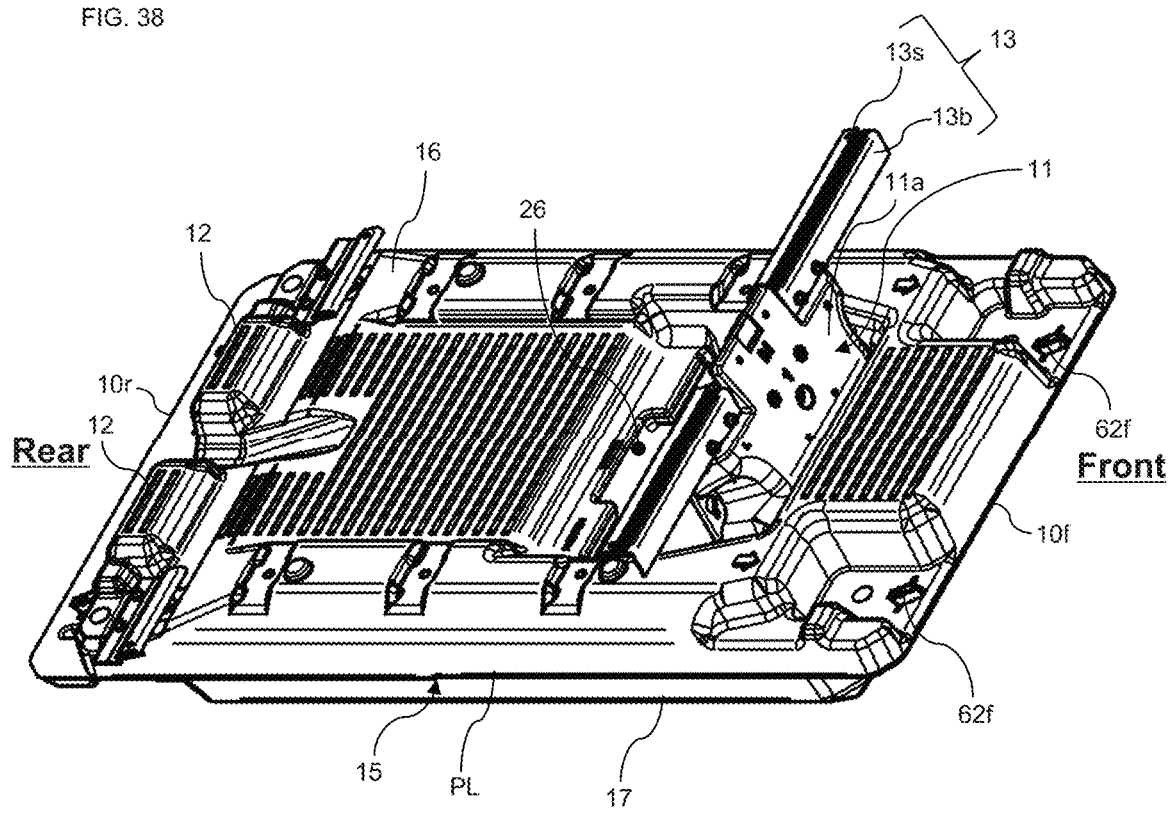
FIG. 38 is a schematic perspective view showing a state in which the solar panel 50 is removed from the state in FIG. 33.
Figure 39:
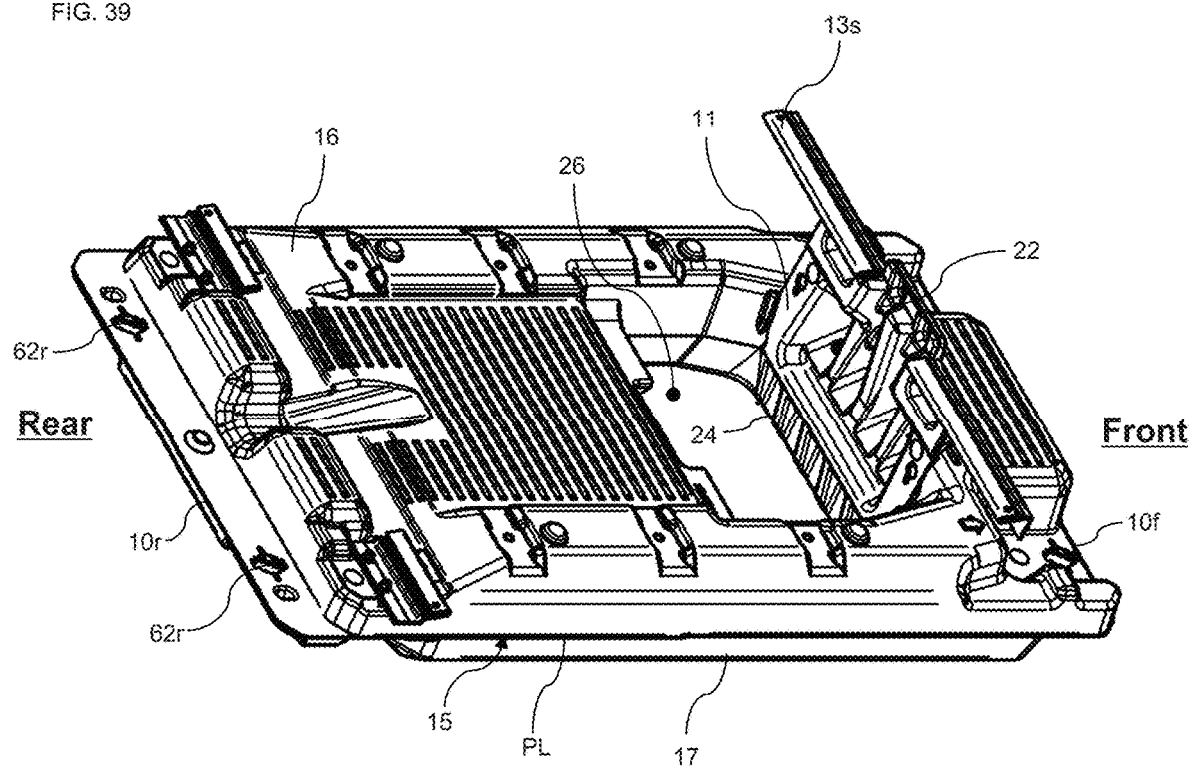
FIG. 39 a schematic perspective view showing a state in which the solar panel 50 is removed from the state in FIG. 34.
Figure 40:
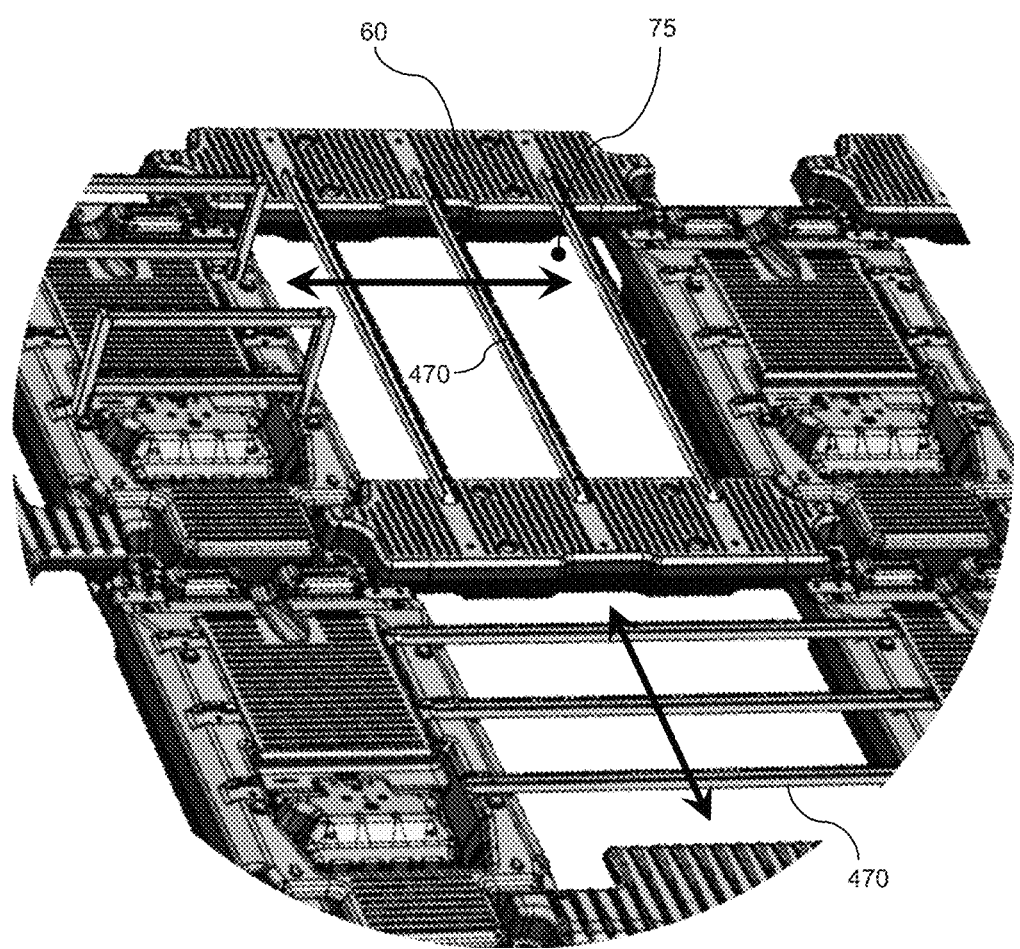
FIG. 40 is a partial enlarged view of FIG. 32 and is a schematic perspective view showing an elongated member 470.
Figure 41:
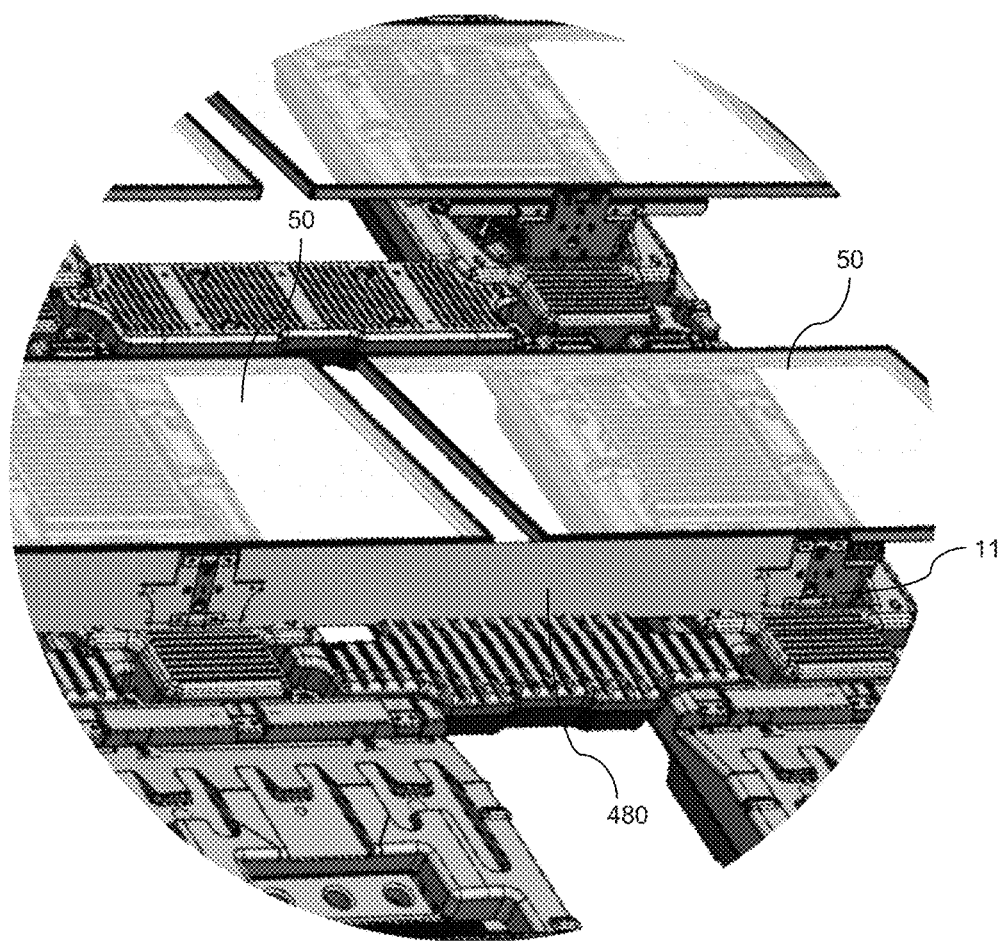
FIG. 41 is a partial enlarged view of FIG. 32 and is a schematic perspective view showing a windproof net 480.

FIG. 33 to FIG. 37 show a state in which the solar panel 50 is installed on the new float 10n. FIG. 38 and FIG. 39 show a state in which the solar panel 50 is removed from the new float 10n. FIG. 40 and FIG. 41 are partial enlarged views of FIG. 32.

A large number of floats 10 is connected by passage joints 60 (see FIG. 32 and FIG. 40) to form the float aggregate 1 in which the solar panel 50 is installed. The float aggregate 1 is configured, for example, by aggregating thousands of floats 10 (10,000 in some cases). Among the floats 10 used in the float aggregate 1, some floats 10 are not provided with the solar panel 50 thereon and are used as a passage for the maintenance and inspection of the solar panel 50 (in such a case, it is preferable to employ the old float 10o). The passage is also used for laying a cable from the solar panel 50.

More specifically, the floats 10 (for example, the new float 10n) adjacent to each other in the direction perpendicular to the front-rear direction of the float 10 are connected to each other via the passage joint 60, as shown in FIG. 40. Therefore, a space 75 is defined between the two floats 10 and the two passage joints 60 connecting them.

In the float aggregate 1 according to the present embodiment, a plurality of elongate members 470 is provided across the space 75. As illustrated, the elongate member 470 may be disposed between the adjacent passage joints 60 or between the floats 10. For example, the elongated member 470 is a metal pipe having a U-shaped cross section. By disposing such an elongated member 470, it is possible to arrange the power cable in the space 75 that was originally a dead space. It should be noted that the arrangement of the power cable is as indicated by the arrow in FIG. 40. As a matter of course, a plate-shaped member may be arranged instead of the elongated member 470, though the aspect described above is preferable in view of cost and weight.

Since it is also important to configure the float aggregate 1 so as not to move due to the influence of wind or the like, the old float 10o is configured to be anchored by the anchoring member, such as an anchor rope. On the other hand, the new float 10n does not necessarily require such a configuration and is configured without the anchoring member in the drawings. Generally, in order to anchor the float 10 on the outer periphery of the float aggregate 1, it is preferable to employ the new float 10n in the float aggregate 1 for the floats 10 other than those on the outer periphery.

In order to prevent the influence of wind or the like, the float aggregate 1 according to the present embodiment is provided with a windproof net 480 (an example of a "windproof member" in the claims). In particular, the shorter side (or the corresponding side) of the new float 10n having a substantially rectangular shape is designed to be shorter than the shorter side of the old float 10o. It is thus not preferable to provide the windproof member for each new float 10n because this causes an increase in the size of the float 10. For this reason, the windproof net 480 according to the present embodiment is provided so as to extend from the support portion 11 of one new float 10n to the support portion 11 of the other new float 10n in two adjacent new floats 10n via the passage joint 60.

In addition, it is possible to adjust the suppression of the influence of wind by selecting the material of the windproof net 480. Although the aperture ratio of the windproof net 480 varies depending on the material, for example, the aperture ratio is 0.01 to 0.5, preferably 0.05 to 0.4, and more preferably 0.1 to 0.3. Specifically, for example, the aperture ratio may be 0.01, 0.02, 0.03, 0.04, 0.05, 0.10, 0.15, 0.20, 0.35, 0.40, 0.45, 0.50, and may be within a range between any two of the values exemplified herein.

Figure 33:
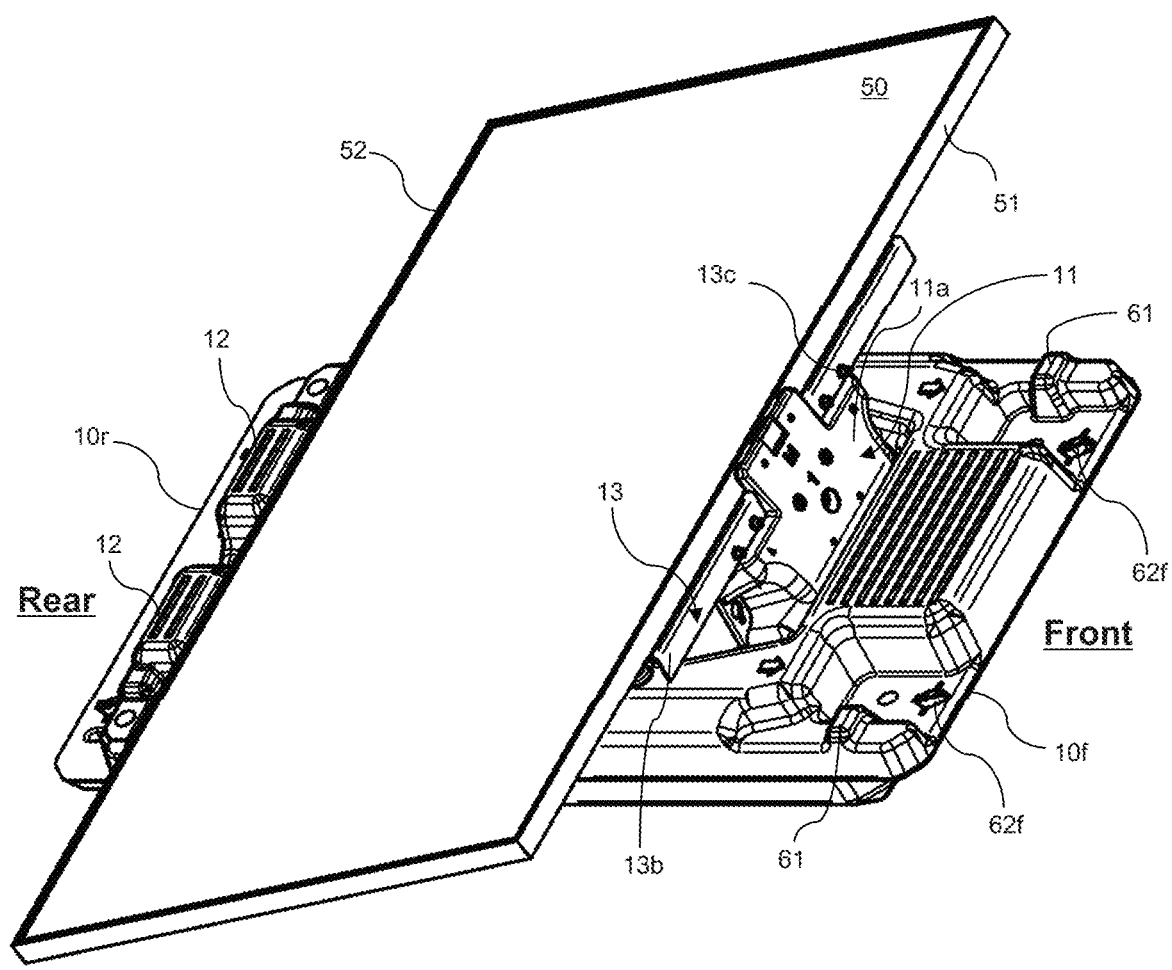
FIG. 33 is a schematic perspective view showing a state in which a solar panel 50 is attached to a new float 10n.
Figure 34:
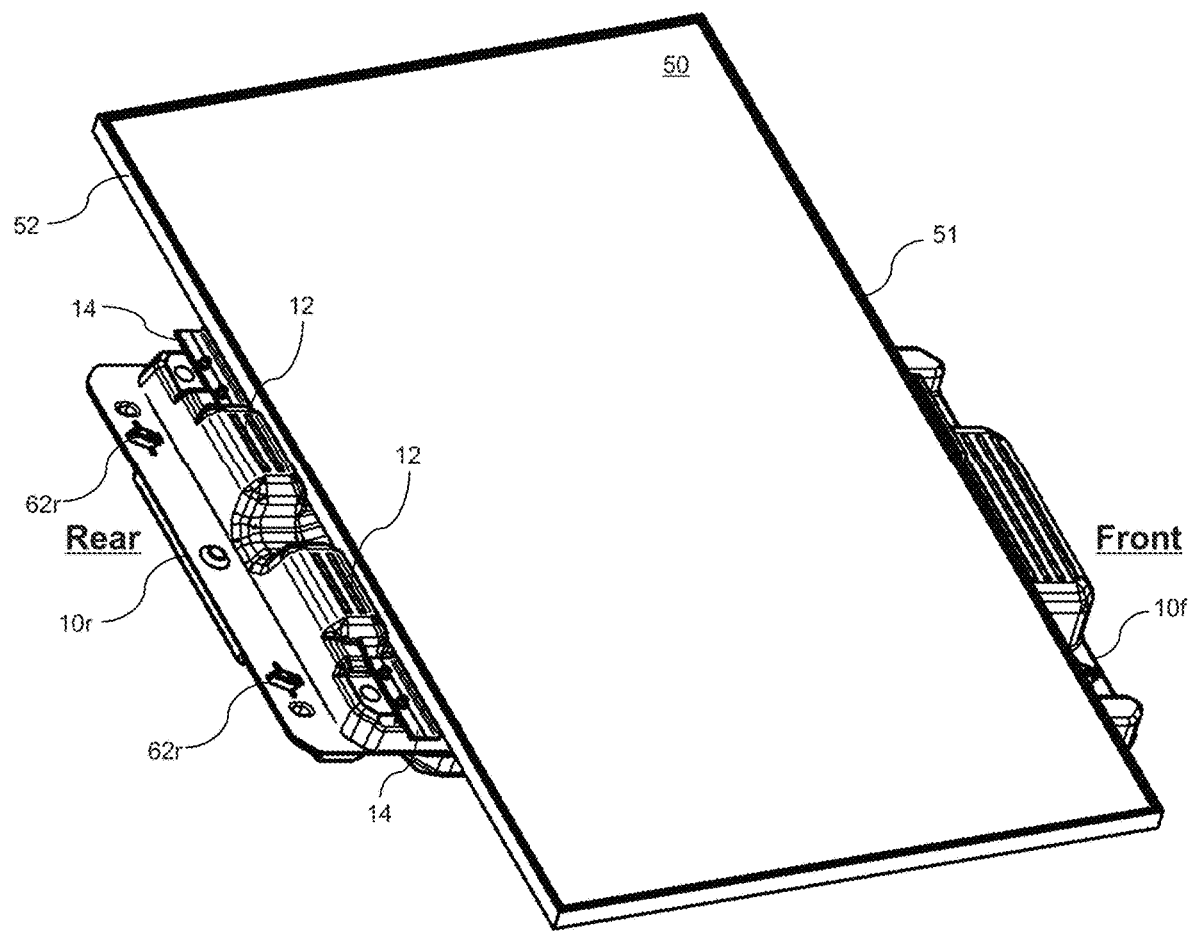
FIG. 34 is a schematic perspective view seen from an angle different from FIG. 33.

As shown in FIG. 33 and FIG. 34, the new float 10n comprises the support portion 11 supporting one end portion 51 of the pair of longitudinal sides of the solar panel 50, and the receiving portion 12 receiving the other end portion 52 on the other longitudinal side of the solar panel 50. In this regard, the support portion 11 protrudes in the height direction upward (an example of a "first direction" in the claims) from the upper-surface wall 16 (see FIG. 38) so that the solar panel 50 is installed in an appropriate inclined state in consideration of the power generation efficiency.

One end portion 51 of the solar panel 50 is provided with a base made of aluminum supported by the support portion 11, and this base is supported on the support portion 11. Meanwhile, the new float 10n comprises the fixing metal fitting 13 on a front side for fixing the one end portion 51 side of the solar panel 50 to the support portion 11. The solar panel 50 is fixed to the support portion 11 by being screwed to the fixing metal fitting 13.

An aluminum base similar to the aluminum base provided at the one end portion 51 is provided at the other end portion 52 of the solar panel 50. The new float 10n comprises the two fixing metal fittings 14 on a rear side, the two fixing metal fittings 14 fixing the other end portion 52 side (rear side) of the solar panel 50 received by the receiving portion 12, to the new float 10n. The rear side of the solar panel 50 is fixed to the new float 10n by the fixing metal fittings 14.

The new float 10n is manufactured by, for example, blow molding in which a molten cylindrical parison is sandwiched between a plurality of split molds. Various thermoplastic resins can be used as the molding material, and for example, polyolefin resins, such as polyethylene and polypropylene, can be suitably used.

As shown in FIG. 38 and FIG. 39, the new float 10*n* has a substantially rectangular shape as a whole, comprising the side wall portion 15 including the parting line PL, the upper-surface wall 16 located on the upper side, and the lower-surface wall 17 located on the lower side (a combination of these is an example of a "float portion" in the claims) and is configured to have a hollow portion for accommodating gas (such as air) therein.

The new float 10*n* is provided with the support portion 11 for supporting the solar panel 50. The support portion 11 is configured by combining the lower-surface wall 17 and the upper-surface wall 16. Three sides other than the side 24 on the front side around the support portion 11 are cut and can be raised on the upper-surface wall 16 side (a side on which the solar panel 50 is installed) to form the opening 26, using the side 24 on the front side as a hinge. In this regard, the raised support portion 11 is fixed by screwing in a hole opened by compression of a part of the support portion 11 so as to keep the raised state. Since the force applied to the support portion 11 is increased by attaching the windproof net 480 described above, such a strong fixing is necessary. Even if the side 24 serving as a hinge is damaged, the fixed state can be maintained.

Figure 35:
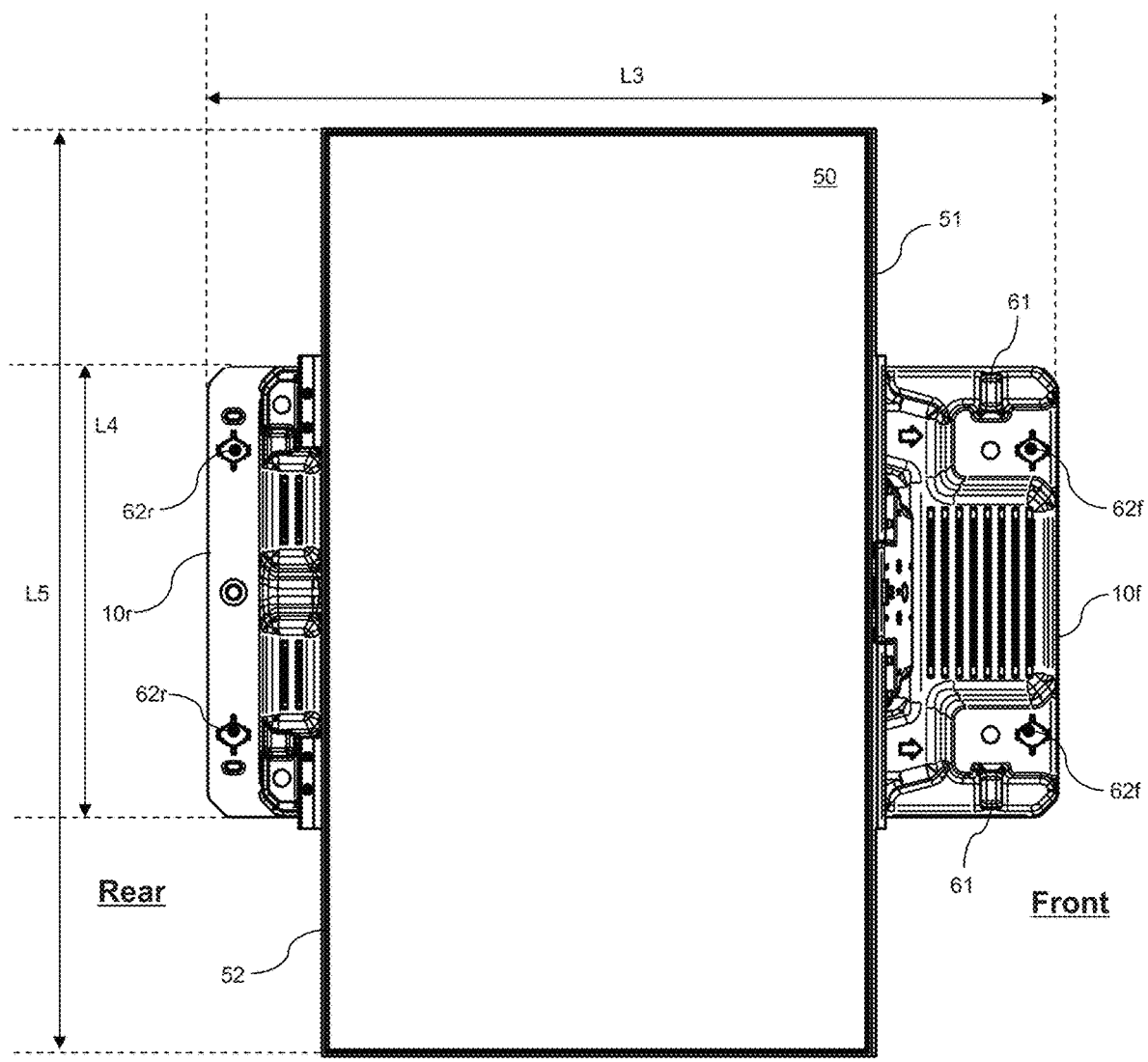
FIG. 35 is a plan view showing the state in which the solar panel 50 is attached to the new float 10n.
Figure 36:
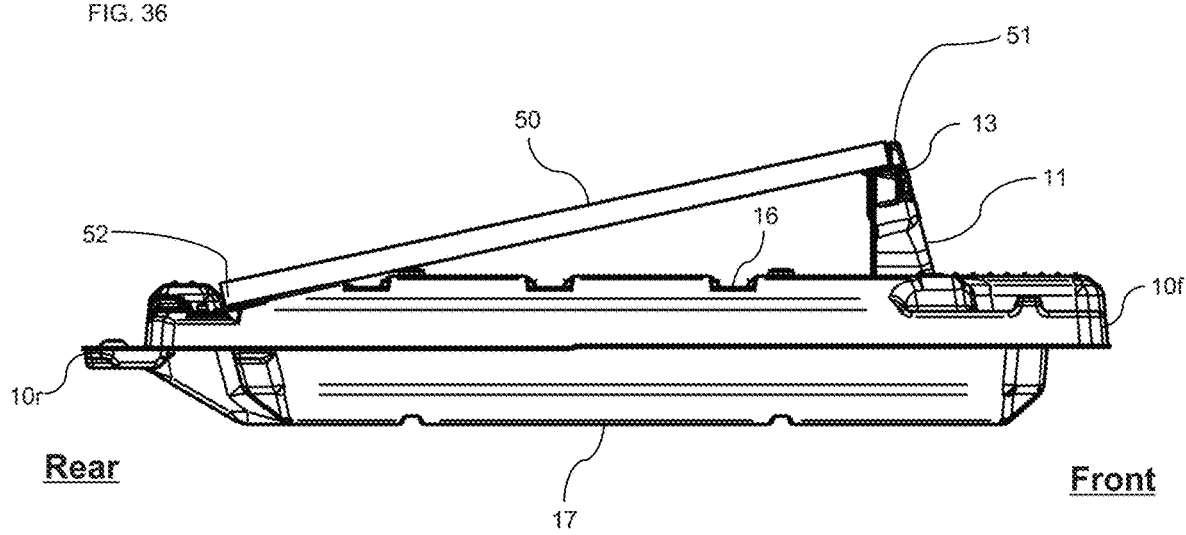
FIG. 36 is a side view showing the state in which the solar panel 50 is attached to the new float 10n.

As shown in FIG. 35, when the solar panel 50 is installed, the support portion 11 is raised on the upper-surface wall 16 side so as to come into contact with an inner wall surface 25 of the opening 26 on a side of the side 24 serving as a hinge. The solar panel 50 is installed so that the lower side of the front side of the solar panel 50 is supported via the fixing metal fitting 13, on a side of the side 22 opposite to the side 24 as a hinge on the front side.

The receiving rib for receiving the one end portion 51 side of the solar panel 50 is provided on a side of the side 22 opposite to the side 24 (serving as a hinge of the support portion 11) on the front side. Specifically, the receiving rib is provided with a stepped structure with the lower-surface wall 17 closer to the upper-surface wall 16. When the solar panel 50 is installed on the new float 10*n*, the one end portion 51 side of the solar panel 50 can be received so that the one end portion 51 side of the solar panel 50 may not shift to the front side beyond the support portion 11.

When the support portion 11 is configured as described above, the opening 26 is positioned in the vicinity of the support portion 11. Since an inner wall surface of the opening 26 serves as a wall that suppresses structural deformation, deflection is less likely to occur. Further, since the support portion 11 is connected to the main body of the new float 10*n* by a hinge structure, the support portion 11 is not easily affected even if the deflection occurs in the new float 10*n*. In addition, since the rigidity of the support portion 11 is enhanced by combining the lower-surface wall 17 and the upper-surface wall 16 without being separated from each other, the deformation due to the deflection of the float 10 is suppressed.

Next, a method for fixing the solar panel 50 is described. As shown in FIG. 33 and FIG. 34, the solar panel 50 is fixed to the new float 10*n* by fixing the one end portion 51 side of the solar panel 50 to the support portion 11 with the fixing metal fitting 13 on the front side.

The fixing metal fitting 13 on the front side is an L-shaped fixing metal fitting comprising a support surface 13*s* and the fixing portion 13*b*. Specifically, the fixing portion 13*b* has the other surface fixed to the surface 11*a* of the support portion 11 that faces the hinge and the front side of the new float 10*n* in a state where the support portion 11 is raised. The support surface 13*s* is provided to extend from the fixing portion 13*b* in a direction substantially orthogonal to the fixing portion 13*b* and supports the solar panel 50 with the support portion 11. The fixing metal fitting 13 is configured to fix the solar panel 50 from the lower side, with a screw, while the support portion 11 supports the solar panel 50.

The fixing metal fitting 13 is screwed to the support portion 11 with the four screws 13*c*. The screw holes through which the two screws 13*c* closer to the center are passed are elongated in the vertical direction. The fixing metal fitting 13 may be configured to slide vertically with respect to the support portion 11 when the fixing metal fitting 13 is temporarily fixed to the support portion 11 with the two screws 13*c* closer to the center.

In such a case, the fixing metal fitting 13 is slid downward so that there is a gap for inserting the solar panel 50 between the support surface 13*s* of the fixing metal fitting 13 and the support portion 11 while the fixing metal fitting 13 is temporarily fixed to the support 11. The solar panel 50 is inserted into the gap between the support surface 13*s* and the support portion 11, and then the fixing metal fitting 13 is slid upward to sandwich the solar panel 50 between the support surface 13*s* and the support portion 11. In such a state, the two screws 13*c* closer to the center are tightened. The fixing metal fitting 13 is then fixed to the support portion 11 with the two outer screws 13*c* to fix the one end portion 51 side (front side) of the solar panel 50 to the new float 10*n*. The same applies to the fixing metal fittings 14 on the rear side.

In particular, the fixing metal fitting 13 has an elongated shape as illustrated. The fixing metal fitting 13 is characterized in L1>L2, where L1 represents the length of the fixing metal fitting 13 in the longitudinal direction (an example of a "second direction" in the claims); and L2 represents the length of the support portion in the same direction. In other words, as shown in FIG. 37, the fixing metal fitting 13 is configured to protrude from the support portion 11 in a front view. It should be noted that the rear side is set to be approximately the same as the length L2. That is, the width of the fixing metal fitting 14 is shorter than the fixing metal fitting 13.

The value of L1/L2 is, for example, 1.3 to 4.0, preferably 1.4 to 3.0, and more preferably 1.5 to 2.0. Specifically, for example, L1/L2=1.30, 1.35, 1.40, 1.45, 1.50, 1.60, 1.70, 1.80, 1.90, 2.00, 2.50, 3.00, 3.50, 4.00, and may be within a range between any two of the values exemplified herein.

Since the new float 10*n* is smaller (the manufacturing cost thereof is smaller) than the old float 10*o*, the solar panel 50 cannot be stably held if the fixing metal fitting 13 has a length corresponding to the support portion 11. By satisfying L1>L2 as described above, it is possible to stably hold the solar panel 50 while downsizing the new float 10*n*. Here, the shapes of the fixing metal fittings 13 and 14 can be appropriately changed according to the width of the solar panel 50 (for example, 1500 to 2000 mm). Further, the widths of the fixing metal fittings 13 and 14 can be appropriately set according to the width of the solar panel 50.

The new float 10*n* thus downsized has a substantially rectangular shape longer than that of the conventional float (for example, the old float 10*o*). Here, the value of L3/L4 (when L3 represents the length of the longer side (the side extending in the front-rear direction) of the new float 10*n*; and L4 represents the length of the shorter side (the side extending in the direction orthogonal to the front-rear direction)) is, for example, 1.5 to 3.0, preferably 1.6 to 2.7, and more preferably 1.7 to 2.4. Specifically, for example, L3/L4=1.50, 1.55, 1.60, 1.65, 1.70, 1.80, 1.90, 2.00, 2.10, 2.20, 2.30, 2.40, 2.60, 2.80, and 3.00, and may be within a range between any two of the values exemplified herein. In other words, it is preferable that the length L3 of the shorter side (or the side corresponding thereto) is shorter than that of the old float 10o.

As a matter of course, the solar panel 50 may be basically the same as one conventionally used. In particular, it is preferable that the solar panel 50 is installed so that the longer side of the solar panel 50 having a substantially rectangular shape and the shorter side of the new float 10n are substantially in parallel. The value of L4/L5 (when L5 represents the length of the longer side of the solar panel 50) is, for example, 0.2 to 0.7, and preferably 0.3 to 0.6. Specifically, for example, L4/L5=0.20, 0.25, 0.30, 0.35, 0.40, 0.45, 0.50, 0.55, 0.60, 0.65, 0.70, and may be within a range between any two of the values exemplified herein.

The new float 10n is not used alone, and a large number of floats 10 including the new float 10n are connected by the passage joint 60 used as a passage during maintenance, forming the float aggregate 1, as shown in FIG. 32.

Specifically, the new float 10n is provided with a pair of engaging protrusions 61 engaging with the passage joint 60, on the front end portion 10f side of the float 10 closer to the support portion 11. The passage joint 60 can be engaged via a recess on the lower side, the recess engaging with the engaging protrusion 61 on the lower side.

Further, the new float 10n comprises a connecting bolt (not shown) for connecting the passage joint 60 to the rear end portion 10r side of the new float 10n, on the side close to the receiving portion 12 receiving the other end portion 52 side of the solar panel 50 (the rear side). Further, when a part of the rear end portion 10r side of the new float 10n and a part of the front end portion 10f are overlapped, a bolt hole 62f corresponding to the bolt hole 62r on the rear end portion 10r side is provided on the front end portion 10f side of the new float 10n.

By providing the passage joint 60 with a bolt hole corresponding to the bolt holes 62r and 62f, the passage joint 60 can be engaged with the engaging protrusion 61 of one new float 10n, and the bolt hole 62f on the front end portion 10f side of the one new float 10n and the bolt hole 62r on the rear end portion 10r side of the other new float 10n can be connected by a connection bolt. In addition, the bolt holes of the standard common with the old float 10o can be used to realize a state in which a large number of floats 10 are connected via the passage joint 60 (regardless of old and new). In this way, the floats 10 are connected one after another via the passage joint 60 to configure the float aggregate 1.

As described above, according to the present embodiment, provided is a float that can be manufactured at a lower cost than the conventional one while maintaining the holding stability of the solar panel and a float aggregate including such a float; a float aggregate including a float having a wind pressure countermeasure more suitable for use on water; and a float aggregate in which the wiring of the power cable is more organized.

Various embodiments according to the present invention have been described. These are presented as examples and are not intended to limit the scope of the invention. The novel embodiment can be implemented in various other forms, and various omissions, replacements, and modifications can be made without departing from the scope of the invention. The embodiments and modifications thereof are included in the scope and gist of the invention and are included in the invention described in the claims and the equivalents thereof.

REFERENCE SIGN LIST

1: float aggregate, 10: float, 10-1: first float, 10-2: second float, 10-3: third float, 10a: first end portion, 10b: second end portion, 10f: front end portion, 10fs: base end float, 10i: inner float, 10n: new float, 10o: old float, 10r: rear end portion, 10s: outer peripheral float, 10sf: base end float, 10t: third float, 11: support portion, 11a: surface, 12: receiving portion, 13: fixing metal fitting, 13a: holding portion, 13b: fixing portion, 13c: screw, 13s: support surface, 14: fixing metal fitting, 14a: lower metal fitting, 14aa: hook portion, 14b: upper metal fitting, 15: side wall portion, 16: upper-surface wall, 17: lower-surface wall, 18: inclined portion, 19: mounting portion, 19a: nut housing portion, 19aa: bottom portion, 19ab: rasp-cut nut, 19ac: screw, 19b: peripheral wall portion, 19c: first concave portion, 19d: bottom portion, 19e: second concave portion, 19ea: bottom portion, 19f: concave portion, 21: side, 22: side, 22a: receiving rib, 23: side, 24: side, 25: inner wall surface, 26: opening, 26a: edge, 30: annular float portion, 35: groove, 40: concave portion, 41: recess, 42: recess, 43: recess, 44: recess, 45: recess, 50: solar panel, 50a: glass part, 50b: outer periphery, 50d: dummy panel, 51: one end portion, 52: other end portion, 53: base, 54: base, 55: frame, 55a: panel receiving portion, 55b: engagement portion, 60: passage joint, 60a: one end, 60b: other end, 61: engaging protrusion, 62: connection bolt, 62a: bolt hole, 62b: bolt hole, 62f: bolt hole, 62r: bolt hole, 63: bolt hole, 70: anchoring portion, 71: first through hole, 71a: taper portion, 72: second through hole, 75: space, 80: eye bolt, 80a: ring, 80b: main body portion, 81: nut, 82: first fixing plate, 82a: through hole, 83: first bolt, 84: first nut, 85: second fixing plate, 90: stopper portion, 91: finger insertion recess, 100: the anchoring member, 101: linear member, 101a: one end, 101b: other end, 102: chain, 102e: chain element, 102ef: chain element, 103: metal wire, 104: resin rope, 105: fixing member, 105a: fixing portion, 120: collective float unit, 120a: collective float unit, 120b: collective float unit, 120p: collective float unit, 130: power conditioner, 130b: bottom, 140: mount, 141: bottom frame, 141l: left side bottom frame, 141r: right side bottom frame, 142la: left-side frame, 142lb: left-side frame, 142ra: right-side frame, 142rb: right-side frame, 143: top plate, 144b: sub-frame, 144l: sub-frame, 144r: sub-frame, 145: power conditioner support frame, 146: fixture, 150: power conditioner unit, 418: connection area, 418a: overlapping area, 419: compression portion, 470: elongated member, 480: windproof net

The invention claimed is:

1. A float aggregate formed by connecting a plurality of floats configured for mounting a solar panel thereto,
wherein the plurality of floats includes first and second floats,
the first floats are provided with the solar panel,
the second float is not provided with the solar panel and is provided with a power conditioner converting electric power generated by the solar panel from direct current to alternating current,
the second float comprises a mount,
the power conditioner is attached to the mount so that the second float and the power conditioner are not in contact with each other, and
the power conditioner attached to the mount is inclined with respect to a vertical direction.

2. The float aggregate of claim 1,
wherein the second float is provided to be surrounded by the first floats.

3. The float aggregate of claim 1, further comprising a collective float unit,
   wherein the first floats are located in the collective float unit, and
   the second float is located substantially in a center of the collective float unit.
4. The float aggregate of claim 1,
   the mount further comprises a sunshade member.
5. The float aggregate of claim 1,
   wherein the power conditioner is installed at a distance of 30 cm or more from a surface of the second float.
6. The float aggregate of claim 1,
   wherein the mount comprises a strut member on a side surface thereof,
   two strut members are provided on one side so as to intersect with each other, and
   the power conditioner is installed along one of the two strut members intersecting with each other.
7. The float aggregate of claim 1,
   wherein the plurality of floats further includes a third float,
   neither the solar panel nor the power conditioner is provided on the third float, and
   a float adjacent to the second float is the third float.
8. A float system for a solar panel used on water, comprising floats and anchoring members,
   wherein the float is configured for installing the solar panel thereon,
   the anchoring members comprise a linear member and a fixing member,
   the linear member is formed by connecting a resin rope and a metal member and comprises first and second connection portions, the first connection portion being connected to the float, the second connection portion being connected to the fixing member and suspended in water,
   one end of the resin rope is the second connection portion,
   the other end of the resin rope is connected to one end of the metal member,
   the other end of the metal member is the first connection portion,
   the fixing member is fixed on a water bottom to anchor the float on the water,
   solar panels are installed, on at least some of the floats, such that a height of the solar panels decreases from a first direction side to a second direction side, and
   a number of anchoring members connected to an edge of the float system on the first direction side is larger than a number of anchoring members connected to an edge of the float system on the second direction side.
9. The float system of claim 8, satisfying $0.2 \leq (L1/L0) \leq 0.9$, where L0 represents a length of the linear member in a longitudinal direction; and L1 represents a length of the resin rope of the linear member in a longitudinal direction.
10. The float system of claim 8,
    wherein the metal member comprises at least one of a chain and a metal wire.
11. The float system of claim 8,
    wherein the fixing member is an anchor embedded and fixed in a ground at a water bottom.
12. The float system of claim 8,
    wherein the fixing member is a plurality of sinkers submerged and located at a water bottom.
13. The float system of claim 8,
    wherein
    each resin rope of the anchoring members has a same length.
14. A float configured for installing a solar panel thereon, comprising a float portion, a support portion, and a fixing metal fitting,
    wherein the float portion has a rectangular shape and is configured to be hollow inside and to float on water,
    the support portion is provided so as to protrude upward in a first direction from an upper-surface wall of the float portion,
    the fixing metal fitting is an elongated member attached to the support portion, being configured to support the solar panel, satisfying $1.3 \leq L1/L2 \leq 4.0$, where L1 represents a length of the elongated member in a second direction; and L2 represents a length of the support portion in the second direction,
    the second direction is a longitudinal direction of the elongated member,
    the float portion satisfies $1.5 \leq L3/L4 \leq 3.0$, when L3 represents a length of a longer side of the rectangular shape; and L4 represents a shorter side of the rectangular shape, and
    the support portion is configured such that an end portion protruding in the first direction extends upward above the fixing metal fitting in a state where the fixing metal fitting is attached to the support portion.
15. The float of claim 14, further comprising the solar panel having a substantially rectangular shape,
    wherein the solar panel is arranged so that a longer side of the solar panel and a shorter side of the float portion are substantially parallel, and
    the float satisfies $0.2 \leq L4/L5 \leq 0.7$, where L5 represents the longer side of the solar panel.
16. A float aggregate comprising first and second floats,
    wherein the first float is the float of claim 14,
    the second float is different in shape of the float portion from the first float, and
    no solar panel is installed on the second float.

* * * * *